US012516351B2

(12) United States Patent
Nambiar et al.

(10) Patent No.: US 12,516,351 B2
(45) Date of Patent: Jan. 6, 2026

(54) AAV CAPSIDS AND COMPOSITIONS CONTAINING SAME

(71) Applicant: The Trustees of the University of Pennsylvania, Philadelphia, PA (US)

(72) Inventors: Kalyani Nambiar, Cambridge, MA (US); James M. Wilson, Philadelphia, PA (US); Qiang Wang, Philadelphia, PA (US)

(73) Assignee: The Trustees of the University of Pennsylvania, Philadelphia, PA (US)

( * ) Notice: Subject to any disclaimer, the term of this patent is extended or adjusted under 35 U.S.C. 154(b) by 1102 days.

(21) Appl. No.: 17/605,868

(22) PCT Filed: Apr. 28, 2020

(86) PCT No.: PCT/US2020/030266
§ 371 (c)(1),
(2) Date: Oct. 22, 2021

(87) PCT Pub. No.: WO2020/223231
PCT Pub. Date: Nov. 5, 2020

(65) Prior Publication Data
US 2022/0204990 A1 Jun. 30, 2022

Related U.S. Application Data

(60) Provisional application No. 62/924,095, filed on Oct. 21, 2019, provisional application No. 62/913,314, filed on Oct. 10, 2019, provisional application No. 62/840,184, filed on Apr. 29, 2019.

(51) Int. Cl.
| | |
|---|---|
| *A61K 48/00* | (2006.01) |
| *C07K 14/005* | (2006.01) |
| *C12N 7/00* | (2006.01) |
| *C12N 15/86* | (2006.01) |
| *A61K 39/00* | (2006.01) |

(52) U.S. Cl.
CPC .......... *C12N 15/86* (2013.01); *A61K 48/0075* (2013.01); *C07K 14/005* (2013.01); *C12N 7/00* (2013.01); *A61K 39/00* (2013.01); *C12N 2750/14122* (2013.01); *C12N 2750/14142* (2013.01); *C12N 2750/14143* (2013.01); *C12N 2750/14151* (2013.01); *C12N 2750/14152* (2013.01)

(58) Field of Classification Search
CPC ....................... C12N 15/86; C12N 7/00; C12N 2750/14122; C12N 2750/14142; C12N 2750/14143; C12N 2750/14151; C12N 2750/14152; A61K 48/0075; A61K 39/00; A61K 48/00; C07K 14/005
See application file for complete search history.

(56) References Cited

U.S. PATENT DOCUMENTS

| | | | |
|---|---|---|---|
| 5,478,745 A | 12/1995 | Samulski et al. | |
| 6,156,303 A | 12/2000 | Russel et al. | |
| 6,200,560 B1 | 3/2001 | Couto et al. | |
| 6,221,349 B1 | 4/2001 | Couto et al. | |
| 7,282,199 B2 | 10/2007 | Gao et al. | |
| 7,629,322 B2 | 12/2009 | Kleinschmidt et al. | |
| 7,906,111 B2 | 3/2011 | Wilson et al. | |
| 8,283,151 B2 * | 10/2012 | Schmidt .................. | C12N 7/00 435/7.1 |
| 8,632,764 B2 | 1/2014 | Xiao et al. | |
| 8,734,809 B2 * | 5/2014 | Gao ......................... | A61P 9/00 435/320.1 |
| 9,695,220 B2 * | 7/2017 | Vandenberghe ....... | C07K 14/00 |
| 9,840,719 B2 * | 12/2017 | High ..................... | C07K 14/005 |
| 10,480,011 B2 * | 11/2019 | Gao ...................... | C07K 14/005 |
| 2006/0136184 A1 | 6/2006 | Gustafsson et al. | |
| 2007/0036760 A1 * | 2/2007 | Wilson ................. | C07K 14/705 435/235.1 |
| 2009/0197338 A1 | 8/2009 | Vandenberghe et al. | |
| 2012/0141422 A1 | 6/2012 | Barkats | |
| 2013/0045186 A1 | 2/2013 | Gao et al. | |
| 2014/0032186 A1 | 1/2014 | Gustafsson et al. | |
| 2016/0097040 A1 | 4/2016 | Gao et al. | |
| 2017/0130245 A1 * | 5/2017 | Kotin ................... | C07K 14/005 |
| 2017/0191079 A1 | 7/2017 | Vandenberghe et al. | |
| 2017/0356008 A1 | 12/2017 | Lubelski et al. | |
| 2018/0127471 A1 | 5/2018 | Keravala | |
| 2018/0230489 A1 | 8/2018 | Kotin | |
| 2018/0371496 A1 | 12/2018 | Li et al. | |

(Continued)

FOREIGN PATENT DOCUMENTS

| | | | | |
|---|---|---|---|---|
| CA | 3053399 A1 * | 9/2018 | ............ | A61K 35/76 |
| EP | 1486567 A1 | 12/2004 | | |
| WO | WO 2008/145401 | 12/2008 | | |

(Continued)

OTHER PUBLICATIONS

Extended European Search Report issued for European Patent Application No. 20798442.8, dated Aug. 2, 2023.

(Continued)

*Primary Examiner* — Janet L Andres
*Assistant Examiner* — Samadhan Jaising Jadhao
(74) *Attorney, Agent, or Firm* — Cathy A. Kodroff; Howson & Howson LLP

(57) ABSTRACT

Provided herein are novel AAV capsids and rAAV comprising the same. In one embodiment, vectors employing a novel AAV capsid show increased transduction of a selected target tissue as compared to a prior art AAV.

18 Claims, 22 Drawing Sheets
Specification includes a Sequence Listing.

(56) References Cited

U.S. PATENT DOCUMENTS

| | | |
|---|---|---|
| 2019/0060425 A1 | 2/2019 | Scheel et al. |
| 2019/0100560 A1 | 4/2019 | Vandenberghe et al. |

FOREIGN PATENT DOCUMENTS

| | | | | |
|---|---|---|---|---|
| WO | WO 2011/133890 A1 | 4/2011 | | |
| WO | WO 2011/126808 A2 | 10/2011 | | |
| WO | WO 2013/049493 A1 | 4/2013 | | |
| WO | WO 2013/155222 A2 | 10/2013 | | |
| WO | WO 2015/012924 A2 | 1/2015 | | |
| WO | WO-2016081811 A1 * | 5/2016 | ......... | A61K 31/7088 |
| WO | WO 2016/100575 | 6/2016 | | |
| WO | WO 2016/115503 A1 | 7/2016 | | |
| WO | WO 2016/176191 A1 | 11/2016 | | |
| WO | WO 2017/075335 | 5/2017 | | |
| WO | WO 2017/075338 A2 | 5/2017 | | |
| WO | WO 2017/189959 A1 | 11/2017 | | |
| WO | WO 2017/201248 A1 | 11/2017 | | |
| WO | WO 2018/160582 | 9/2018 | | |
| WO | WO 2018/170310 | 9/2018 | | |
| WO | WO 2019/028306 A2 | 2/2019 | | |
| WO | WO 2019/079496 | 4/2019 | | |
| WO | WO 2019/168961 A1 | 9/2019 | | |
| WO | WO 2019/169004 A1 | 9/2019 | | |
| WO | WO 2020/132455 A1 | 6/2020 | | |

OTHER PUBLICATIONS

XIAO et a., Gene therapy vectors based on adeno-associated virus type 1, Journal of Virology, vol. 75(5):3994-4003, May 1999.
Substantive Examination Report dated Jun. 6, 2023 issued in corresponding Chilean Patent Application No. 2021-2768, with unofficial English translation provided by local agent.
Substantive Examination Report dated Dec. 9, 2022 issued in corresponding Saudi Arabian Patent Application No. 521430708, with unofficial English translation provided by local agent.
Order, *Regenxbio Inc. and The Trustees of the University of Pennsylvania v. Sarepta Therapeutics, Inc. and Sarepta Therapeutics Three, LLC*, C.A. No. 20-1226-RGA, pp. 1-2, Jan. 5, 2024.
*Regenxbio Inc. and The Trustees of the University of Pennsylvania v. Sarepta Therapeutics, Inc. and Sarepta Therapeutics Three, LLC*, Memorandum Opinion, C.A. No. 20-1226-RGA, pp. 1-14, Jan. 5, 2024.
Mikals et al., The structure of AAVrh32.33, a novel gene delivery vector. J Struct Biol. May 2014;186(2):308-17. Epub Apr. 2, 2014.
Mori et al., Two novel adeno-associated viruses from cynomolgus monkey: pseudotyping characterization of capsid protein. Virology. Dec. 20, 2004;330(2):375-83.
Non-Final Office Action dated Dec. 16, 2024 issued in U.S. Appl. No. 17/605,881.
Broekman et al., Adeno-associated virus vectors serotyped with AAV8 capsid are more efficient than AAV-1 or -2 serotypes for widespread gene delivery to the neonatal mouse brain, Neuroscience, 2006; 138(2):501-10. Epub Jan. 18, 2006.
Büning et al., Progress in the use of adeno-associated viral vectors for gene therapy, Cells Tissues Organs. Sep. 2004; 177(3):139-50.
Donnelly et al., The cleavage activities of aphthovirus and cardiovirus 2A protein, J Gen Virol. Jan. 1997;78 ( Pt 1):13-21.
Ellis et al., Zinc-finger nuclease-mediated gene correction using single AAV vector transduction and enhancement by Food and Drug Administration-approved drugs, Gene Ther. Jan. 2013;20(1):35-42. Epub Jan. 19, 2012.
Fisher et al., Transduction with recombinant adeno-associated virus for gene therapy is limited by leading-strand synthesis, J Virol. Jan. 1996;70(1):520-32.
Furler et al., Recombinant AAV vectors containing the foot and mouth disease virus 2A sequence confer efficient bicistronic gene expression in cultured cells and rat substantia nigra neurons, Gene Ther. Jun. 2001; 8(11):864-73.

Gao et al., Adeno-associated viruses undergo substantial evolution in primates during natural infections, Proc Natl Acad Sci U S A. May 13, 2003;100(10):6081-6. Epub Apr. 25, 2003.
Hudry et al., Therapeutic AAV Gene Transfer to the Nervous System: A Clinical Reality, Neuron. Mar. 6, 2019; 101(5):839-862.
Kattenhorn et al., Adeno-Associated Virus Gene Therapy for Liver Disease, Hum Gene Ther. Dec. 2016;27(12): 947-961.
Klump et al., Retroviral vector-mediated expression of HoxB4 in hematopoietic cells using a novel coexpression strategy, Gene Ther. May 2001;8(10):811-7.
Lock et al., Absolute determination of single-stranded and self-complementary adeno-associated viral vector genome titers by droplet digital PCR, Hum Gene Ther Methods. Apr. 2014;25(2):115-25. doi: 10.1089/hgtb.2013.131. Epub Feb. 14, 2014.
Lock et al., Rapid, simple, and versatile manufacturing of recombinant adeno-associated viral vectors at scale, Hum Gene Ther. Oct. 2010;21(10):1259-71.
McLaughlin et al., Adeno-associated virus general transduction vectors: analysis of proviral structures, Jun. 1988;62(6):1963-73.
Millington-Ward et al., Suppression and replacement gene therapy for autosomal dominant disease in a murine model of dominant retinitis pigmentosa, Mol Ther. Apr. 2011; 19(4):642-9. Epub Jan. 11, 2011.
Miyatake et al., Transcriptional targeting of herpes simplex virus for cell-specific replication, J Virol. Jul. 1997;71(7):5124-32.
Nicoud et al., Development of photoreceptor-specific promoters and their utility to investigate EIAV lentiviral vector mediated gene transfer to photoreceptors, J Gene Med. Dec. 2007;9(12):1015-23.
O'Reilly M et al., RNA interference-mediated suppression and replacement of human rhodopsin in vivo, Am J Hum Genet. Jul. 2007; 81(1):127-35. Epub May 23, 2007.
Rasowo et al., Development of novel muscle-specific adeno-associated viral vector constructs for gene therapy of Duchenne Muscular Dystrophy, European Scientific Journal, Jun. 29, 2014, 10(18).
Sandig et al., HBV-derived promoters direct liver-specific expression of an adenovirally transduced LDL receptor gene, Gene Ther. Nov. 1996;3(11):1002-9.
Sun et al., Adeno-associated virus-delivered short hairpin-structured RNA for androgen receptor gene silencing induces tumor eradication of prostate cancer xenografts in nude mice: a preclinical study, Int J Cancer. Feb. 1, 2010;126(3):764-74.
Thompson et al, A comprehensive comparison of multiple sequence alignment programs, Nucleic Acids Res. Jul. 1, 1999;27(13):2682-90.
Wang et al., Construction and analysis of compact muscle-specific promoters for AAV vectors, Gene Ther. Nov. 2008; 15(22):1489-99. Epub Jun. 19, 2008.
Wang et al., Sustained correction of bleeding disorder in hemophilia B mice by gene therapy, Proc Natl Acad Sci U S A. Mar. 30, 1999;96(7):3906-10.
Wu et al., Effect of genome size on AAV vector packaging, Mol Ther. Jan. 2010; 18(1):80-6. Epub Nov. 10, 2009.
Zeitz et al., Whole-exome sequencing identifies LRIT3 mutations as a cause of autosomal-recessive complete congenital stationary night blindness, Am J Hum Genet. Jan. 10, 2013;92(1):67-75. Epub Dec. 13, 2012.
International Search Report and Written Opinion for International Patent Application No. PCT/US2020/030266, mailed Aug. 6, 2020.
International Search Report and Written Opinion for International Patent Application No. PCT/US2020/030281, mailed Aug. 7, 2020.
International Search Report and Written Opinion for International Patent Application No. PCT/US2020/030273, mailed Aug. 6, 2020.
International Search Report and Written Opinion for International Patent Application No. PCT/US2021/045945, mailed Nov. 11, 2021.
Giles AR, et al. Deamidation of Amino Acids on the Surface of Adeno-Associated Virus Capsids Leads to Charge Heterogeneity and Altered Vector Function. Mol Ther. Dec. 5, 2018;26(12):2848-2862.
Giles AR et al., The Biological and Functional Effects of Spontaneous Deamidation of the AAV Capsid on Gene Therapy Vectors, Molecular Therapy, vol. 22(1):S85, Abstract, May 2014.

(56) References Cited

OTHER PUBLICATIONS

Nambiar K. Isolation and Characterization of Novel Adeno- associated Viruses for the Advancement of Gene Therapy, University of Pennsylvania Scholarly Commons, 154 pages, 2020.
Applicant's Amendment and Response to the Communication pursuant to Rules 70(2) and 70a(2) EPC and Extended European Search Report in European Patent Application No. 20798442.8, filed Feb. 23, 2024.
Office Action in Japanese Patent Application No. 2021-564545, issued Apr. 10, 2024, with translation provided by local associate.
Office Action in Japanese Patent Application No. 2021-564545, issued Sep. 4, 2024, with translation provided by local associate.
Office Action in Canadian Patent Application No. 3134379, issued Oct. 5, 2023.
Applicant's Amendment and Response in Canadian Patent Application No. 3134379, filed Apr. 4, 2024.
Office Action in Canadian Patent Application No. 3134379, issued Jan. 13, 2025.
Applicant's Amendment and Response in Canadian Patent Application No. 3134379, filed May 13, 2025.

\* cited by examiner

FIG. 3A vp1 start

| | | |
|---|---|---|
| AAVrh91eng | atggctgctgacggttatcttccagattggctcgaggacaacctttctgaaggcattcgt | 60 |
| AAVrh91    | atggctgccgatggttatcttccagattggctcgaggacaacctctctgagggcattcgc | 60 |
| AAV6.2     | atggctgccgatggttatcttccagattggctcgaggacaacctctctgagggcattcgc | 60 |
| AAV1       | atggctgccgatggttatcttccagattggctcgaggacaacctctctgagggcattcgc | 60 |

| AAVrh91eng | gagtggtgggctctgaaacctgagccccctaaacccaaagcgaaccaacaaaagcaggac | 120 |
| AAVrh91    | gagtggtgggcgctgaaacctgagcccgaaacccaaagccaaccagcaaaagcaggac | 120 |
| AAV6.2     | gagtggtgggacttgaaacctggagccccgaaacccaaagccaaccagcaaaagcaggac | 120 |
| AAV1       | gagtggtgggacttgaaacctggagccccgaagcccaaagccaaccagcaaaagcaggac | 120 |

| AAVrh91eng | gacggccgggtcttgtgcttccgggttacaaataccctggaccttcaacggactcgac | 180 |
| AAVrh91    | gacggccggggtctggtgcttcctggctacaagtaccctggaccttcaacggactcgac | 180 |
| AAV6.2     | gacggccggggtctggtgcttccggctacaagtacctcggaccttcaacggactcgac | 180 |
| AAV1       | gacggccggggtctggtgcttcctggctacaagtacctcggaccttcaacggactcgac | 180 |

| AAVrh91eng | aaaggagagccggtcaacgcggcggacgcggcagccctcgaacacgacaaagcttacgac | 240 |
| AAVrh91    | aaggggagcccgtcaacgcggcggacgcagcggcctcgagcacgacaaggcctacgac | 240 |
| AAV6.2     | aaggggagcccgtcaacgcggcggatgcagcggccctcgagcacgacaaggcctacgac | 240 |
| AAV1       | aaggggagcccgtcaacgcggcggacgcagcggccctcgagcacgacaaggcctacgac | 240 |

| AAVrh91eng | cagcagctcaaggccggtgacaaccccgtacctccggtacaaccacgccgacgccgagttt | 300 |
| AAVrh91    | cagcagctcaaagcgggtgacaatccgtacctgcggtataaccacgccgacgccgagttt | 300 |
| AAV6.2     | cagcagctcaaagcgggtgacaatccgtacctgcggtataaccacgccgacgccgagttt | 300 |
| AAV1       | cagcagctcaaagcgggtgacaatccgtacctgcggtataaccacgccgacgccgagttt | 300 |

| AAVrh91eng | caggagcgtctcttcaagaagatacgtctttttggggggcaaccttggcgagcagtcttccag | 360 |
| AAVrh91    | caggagcgtctgcaagaagatacgtctttttggggcaacctcggcgagcagtcttccag | 360 |
| AAV6.2     | caggagcgtctgcaagaagatacgtcttttggggcaacctcgggcgagcagtcttccag | 360 |
| AAV1       | caggagcgtctgcaagaagatacgtcttttggggcaacctcgggcgagcagtcttccag | 360 | vp2 start

| AAVrh91eng | gccaaaaagagggttcttgagcctttggtctggttgaggaagcagctaaaacggctcct | 420 |
| AAVrh91    | gccaagaagcgggttctcgaaccttttggtctggttgaggaagcagctaagacggctcct | 420 |
| AAV6.2     | gccaagaagagggttctcgaacctctggtctggttgaggaaggtgctaagacggctcct | 420 |
| AAV1       | gccaagaagagggttctcgaacctctcggtctggttgaggaaggcgctaagacggctcct | 420 |

| AAVrh91eng | ggaaagaagaggcctgtagagcagtctcctcaggaaccggactcatcatctggtattggc | 480 |
| AAVrh91    | gaaagaaacgtccggtagagcagtcgccacaagagccagactcctcctcgggcattggc | 480 |
| AAV6.2     | ggaaagaaacgtccggtagagcagtcgccacaagagccagactcctcctcgggcattggc | 480 |
| AAV1       | ggaaagaaacgtccggtagagcagtcgccacaagagccagactcctcctcgggcatcggc | 480 |

| AAVrh91eng | aaatcgggccagcagctgcaaaaaaagactaaattcggtcagactggcgactcagag | 540 |
| AAVrh91    | aaatcaggccagcagccggccaaaaagagactcaattttggtcagactggcgactcagag | 540 |
| AAV6.2     | aagacaggccagcagccggctaaaaagagactcaatttggtcagactggcgactcagag | 540 |
| AAV1       | aagacaggccagcagccggctaaaaagagactcaattttggtcagactggcgactcagag | 540 |

| AAVrh91eng | tcagtccccgaccctcaacctctcggagaacctccagaaacccgctgctgtgggacct | 600 |
| AAVrh91    | tcagtccccgaccctcaacctctcggagaacctccagaaaccccgctgctgtgggacct | 600 |
| AAV6.2     | tcagtccccgaccacacctctcggagaacctccagcaaccccgctgctgtgggacct | 600 |
| AAV1       | tcagtccccgatccacaacctctcggagaacctccagcaaccccgctgctgtgggacct | 600 |

FIG. 3B

```
                              ↓—vp3 start
AAVrh91eng   actacaatggcttcaggcggtggcgcaccaatggcagacaataacgaaggcgccgacgga    660
AAVrh91      actacaatggcttcaggcggtggcgcaccaatggcagacaataacgaaggcgccgacgga    660
AAV6.2       actacaatggcttcaggcggtggcgcaccaatggcagacaataacgaaggcgccgacgga    660
AAV1         actacaatggcttcaggcggtggcgcaccaatggcagacaataacgaaggcgccgacgga    660
             ************************************************************

AAVrh91eng   gtgggtaatgcctcaggaaattggcattgcgattccacatggctgggcgacagagtcatc    720
AAVrh91      gtgggtaatgcctcaggaaattggcattgcgattccacatggctgggcgacagagtcatc    720
AAV6.2       gtgggtaatgcctcaggaaattggcattgcgattccacatggctgggcgacagagtcatc    720
AAV1         gtgggtaatgcctcaggaaattggcattgcgattccacatggctgggcgacagagtcatc    720
             ************************************************************

AAVrh91eng   accaccagcaccgaacctgggcccttcctacctacaacaaccacctctacaagcaaatc    780
AAVrh91      accaccagcaccgaacctgggcccttcctacctacaacaaccacctctacaagcaaatc    780
AAV6.2       accaccagcaccgaacatgggcctgcccacctataacaaccacctctacaagcaaatc    780
AAV1         accaccagcaccgaacctgggcctgcccacctacaataaccacctctacaagcaaatc    780
             ****************  ******  *  **  ****  *  *******************

AAVrh91eng   tccagcgcttcaacggggccagtaacgacaaccactactttggctacagcacccctgg    840
AAVrh91      tccagcgcttcaacggggccagtaacgacaaccactactttggctacagcacccctgg    840
AAV6.2       tccagtgcttcaacggggccagcaacgacaaccactactggctacagcacccctgg    840
AAV1         tccagtgcttcaacggggccagcaacgacaaccactactcggctacagcacccctgg    840
             ***** ***************  **************** ********************

AAVrh91eng   gggtattttgatttcaacagattccactgccacttctcaccacgtgactggcagcgactc    900
AAVrh91      gggtattttgatttcaacagattccactgccacttctcaccacgtgactggcagcgactc    900
AAV6.2       gggtattttgatttcaacagattccactgccatttctcaccacgtgactggcagcgactc    900
AAV1         gggtattttgatttcaacagattccactgccactttcaccacgtgactggcagcgactc    900
             ********************************  *  ***********************

AAVrh91eng   attaacaacaactggggattccggccaagagactcaacttcaagctcttcaacatccag    960
AAVrh91      attaacaacaactggggattccggccaagagactcaacttcaagctcttcaacatccag    960
AAV6.2       atcaacaacaattggggattccggccaagagactcaacttcaagctcttcaacatccaa    960
AAV1         atcaacaacaattggggattccggccaagagactcaactttcaaactcttcaacatccaa    960
             ** ********  ************************  ****  ****************

AAVrh91eng   gtcaaggaggtcacgacgaatgatggcgtcacaaccatcgctaataaccttaccagcacg    1020
AAVrh91      gtcaaggaggtcacgacgaatgatggcgtcacaaccatcgctaataaccttaccagcacg    1020
AAV6.2       gtcaaggaggtcacgacgaatgatggcgtcacaaccatcgctaataaccttaccagcacg    1020
AAV1         gtcaaggaggtcacgacgaatgatggcgtcacaaccatcgctaataaccttaccagcacg    1020
             ********************************  *************************

AAVrh91eng   gttcaagtgttctcggactggagtaccagctgccgtacgtcctcggttctgcgcaccag    1080
AAVrh91      gttcaagtgttctcggactggagtaccagctgccgtacgtcctcggttctgcgcaccag    1080
AAV6.2       gtcaagtgtttctcggactggagtaccagtgccgtacgtcctcggctctgcgcaccag    1080
AAV1         gttcaagtcttctcggactggagtaccagcttcgtacgtcctcggctctgcgcaccag    1080
             *******  ******************* *  ****  ****** ************

AAVrh91eng   ggctgcctcctccgttccggcggagtattcatgattcctcagtatggctacctaacg    1140
AAVrh91      ggctgcctcctccgttccggcggagtattcatgattcctcagtatggctacctaacg    1140
AAV6.2       ggctgcctcctccgttccggcggagtgttcatgattccgcagtacggctacctaacg    1140
AAV1         ggctgcctcctccgttccggcggagtgttcatgattccgcaatacggctacctgacg    1140
             **************************  ******** **  ** ******** **

AAVrh91eng   ctgaacaacggaagtcaagcggtggacgtcatcctttactgcctggagtactcc t    1200
AAVrh91      ctcaacaatggcagccaggccgtaggacgtcatctttattgcctggaatattcca    1200
AAV6.2       ctcaacaatggcagccaggcagtggacgtcatctttactgcctggaatattccc    1200
AAV1         ctcaacaatggcagccaagccgtggacgtcatcctttactgcctggaatattcct    1200
             ** ** **  ** **  ** * **  ******* ********** ** *****
```

FIG. 3C

```
AAVrh91eng    tcgcagatgctaaggactggaataacttcaccttcagctataccttcgaggatgtacct    1260
AAVrh91       tctcaaatgctgagaacggccaacaacttaccttcagctacaccttgaagatgtgcct    1260
AAV6.2        tcgcagatgctgagaacgggcaataacttaccttcagctacaccttcgaggacgtgcct    1260
AAV1          tctcagatgctgagaacgggcaacaacttaccttcagctacacctttgaggaagtgcct    1260
              ** ** ***** ** ** ** ** ***** ********** ***** ** ** ** ***

AAVrh91eng    tttcacagcagctacgctcacagccagagttggatcgcttgatgaatcctctattgat    1320
AAVrh91       ttcacagcagtacgcgcacagcaagagcctggacaggctaatgaatcctctaatcgac    1320
AAV6.2        ttccacagcagctacgcgcacagccagagcctggaccggctgatgaatcctctcatcgac    1320
AAV1          ttccacagcagctacgcgcacagccagagcctggaccggctgatgaatcctctcatcgac    1320
              ** ******** ***** ********** **** *  * *********** ** ** **

AAVrh91eng    cagtatctgtactacctgaacagaacgcaaaatcaatctgaagtgcacaaaacaaggac    1380
AAVrh91       cagtacctgtattacctaaacagaactcagaatcaatccggaagtgcacaaaacaaggac    1380
AAV6.2        cagtacctgtattacctgaacagaactcagaatcagtccggaagtgcccaaaacaaggac    1380
AAV1          caatacctgtattacctgaacagaactcaaaatcagtccggaagtgcccaaaacaaggac    1380
              ** ** ***** ******** ******** ** ***** ** ********** *******

AAVrh91eng    ctgctttttagccgggggtctcctgctggcatgtctgttcagccaaaaaattggctacct    1440
AAVrh91       ttgctgtttagccgggggtctccagctggcatgtctgttcagccaaaaaactggctaccc    1440
AAV6.2        ttgctgtttagccgggggtctccagctggcatgtctgttcagccaaaaaactggctacct    1440
AAV1          ttgctgtttagccgtgggtctccagctggcatgtctgttcagccaaaaaactggctacct    1440
              **** *** ***** **** ****** ********************** ********

AAVrh91eng    gggcctgctaccggcaacagagagtttcaagactaaaacagacaacaacaacagtaac    1500
AAVrh91       gggcctgttaccgacagcagcgtgttctaaaacaaaacagacaacaacaacagcaac    1500
AAV6.2        ggacctgttaccggcagcagcgcgtttctaaaacaaaacagacaacaacaacagcaac    1500
AAV1          ggacctgttatcggcagcagcgcgttctaaaacaaaacagacaacaacaacagcaat    1500
              ** ***** ** ** ** ***** *  * ** ** ****************** **

AAVrh91eng    tttacctggacaggtgccagcaaatataatctcaatggccgcgaatcgatcattaatcca    1560
AAVrh91       tttacctggactggtgcctcaaatacaatctgaaggacgtgaatcctcattaaccct    1560
AAV6.2        tttacctggactggtgcttcaaaatataaccttaatgggcgtgaatctataatcaaccct    1560
AAV1          tttacctggactggtgcttcaaaatataaccttcaatgggcgtgaatccatcatcaaccct    1560
              ********* *****    ** ** ** ** ** ** ****** **** **

AAVrh91eng    ggaaccgctatggccagtcacaaggacgatgaagacaaattttttcctatgagcggcgtt    1620
AAVrh91       ggcacggctatggcatccacaaggacgacgaagacaaattttttcccatgagcgggtgtt    1620
AAV6.2        ggcactgctatggcctcacaaagacgacaaagacaagttctttcccatgagcggtgtc    1620
AAV1          ggcactgctatggcctcacacaaagacgacgaagacaagttcttttcccatgagcggtgtc    1620
              ** ** *******      *****  ***** *****    ** ** ******** **

AAVrh91eng    atgatatttggcaagaaatgcaggagcaagtaacactgcattagataatgtaatgatt    1680
AAVrh91       atgatttttggcaagaaaatgcaggagcatcaaacactgcattagacaatgttatgatt    1680
AAV6.2        atgatttttggaaaggagagcgcggagcttcaaacactgcattggacaatgtcatgatc    1680
AAV1          atgatttttggaaaagagagcgcggagcttcaaacactgcattggacaatgtcatgatt    1680
              ***** **  ** **  ** **  ***** ** **************  ** ***** ***

AAVrh91eng    acggatgaagaagagattaaagctaccaatcctgtggcaacagagagattggaactgtg    1740
AAVrh91       acagatgaagaggaaattaaagctaccaacccgtggcaacgagagatttggaactgtg    1740
AAV6.2        acagacgagaggaaatcaaagccactaaccccgtggccacgaaagatttggactgtg    1740
AAV1          acagacgaagaggaaattaaagccactaacctgtggccacgaaagatttggactgtg    1740
              ** ** ** **  ** ** ** ***** ** **** ****** ******* ** ** ***

AAVrh91eng    gcagtcaactgcagagctcaatacagaccccgcaactggagacgtcatgtcatggga    1800
AAVrh91       gcagtcaatctccaaagagcaatacagaccctgcaacaggagacgtcatgtcatgggga    1800
AAV6.2        gcagtcaatctccagagcagcagacgaccctgcgaccggagatgtgcatgttatggga    1800
AAV1          gcagtcaatttccagagcagcagcacaccctgcgaccggagatgtcatgctatgga    1800
              ******** *  ** *   *   * ******** ** **  **** ** **    ***
```

```
                   Vp1 start
                      ↓
AAVrh91    MAADGYLPDWLEDNLSEGIREWWALKPGAPKPKANQQKQDDGRGLVLPGYKYLGPFNGLD    60
AAV6.2     MAADGYLPDWLEDNLSEGIREWWDLKPGAPKPKANQQKQDDGRGLVLPGYKYLGPFNGLD    60
AAV1       MAADGYLPDWLEDNLSEGIREWWDLKPGAPKPKANQQKQDDGRGLVLPGYKYLGPFNGLD    60
           ********************* **************************************

AAVrh91    KGEPVNAADAAALEHDKAYDQQLKAGDNPYLRYNHADAEFQERLQEDTSFGGNLGRAVFQ    120
AAV6.2     KGEPVNAADAAALEHDKAYDQQLKAGDNPYLRYNHADAEFQERLQEDTSFGGNLGRAVFQ    120
AAV1       KGEPVNAADAAALEHDKAYDQQLKAGDNPYLRYNHADAEFQERLQEDTSFGGNLGRAVFQ    120
           ************************************************************

↓ vp2
AAVrh91    AKKRVLEPFGLVEEAAKTAPGKKRPVEQSPQEPDSSSGIGKSGQQPAKKRLNFGQTGDSE    180
AAV6.2     AKKRVLEPLGLVEEGAKTAPGKKRPVEQSPQEPDSSSGIGKTGQQPAKKRLNFGQTGDSE    180
AAV1       AKKRVLEPLGLVEEGAKTAPGKKRPVEQSPQEPDSSSGIGKTGQQPAKKRLNFGQTGDSE    180
           ********:*****.*************************:*******************

↓ vp3
AAVrh91    SVPDPQPLGEPPETPAAVGPTTMASGGGAPMADNNEGADGVGNASGNWHCDSTWLGDRVI    240
AAV6.2     SVPDPQPLGEPPATPAAVGPTTMASGGGAPMADNNEGADGVGNASGNWHCDSTWLGDRVI    240
AAV1       SVPDPQPLGEPPATPAAVGPTTMASGGGAPMADNNEGADGVGNASGNWHCDSTWLGDRVI    240
           ************ ***********************************************

AAVrh91    TTSTRTWALPTYNNHLYKQISSASTGASNDNHYFGYSTPWGYFDFNRFHCHFSPRDWQRL    300
AAV6.2     TTSTRTWALPTYNNHLYKQISSASTGASNDNHYFGYSTPWGYFDFNRFHCHFSPRDWQRL    300
AAV1       TTSTRTWALPTYNNHLYKQISSASTGASNDNHYFGYSTPWGYFDFNRFHCHFSPRDWQRL    300
           ************************************************************

AAVrh91    INNNWGFRPKRLNFKLFNIQVKEVTTNDGVTTIANNLTSTVQVFSDSEYQLPYVLGSAHQ    360
AAV6.2     INNNWGFRPKRLNFKLFNIQVKEVTTNDGVTTIANNLTSTVQVFSDSEYQLPYVLGSAHQ    360
AAV1       INNNWGFRPKRLNFKLFNIQVKEVTTNDGVTTIANNLTSTVQVFSDSEYQLPYVLGSAHQ    360
           ************************************************************

AAVrh91    GCLPPFPADVFMIPQYGYLTLNNGSQAVGRSSFYCLEYFPSQMLRTGNNFTFSYTFEDVP    420
AAV6.2     GCLPPFPADVFMIPQYGYLTLNNGSQAVGRSSFYCLEYFPSQMLRTGNNFTFSYTFEDVP    420
AAV1       GCLPPFPADVFMIPQYGYLTLNNGSQAVGRSSFYCLEYFPSQMLRTGNNFTFSYTFEEVP    420
           ********************************************************:**
```

FIG. 4B

```
AAVrh91    FHSSYAHSQSLDRLMNPLIDQYLYYLNRTQNQSGSAQNKDLLFSRGSPAGMSVQPKNWLP    480
AAV6.2     FHSSYAHSQSLDRLMNPLIDQYLYYLNRTQNQSGSAQNKDLLFSRGSPAGMSVQPKNWLP    480
AAV1       FHSSYAHSQSLDRLMNPLIDQYLYYLNRTQNQSGSAQNKDLLFSRGSPAGMSVQPKNWLP    480
           ************************************************************

AAVrh91    GPCYRQQRVSKTKTDNNNSNFTWTGASKYNLNGRESIINPGTAMASHKDDEDKFFPMSGV    540
AAV6.2     GPCYRQQRVSKTKTDNNNSNFTWTGASKYNLNGRESIINPGTAMASHKDDKDKFFPMSGV    540
AAV1       GPCYRQQRVSKTKTDNNNSNFTWTGASKYNLNGRESIINPGTAMASHKDDEDKFFPMSGV    540
           *********************************************** :**********

AAVrh91    MIFGKENAGASNTALDNVMITDEEEIKATNPVATERFGTVAVNLQSSNTDPATGDVHVMG    600
AAV6.2     MIFGKESAGASNTALDNVMITDEEEIKATNPVATERFGTVAVNLQSSSTDPATGDVHVMG    600
AAV1       MIFGKESAGASNTALDNVMITDEEEIKATNPVATERFGTVAVNFQSSSTDPATGDVHAMG    600
           ******.*********************************** ,*** ,********.**

AAVrh91    ALPGMVWQDRDVYLQGPIWAKIPHTDGHFHPSPLMGGFGLKHPPPQILIKNTPVPANPPA    660
AAV6.2     ALPGMVWQDRDVYLQGPIWAKIPHTDGHFHPSPLMGGFGLKHPPPQILIKNTPVPANPPA    660
AAV1       ALPGMVWQDRDVYLQGPIWAKIPHTDGHFHPSPLMGGFGLKNPPPQILIKNTPVPANPPA    660
           ****************************************:******************

AAVrh91    EFSATKFASFITQYSTGQVSVEIEWELQKENSKRWNPEVQYTSNYAKSANVDFTVDNNGL    720
AAV6.2     EFSATKFASFITQYSTGQVSVEIEWELQKENSKRWNPEVQYTSNYAKSANVDFTVDNNGL    720
AAV1       EFSATKFASFITQYSTGQVSVEIEWELQKENSKRWNPEVQYTSNYAKSANVDFTVDNNGL    720
           ************************************************************

AAVrh91    YTEPRPIGTRYLTRPL    736
AAV6.2     YTEPRPIGTRYLTRPL    736
AAV1       YTEPRPIGTRYLTRPL    736
           ****************
```

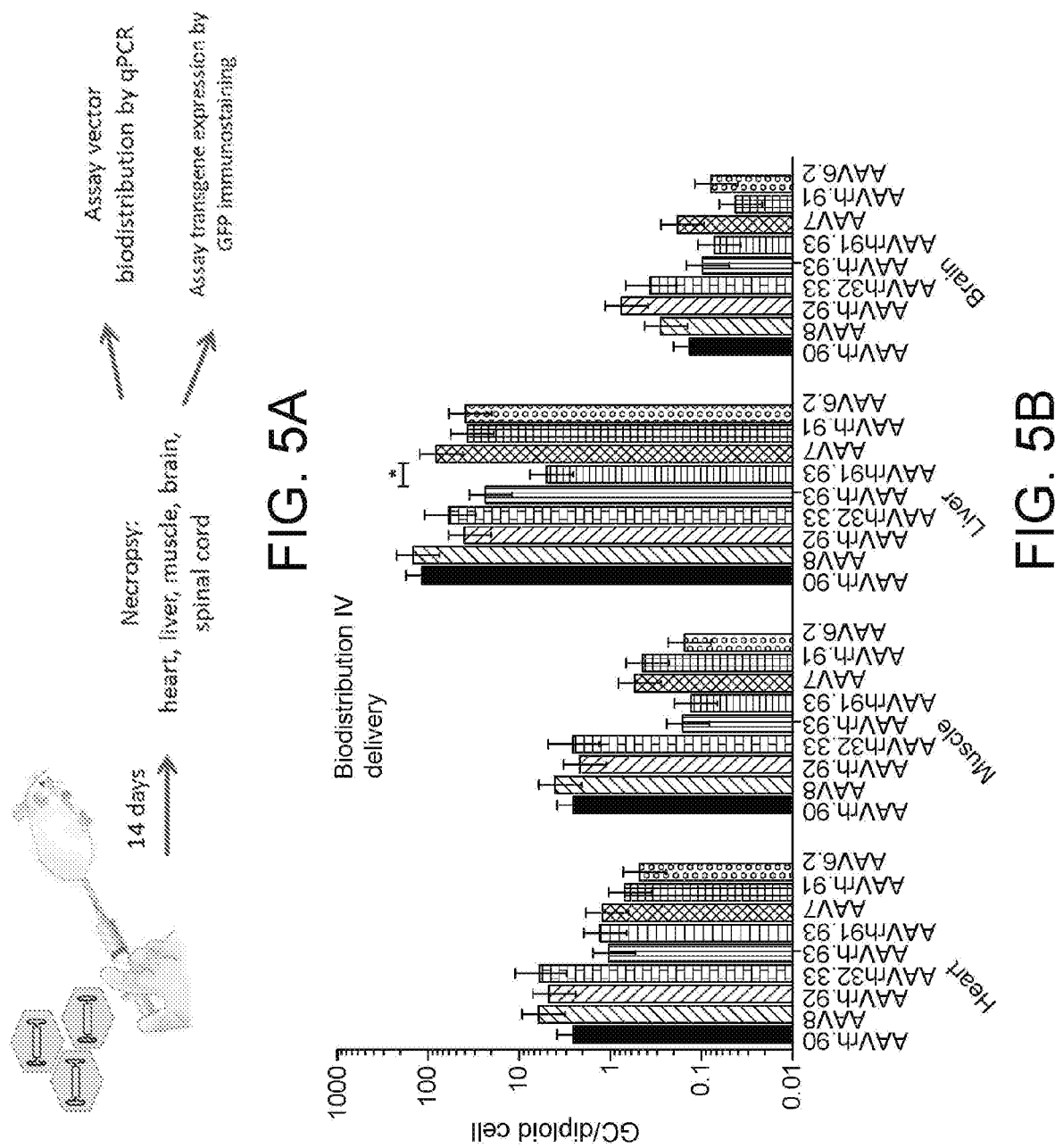

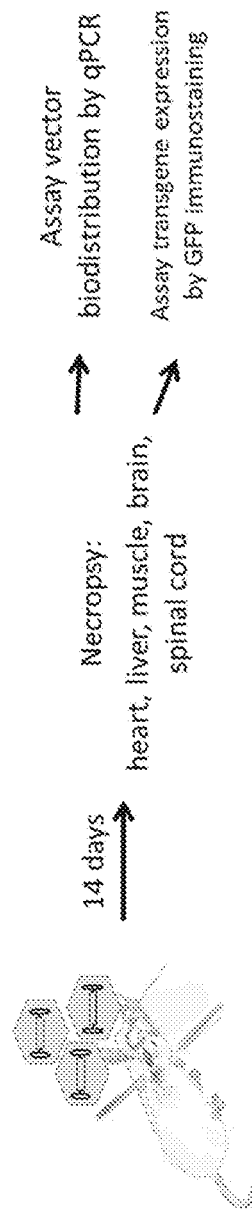
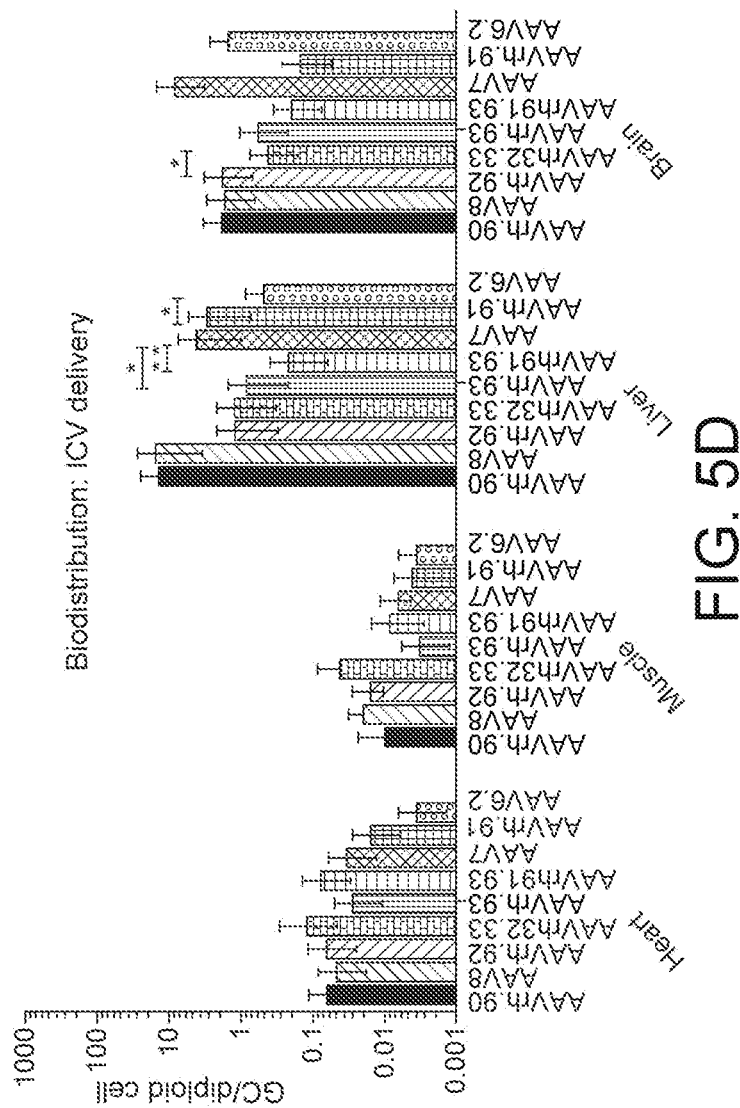
FIG. 5C
FIG. 5D

FIG. 8

| capsid | yield (% AAV8) (mAb transgene) | yield (% AAV8) (LacZ transgene) | Source |
| --- | --- | --- | --- |
| AAV8 | 100% | 100% | Natural isolate |
| AAVhu68 | 76% | 89% | Natural isolate |
| AAV1 | 26% | 28% | Natural isolate |
| AAV6 | 27% | 28% | Natural isolate |
| AAVrh90 | 105% | 118% | Natural isolate |
| AAVrh91 | 53% | 74% | Natural isolate |
| AAVrh92 | 68% | 102% | Natural isolate |

- 2-Frontal Ctx
- 5-Frontal, Temp Ctx, Striatum
- 7-Temp Ctx, Striatum, Thalamus, Hippo
- 8A-Frontal/Parietal Ctx
- 8B-Temp Ctx, Thalamus, Hippo
- 9-Temp Ctx, Thalamus, Hippo
- 12-1 Occipital Ctx

FIG. 15B

| | | WL2656S | WL2259S | WL2655S | WL2491R |
|---|---|---|---|---|---|
| Enzyme | N+1 | Trypsin-4hr | Trypsin-4hr | Trypsin-4hr | Trypsin-4hr |
| % Coverage | | 90.6 | 92.8 | 91.8 | 100.0 |
| N35+Deamidation | | | | 0.8 | 0.0 |
| N57+Deamidation | G | 85.1 | 85.6 | 86.3 | 87.0 |
| N94+Deamidation | H | 4.3 | 4.0 | 3.3 | 3.5 |
| N303+Deamidation | NNN | 8.6 | 9.4 | 12.0 | 9.6 |
| ~N335+Deamidation | N | | | | 0.0 |
| N383+Deamidation | G | Missed | 91.7 | 90.6 | 95.5 |
| N497+Deamidation | NNN | 9.6 | 10.0 | 12.3 | 10.5 |
| N512+Deamidation | G | 87.5 | 91.3 | 88.3 | 86.4 |
| Q646+Deamidation | | | | 0.0 | |
| ~N691+Deamidation | S | 5.1 | 5.8 | 4.7 | 5.6 |
| S149+Phosphorylation | | 5.8 | 6.0 | 5.6 | 4.9 |
| ~W22+Oxidation | | | 1.2 | | |
| ~M211+Oxidation | | 0.1 | | | 0.0 |
| W247+Oxidation | | 4.9 | | 0.5 | |
| M403+Oxidation | | | 4.8 | 2.5 | 2.5 |
| M435+Oxidation | | 0.1 | 0.0 | 0.0 | 0.0 |
| M471+Oxidation | | 1.4 | 5.0 | | |
| W478+Oxidation | | 3.1 | | 0.6 | |
| W503+Oxidation | | 0.8 | 0.2 | | 0.7 |
| ~M537+Oxidation | | 4.4 | | 6.5 | 4.9 |
| ~M541+Oxidation | | 5.1 | | | |
| ~M559+Oxidation | | 2.7 | 0.3 | | 1.7 |
| ~M599+Oxidation | | 0.5 | | | |
| M635+Oxidation | | 6.9 | 9.0 | 7.6 | 7.0 |
| W695+Oxidation | | 0.2 | 0.5 | 0.9 | 0.5 |

| Lot # | Vector Name |
|---|---|
| WL2655S | AAVrh91.tMCK.3D6.mIgG2a.rBG (p0093; p5229) |
| WL2656S | AAVrh91.CMV.LacZ.bGH (p0093; p0102) |
| WL2259S | AAVrh91.CB7.CI.eGFP.WPRE.rBG(p0093;p1963) |
| WL2491R(HIT) | AAVrh91sc.CB8.eGFPmut.BC09.SV40(p0093;p4765) |

AAV CAPSIDS AND COMPOSITIONS CONTAINING SAME

CROSS-REFERENCE TO RELATED APPLICATIONS

This application is a National Stage Entry under 35 U.S.C. 371 of International Patent Application No. PCT/US2020/030266, filed Apr. 28, 2020, which claims priority to U.S. Provisional Patent Application No. 62/840,184, filed Apr. 29, 2019, U.S. Provisional Patent Application No. 62/913,314, filed Oct. 10, 2019, and U.S. Provisional Patent Application No. 62/924,095, filed Oct. 21, 2019, which are incorporated herein by reference.

BACKGROUND OF THE INVENTION

Adeno-associated viruses (AAV) hold great promise in human gene therapy and have been widely used to target liver, muscle, heart, brain, eye, kidney, and other tissues in various studies due to their ability to provide long-term gene expression and lack of pathogenicity. AAVs belong to the parvovirus family and each contains a single strand DNA flanked by two inverted terminal repeats. Dozens of naturally occurring AAV capsids have been reported; their unique capsid structures enable them to recognize and transduce different cell types and organs.

Since the first trial started in 1981, there has not been any vector-related toxicity reported in clinical trials of AAV vector-based gene therapy. The ever-accumulating safety records of AAV vectors in clinical trials, combined with demonstrated efficacy, show that AAV is a promising platform for gene delivery. Another attractive feature is that AAV is relatively easily manipulated since it is a single-stranded DNA virus with a small genome (~4.7 kb) and simple genetic components—inverted terminal repeats (ITRs) along with the Rep and Cap genes. Only the ITRs and AAV capsid protein are required in AAV vectors, with the ITRs serving as replication and packaging signals for vector production and the capsid proteins not only forming a capsid to accommodate vector genome DNA, but determining tissue tropism to deliver the vector genome into target cells and tissues.

AAVs are among the most effective vector candidates for gene therapy due to their low immunogenicity and non-pathogenic nature. However, despite allowing for efficient gene transfer, the AAV vectors currently used in the clinic can be hindered by preexisting immunity to the virus and restricted tissue tropism. New and more effective AAV vectors are needed.

SUMMARY OF THE INVENTION

In one embodiment, provided herein is a recombinant adeno-associated virus (rAAV) having an AAV capsid comprising a capsid protein comprising the amino acid sequence of SEQ ID NO: 2 (AAVrh.91), and having packaged in the capsid a vector genome comprising a heterologous nucleic acid sequence. In certain embodiments, the rAAV has a capsid comprising capsid proteins produced by expression of the AAV capsid sequence of SEQ ID NO: 1 or 3, or a sequence sharing at least 90%, at least 95%, at least 97%, at least 98% or at least 99% identity with SEQ ID NO: 1 or 3, and having packaged in the capsid a vector genome comprising a heterologous nucleic acid sequence.

In certain embodiments, provided herein is an rAAV, wherein the AAV capsid comprises AAV capsid proteins comprising: (1) a heterogeneous population of AAVrh.91 vp1 proteins selected from: vp1 proteins produced by expression from a nucleic acid sequence which encodes the predicted amino acid sequence of 1 to 736 of SEQ ID NO: 2, vp1 proteins produced from SEQ ID NO: 1 or 3, or vp1 proteins produced from a nucleic acid sequence at least 70% identical to SEQ ID NO: 1 or 3 which encodes the predicted amino acid sequence of 1 to 736 of SEQ ID NO: 2; a heterogeneous population of AAVrh.91 vp2 proteins selected from: vp2 proteins produced by expression from a nucleic acid sequence which encodes the predicted amino acid sequence of at least about amino acids 138 to 736 of SEQ ID NO: 2, vp2 proteins produced from a sequence comprising at least nucleotides 412 to 2208 of SEQ ID NO: 1 or 3, or vp2 proteins produced from a nucleic acid sequence at least 70% identical to at least nucleotides 412 to 2208 of SEQ ID NO: 1 or 3 which encodes the predicted amino acid sequence of at least about amino acids 138 to 736 of SEQ ID NO: 2, a heterogeneous population of AAVrh.91 vp3 proteins selected from: vp3 proteins produced by expression from a nucleic acid sequence which encodes the predicted amino acid sequence of at least about amino acids 203 to 736 of SEQ ID NO: 2, vp3 proteins produced from a sequence comprising at least nucleotides 607 to 2208 of SEQ ID NO: 1 or 3, or vp3 proteins produced from a nucleic acid sequence at least 70% identical to at least nucleotides 607 to 2208 of SEQ ID NO: 1 or 3 which encodes the predicted amino acid sequence of at least about amino acids 203 to 736 of SEQ ID NO: 2; and/or (2) a heterogeneous population of vp1 proteins which are the product of a nucleic acid sequence encoding the amino acid sequence of SEQ ID NO: 2, a heterogeneous population of vp2 proteins which are the product of a nucleic acid sequence encoding the amino acid sequence of at least about amino acids 138 to 736 of SEQ ID NO: 2, and a heterogeneous population of vp3 proteins which are the product of a nucleic acid sequence encoding at least amino acids 203 to 736 of SEQ ID NO: 2, wherein: the vp1, vp2 and vp3 proteins contain subpopulations with amino acid modifications comprising at least two highly deamidated asparagines (N) in asparagine-glycine pairs in SEQ ID NO: 2 and optionally further comprising subpopulations comprising other deamidated amino acids, wherein the deamidation results in an amino acid change.

In another embodiment, provided herein is a composition comprising at least a rAAV and a physiologically compatible carrier, buffer, adjuvant, and/or diluent. In certain embodiments, the composition is formulated for intrathecal delivery and the vector genome comprises a nucleic acid sequence encoding a gene product for delivery to the central nervous system. In yet another embodiment, the composition is formulated for intravenous delivery, intranasal, and/or intramuscular delivery.

In certain embodiments, a system useful for producing a rAAV is provided. The system comprises: (a) a nucleic acid sequence encoding the amino acid sequence of SEQ ID NO: 2; (b) a nucleic acid molecule suitable for packaging into an AAV capsid, wherein the nucleic acid molecule comprises at least one AAV inverted terminal repeat (ITR) and a non-AAV nucleic acid sequence encoding a gene product operably linked to sequences which direct expression of the product in a host cell; and (c) sufficient AAV rep functions and helper functions to permit packaging of the nucleic acid molecule into the rAAV capsid.

In certain embodiments, a method of generating a rAAV comprising an AAV capsid is provided. The method comprises the steps of culturing a host cell containing: (a) a nucleic acid molecule encoding an AAV capsid protein comprising the amino acid sequence of SEQ ID NO: 2; (b) a functional rep gene; (c) a minigene comprising a AAV 5' ITR, a AAV 3' ITR, and a transgene; and (d) sufficient helper functions to permit packaging of the minigene into an AAV capsid.

In yet another embodiment, a host cell containing a rAAV, expression cassette, or nucleic acid molecule described herein is provided.

In certain embodiments, a method of delivering a transgene to a cell is provided. The method includes the step of contacting the cell with an rAAV as described herein, wherein the rAAV comprises the transgene.

Other aspects and advantages of these compositions and methods are described further in the following detailed description.

BRIEF DESCRIPTION OF THE FIGURES

Figure 3D:
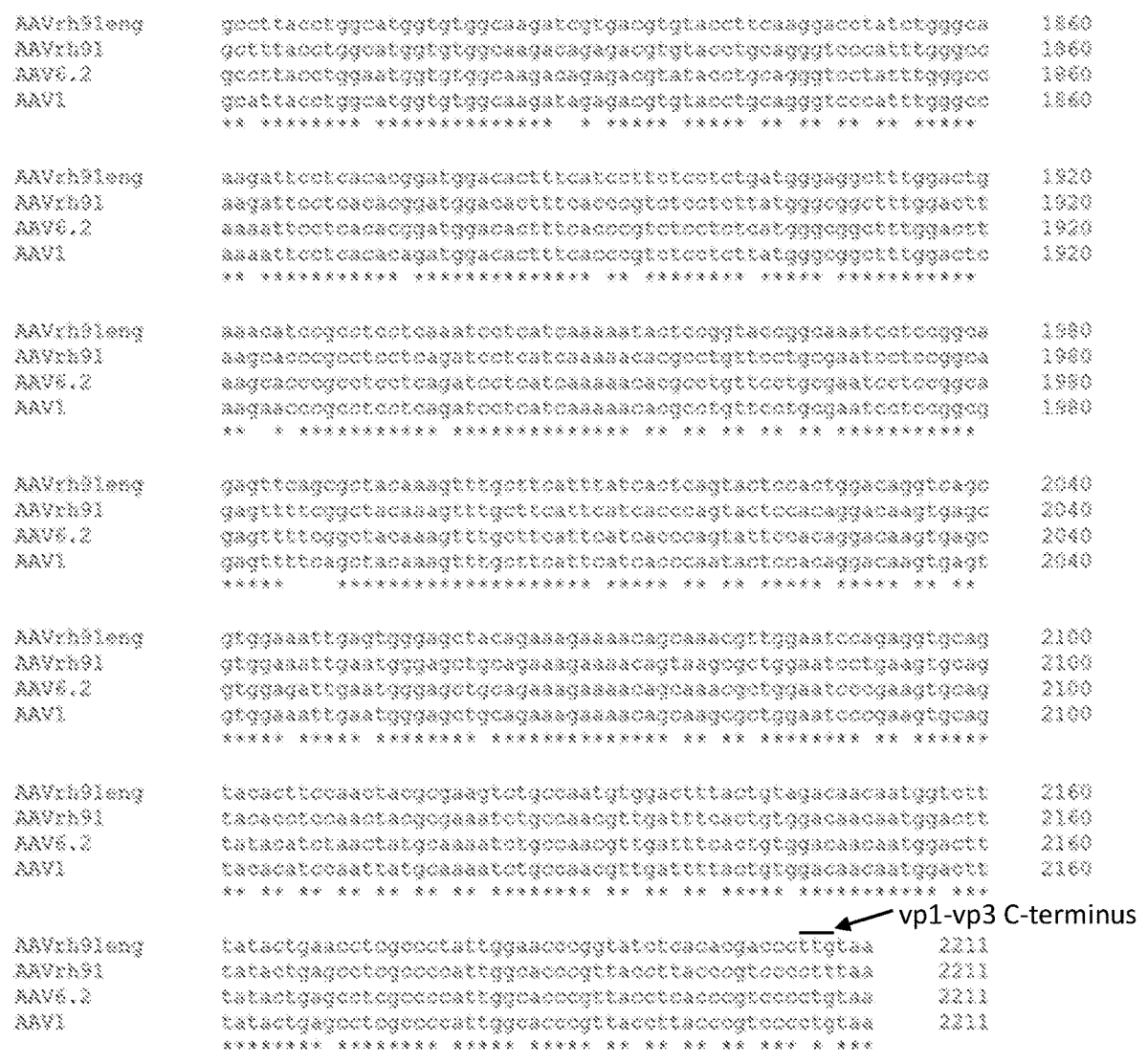

FIG. 3A-FIG. 3D show an alignment for nucleic acid sequences for AAVrh.91 (SEQ ID NO: 1), AAVrh.91eng (SEQ ID NO: 3), AAV6.2 (SEQ ID NO: 5), and AAV1 (SEQ ID NO: 7) capsids.

FIG. 4A and FIG. 4B show an alignment of the amino acid sequences for AAVrh.91 (SEQ ID NO: 2), AAV6.2 (SEQ ID NO: 6), and AAV1 (SEQ ID NO: 8) capsids.

FIG. 5A-FIG. 5D show eGFP transgene biodistribution in mouse tissues 14 days post injection. (FIG. 5A and FIG. 5B) C57BL/6 mice were injected IV at a dose of 1e12 GC per mouse with AAV capsids containing CB7.CI.eGFP.WPRE.RBG (n=5). (FIG. 5C and FIG. 5D) C57BL/6 mice were injected intracerebroventricularly ICV at a dose of 1e11 GC per mouse with various AAV capsids (clade A vectors dosed at 6.9e10 GC/mouse) containing CB7.CI.eGFP.WPRE.RBG (n=5). Values are expressed as mean±SD; *p<0.01, **p<0.001.

FIG. 8 shows yields (relative to AAV8) for vectors expressing 3D6 or LacZ transgenes.

FIG. 15A-FIG. 15B show results of mass spectrometry analysis of AAVrh.91 vector preparations.

DETAILED DESCRIPTION OF THE INVENTION

Figure 1:
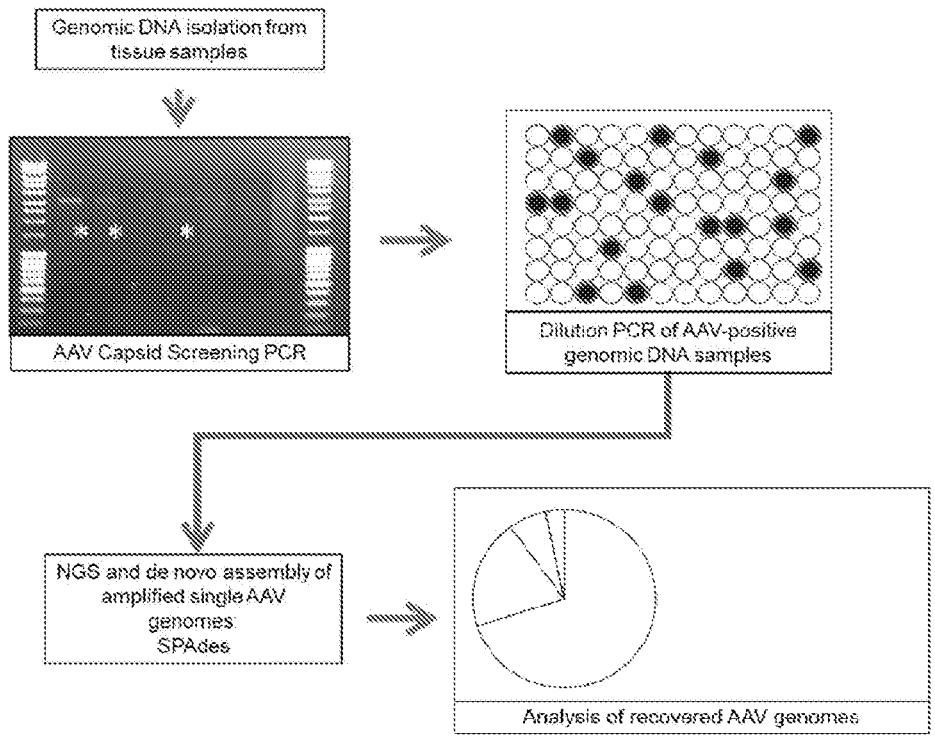
FIG. 1 shows a diagram for an AAV-SGA workflow. Genomic DNA was isolated from rhesus macaque tissue samples and screened for the presence of AAV capsid genes. AAV-positive DNA was endpoint diluted and subjected to a further round of PCR. According to a Poisson distribution, the DNA dilution that yields PCR products in no more than 30% of wells contains one amplifiable DNA template per positive PCR 80% of the time. Positive amplicons were sequenced using the Illumina MiSeq 2×150 or 2×250 paired end sequencing platforms and resulting reads were de novo assembled using the SPAdes assembler.

The genetic variation of AAVs in their natural mammalian hosts was explored by using AAV single genome amplification, a technique used to accurately isolate individual AAV genomes from within a viral population (FIG. 1). Described herein is the isolation of novel AAV sequences from rhesus macaque tissues that can be categorized in various clades. We assessed the biological properties of the natural isolate-derived AAV vectors in mice after intravenous (IV) and intracerebroventricular (ICV) delivery, and in NHP following IV and intra-cisterna magna (ICM) delivery. The results identified both clade-specific and variable transduction patterns of the new AAV variants when compared to their prototypical clade member controls.

Provided herein is a recombinant AAVrh.91 vector having an AAVrh.91 capsid and a nucleic acid encoding a transgene under the control of regulatory sequences, which direct expression thereof following delivery to a subject. The rAAVrh.91 capsid contains proteins independently having the amino acid sequence of SEQ ID NO: 2. Compositions containing these vectors are provided. The methods described herein are directed to use of rAAV to target tissues of interest for treatment of various conditions.

In certain embodiments, provided herein is a vector comprising an AAVrh.91 capsid well suited for delivery to the central nervous system. In certain embodiments, intrathecal delivery is desired, including, e.g., delivery to the brain via ICM delivery. In certain embodiments, vectors comprising the AAVrh.91 capsid are well suited for delivery to the heart (smooth muscle). In other embodiments, vectors comprising the AAVrh.91 capsid are well suited for delivery to skeletal (striated) muscle. rAAVrh.91 vectors may be delivered systemically or targeted via a route of administration suitable to target these tissues.

Unless defined otherwise, technical and scientific terms used herein have the same meaning as commonly understood by one of ordinary skill in the art to which this invention belongs and by reference to published texts, which provide one skilled in the art with a general guide to many of the terms used in the present application. The following definitions are provided for clarity only and are not intended to limit the claimed invention. As used herein, the terms "a" or "an", refers to one or more, for example, "a host cell" is understood to represent one or more host cells. As such, the terms "a" (or "an"), "one or more," and "at least one" are used interchangeably herein. As used herein, the term "about" means a variability of 10% from the reference given, unless otherwise specified. While various embodiments in the specification are presented using "comprising" language, under other circumstances, a related embodiment is also intended to be interpreted and described using "consisting of" or "consisting essentially of" language.

With regard to the following description, it is intended that each of the compositions herein described, is useful, in another embodiment, in the methods of the invention. In addition, it is also intended that each of the compositions herein described as useful in the methods, is, in another embodiment, itself an embodiment of the invention.

A "recombinant AAV" or "rAAV" is a DNAse-resistant viral particle containing two elements, an AAV capsid and a vector genome containing at least non-AAV coding sequences packaged within the AAV capsid. Unless otherwise specified, this term may be used interchangeably with the phrase "rAAV vector". The rAAV is a "replication-defective virus" or "viral vector", as it lacks any functional AAV rep gene or functional AAV cap gene and cannot generate progeny. In certain embodiments, the only AAV sequences are the AAV inverted terminal repeat sequences (ITRs), typically located at the extreme 5' and 3' ends of the vector genome in order to allow the gene and regulatory sequences located between the ITRs to be packaged within the AAV capsid.

As used herein, a "vector genome" refers to the nucleic acid sequence packaged inside the rAAV capsid which forms a viral particle. Such a nucleic acid sequence contains AAV inverted terminal repeat sequences (ITRs). In the examples herein, a vector genome contains, at a minimum, from 5' to 3', an AAV 5' ITR, coding sequence(s), and an AAV 3' ITR. In certain embodiments, the ITRs are from AAV2, a different source AAV than the capsid, or other than full-length ITRs may be selected. In certain embodiments, the ITRs are from the same AAV source as the AAV which provides the rep function during production or a transcomplementing AAV. Further, other ITRs may be used. Further, the vector genome contains regulatory sequences which direct expression of the gene products. Suitable components of a vector genome are discussed in more detail herein. The vector genome is sometimes referred to herein as the "minigene".

The term "expression cassette" refers to a nucleic acid molecule which comprises a transgene sequences and regulatory sequences therefore (e.g., promoter, enhancer, polyA), which cassette may be packaged into the capsid of a viral vector (e.g., a viral particle). Typically, such an expression cassette for generating a viral vector contains the transgene sequences flanked by packaging signals of the viral genome and other expression control sequences such as those described herein. For example, for an AAV viral vector, the packaging signals are the 5' inverted terminal repeat (ITR) and the 3' ITR. In certain embodiments, the term "transgene" may be used interchangeably with "expression cassette". In other embodiments, the term "transgene" refers solely to the coding sequences for a selected gene.

A rAAV is composed of an AAV capsid and a vector genome. An AAV capsid is an assembly of a heterogeneous population of vp1, a heterogeneous population of vp2, and a heterogeneous population of vp3 proteins. As used herein when used to refer to vp capsid proteins, the term "heterogeneous" or any grammatical variation thereof, refers to a population consisting of elements that are not the same, for example, having vp1, vp2 or vp3 monomers (proteins) with different modified amino acid sequences.

As used herein, the term "heterogeneous population" as used in connection with vp1, vp2 and vp3 proteins (alternatively termed isoforms), refers to differences in the amino acid sequence of the vp1, vp2 and vp3 proteins within a capsid. The AAV capsid contains subpopulations within the vp1 proteins, within the vp2 proteins and within the vp3 proteins which have modifications from the predicted amino acid residues. These subpopulations include, at a minimum, certain deamidated asparagine (N or Asn) residues. For example, certain subpopulations comprise at least one, two, three or four highly deamidated asparagines (N) positions in asparagine-glycine pairs and optionally further comprising other deamidated amino acids, wherein the deamidation results in an amino acid change and other optional modifications.

As used herein, a "subpopulation" of vp proteins refers to a group of vp proteins which has at least one defined characteristic in common and which consists of at least one group member to less than all members of the reference group, unless otherwise specified. For example, a "subpopulation" of vp1 proteins may be at least one (1) vp1 protein and less than all vp1 proteins in an assembled AAV capsid, unless otherwise specified. A "subpopulation" of vp3 proteins may be one (1) vp3 protein to less than all vp3 proteins in an assembled AAV capsid, unless otherwise specified. For example, vp1 proteins may be a subpopulation of vp proteins; vp2 proteins may be a separate subpopulation of vp proteins, and vp3 are yet a further subpopulation of vp proteins in an assembled AAV capsid. In another example, vp1, vp2 and vp3 proteins may contain subpopulations having different modifications, e.g., at least one, two, three or four highly deamidated asparagines, e.g., at asparagine-glycine pairs. See PCT/US19/019804, filed Feb. 27, 2019, and PCT/US19/019861, filed Feb. 27, 2019, each of which is hereby incorporated by reference.

Unless otherwise specified, highly deamidated refers to at least 45% deamidated, at least 50% deamidated, at least 60% deamidated, at least 65% deamidated, at least 70%, at least 75%, at least 80%, at least 85%, at least 90%, at least 95%, at least 97%, at least 99%, or up to about 100% deamidated at a referenced amino acid position, as compared to the predicted amino acid sequence at the reference amino acid position. Such percentages may be determined using 2D-gel, mass spectrometry techniques, or other suitable techniques.

Without wishing to be bound by theory, the deamidation of at least highly deamidated residues in the vp proteins in the AAV capsid is believed to be primarily non-enzymatic in nature, being caused by functional groups within the capsid protein which deamidate selected asparagines, and to a lesser extent, glutamine residues. Efficient capsid assembly of the majority of deamidation vp1 proteins indicates that either these events occur following capsid assembly or that deamidation in individual monomers (vp1, vp2 or vp3) is well-tolerated structurally and largely does not affect assembly dynamics. Extensive deamidation in the VP1-unique (VP1-u) region (~aa 1-137), generally considered to be located internally prior to cellular entry, suggests that VP deamidation may occur prior to capsid assembly.

Without wishing to be bound by theory, the deamidation of N may occur through its C-terminus residue's backbone nitrogen atom conducts a nucleophilic attack to the Asn's side chain amide group carbon atom. An intermediate ring-closed succinimide residue is believed to form. The succinimide residue then conducts fast hydrolysis to lead to the final product aspartic acid (Asp) or iso aspartic acid (IsoAsp). Therefore, in certain embodiments, the deamidation of asparagine (N or Asn) leads to an Asp or IsoAsp, which may interconvert through the succinimide intermediate e.g., as illustrated below.

aspartic to isoaspartic, about 50:50 aspartic:isoaspartic, or about 1:3 aspartic:isoaspartic, or another selected ratio.

In certain embodiments, one or more glutamine (Q) may deamidates to glutamic acid (Glu), i.e., α-glutamic acid, γ-glutamic acid (Glu), or a blend of α- and γ-glutamic acid, which may interconvert through a common glutarimide intermediate. Any suitable ratio of α- and γ-glutamic acid may be present. For example, in certain embodiments, the ratio may be from 10:1 to 1:10 α to γ, about 50:50 α:γ, or about 1:3 α:γ, or another selected ratio.

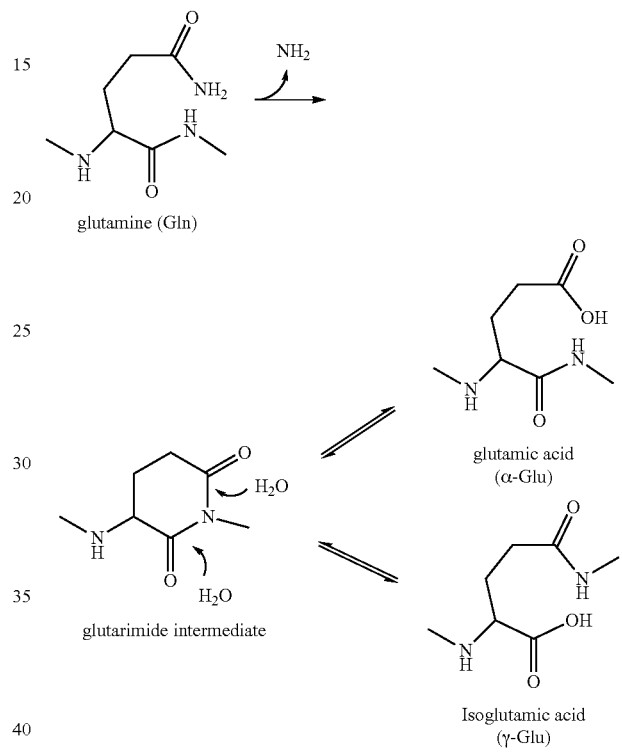

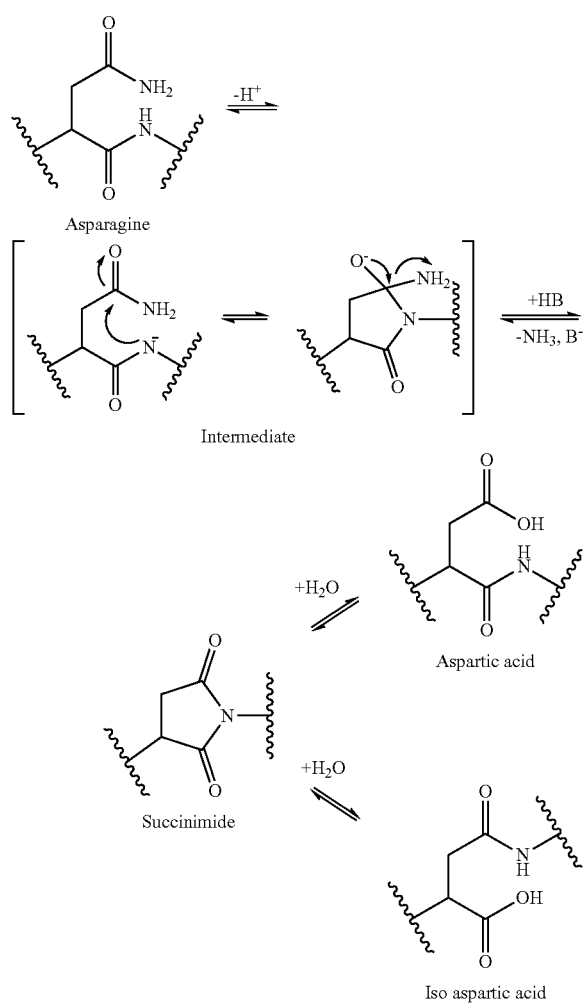

Thus, an rAAV includes subpopulations within the rAAV capsid of vp1, vp2 and/or vp3 proteins with deamidated amino acids, including at a minimum, at least one subpopulation comprising at least one highly deamidated asparagine. In addition, other modifications may include isomerization, particularly at selected aspartic acid (D or Asp) residue positions. In still other embodiments, modifications may include an amidation at an Asp position.

In certain embodiments, an AAV capsid contains subpopulations of vp1, vp2 and vp3 having at least 1, at least 2, at least 3, at least 4, at least 5 to at least about 25 deamidated amino acid residue positions, of which at least 1 to 10%, at least 10 to 25%, at least 25 to 50%, at least 50 to 70%, at least 70 to 100%, at least 75 to 100%, at least 80-100% or at least 90-100% are deamidated as compared to the encoded amino acid sequence of the vp proteins. The majority of these may be N residues. However, Q residues may also be deamidated.

As used herein, "encoded amino acid sequence" refers to the amino acid which is predicted based on the translation of a known DNA codon of a referenced nucleic acid sequence being translated to an amino acid. The following table illustrates DNA codons and twenty common amino acids, showing both the single letter code (SLC) and three letter code (3LC).

As provided herein, each deamidated N in the VP1, VP2 or VP3 may independently be aspartic acid (Asp), isoaspartic acid (isoAsp), aspartate, and/or an interconverting blend of Asp and isoAsp, or combinations thereof. Any suitable ratio of α- and isoaspartic acid may be present. For example, in certain embodiments, the ratio may be from 10:1 to 1:10

| Amino Acid | SLC | 3 LC | DNA codons |
|---|---|---|---|
| Isoleucine | I | Ile | ATT, ATC, ATA |
| Leucine | L | Leu | CTT, CTC, CTA, CTG, TTA, TTG |
| Valine | V | Val | GTT, GTC, GTA, GTG |
| Phenylalanine | F | Phe | TTT, TTC |
| Methionine | M | Met | ATG |
| Cysteine | C | Cys | TGT, TGC |
| Alanine | A | Ala | GCT, GCC, GCA, GCG |
| Glycine | G | Gly | GGT, GGC, GGA, GGG |
| Proline | P | Pro | CCT, CCC, CCA, CCG |
| Threonine | T | Thr | ACT, ACC, ACA, ACG |
| Serine | S | Ser | TCT, TCC, TCA, TCG, AGT, AGC |
| Tyrosine | Y | Tyr | TAT, TAC |
| Tryptophan | W | Trp | TGG |
| Glutamine | Q | Gln | CAA, CAG |
| Asparagine | N | Asn | AAT, AAC |
| Histidine | H | His | CAT, CAC |
| Glutamic acid | E | Glu | GAA, GAG |
| Aspartic acid | D | Asp | GAT, GAC |
| Lysine | K | Lys | AAA, AAG |
| Arginine | R | Arg | CGT, CGC, CGA, CGG, AGA, AGG |
| Stop codons | Stop | | TAA, TAG, TGA |

In certain embodiments, a rAAV has an AAV capsid having vp1, vp2 and vp3 proteins having subpopulations comprising combinations of two, three, four, five or more deamidated residues at the positions set forth in the tables provided herein and incorporated herein by reference.

Deamidation in the rAAV may be determined using 2D gel electrophoresis, and/or mass spectrometry, and/or protein modelling techniques. Online chromatography may be performed with an Acclaim PepMap column and a Thermo UltiMate 3000 RSLC system (Thermo Fisher Scientific) coupled to a Q Exactive HF with a NanoFlex source (Thermo Fisher Scientific). MS data is acquired using a data-dependent top-20 method for the Q Exactive HF, dynamically choosing the most abundant not-yet-sequenced precursor ions from the survey scans (200-2000 m/z). Sequencing is performed via higher energy collisional dissociation fragmentation with a target value of 1e5 ions determined with predictive automatic gain control and an isolation of precursors was performed with a window of 4 m/z. Survey scans were acquired at a resolution of 120,000 at m/z 200. Resolution for HCD spectra may be set to 30,000 at m/z200 with a maximum ion injection time of 50 ms and a normalized collision energy of 30. The S-lens RF level may be set at 50, to give optimal transmission of the m/z region occupied by the peptides from the digest. Precursor ions may be excluded with single, unassigned, or six and higher charge states from fragmentation selection. BioPharma Finder 1.0 software (Thermo Fischer Scientific) may be used for analysis of the data acquired. For peptide mapping, searches are performed using a single-entry protein FASTA database with carbamidomethylation set as a fixed modification; and oxidation, deamidation, and phosphorylation set as variable modifications, a 10-ppm mass accuracy, a high protease specificity, and a confidence level of 0.8 for MS/MS spectra. Examples of suitable proteases may include, e.g., trypsin or chymotrypsin. Mass spectrometric identification of deamidated peptides is relatively straightforward, as deamidation adds to the mass of intact molecule+0.984 Da (the mass difference between —OH and —NH$_2$ groups). The percent deamidation of a particular peptide is determined by mass area of the deamidated peptide divided by the sum of the area of the deamidated and native peptides. Considering the number of possible deamidation sites, isobaric species which are deamidated at different sites may co-migrate in a single peak. Consequently, fragment ions originating from peptides with multiple potential deamidation sites can be used to locate or differentiate multiple sites of deamidation. In these cases, the relative intensities within the observed isotope patterns can be used to specifically determine the relative abundance of the different deamidated peptide isomers. This method assumes that the fragmentation efficiency for all isomeric species is the same and independent on the site of deamidation. It will be understood by one of skill in the art that a number of variations on these illustrative methods can be used. For example, suitable mass spectrometers may include, e.g, a quadrupole time of flight mass spectrometer (QTOF), such as a Waters Xevo or Agilent 6530 or an orbitrap instrument, such as the Orbitrap Fusion or Orbitrap Velos (Thermo Fisher). Suitably liquid chromatography systems include, e.g., Acquity UPLC system from Waters or Agilent systems (1100 or 1200 series). Suitable data analysis software may include, e.g., MassLynx (Waters), Pinpoint and Pepfinder (Thermo Fischer Scientific), Mascot (Matrix Science), Peaks DB (Bioinformatics Solutions). Still other techniques may be described, e.g., in X. Jin et al, Hu Gene Therapy Methods, Vol. 28, No. 5, pp. 255-267, published online Jun. 16, 2017.

In addition to deamidations, other modifications may occur that do not result in conversion of one amino acid to a different amino acid residue. Such modifications may include acetylated residues, isomerizations, phosphorylations, or oxidations.

Modulation of Deamidation: In certain embodiments, the AAV is modified to change the glycine in an asparagine-glycine pair, to reduce deamidation. In other embodiments, the asparagine is altered to a different amino acid, e.g., a glutamine which deamidates at a slower rate; or to an amino acid which lacks amide groups (e.g., glutamine and asparagine contain amide groups); and/or to an amino acid which lacks amine groups (e.g., lysine, arginine and histidine contain amine groups). As used herein, amino acids lacking amide or amine side groups refer to, e.g., glycine, alanine, valine, leucine, isoleucine, serine, threonine, cystine, phenylalanine, tyrosine, or tryptophan, and/or proline. Modifications such as described may be in one, two, or three of the asparagine-glycine pairs found in the encoded AAV amino acid sequence. In certain embodiments, such modifications are not made in all four of the asparagine-glycine pairs. Thus, a method for reducing deamidation of AAV and/or engineered AAV variants having lower deamidation rates. Additionally, or alternatively, one or more other amide amino acids may be changed to a non-amide amino acid to reduce deamidation of the AAV. In certain embodiments, a mutant AAV capsid as described herein contains a mutation in an asparagine-glycine pair, such that the glycine is changed to an alanine or a serine. A mutant AAV capsid may contain one, two or three mutants where the reference AAV natively contains four NG pairs. In certain embodiments, an AAV capsid may contain one, two, three or four such mutants where the reference AAV natively contains five NG pairs. In certain embodiments, a mutant AAV capsid contains only a single mutation in an NG pair. In certain embodiments, a mutant AAV capsid contains mutations in two different NG pairs. In certain embodiments, a mutant AAV capsid contains mutation is two different NG pairs which are located in structurally separate location in the AAV capsid. In certain embodiments, the mutation is not in the VP1-unique region. In certain embodiments, one of the mutations is in the VP1-unique region. Optionally, a mutant AAV capsid contains no modifications in the NG pairs, but contains mutations to minimize or eliminate deamidation in one or more asparagines, or a glutamine, located outside of an NG pair.

In certain embodiments, a method of increasing the potency of a rAAV vector is provided which comprises engineering an AAV capsid which eliminating one or more of the NGs in the wild-type AAV capsid. In certain embodiments, the coding sequence for the "G" of the "NG" is engineered to encode another amino acid. In certain examples below, an "S" or an "A" is substituted. However, other suitable amino acid coding sequences may be selected.

These amino acid modifications may be made by conventional genetic engineering techniques. For example, a nucleic acid sequence containing modified AAV vp codons may be generated in which one to three of the codons encoding glycine in asparagine-glycine pairs are modified to encode an amino acid other than glycine. In certain embodiments, a nucleic acid sequence containing modified asparagine codons may be engineered at one to three of the asparagine-glycine pairs, such that the modified codon encodes an amino acid other than asparagine. Each modified codon may encode a different amino acid. Alternatively, one or more of the altered codons may encode the same amino acid. In certain embodiments, the modified AAVrh.91 nucleic acid sequences is be used to generate a mutant rAAV having a capsid with lower deamidation than the native AAVrh.91 capsid. Such mutant rAAV may have reduced immunogenicity and/or increase stability on storage, particularly storage in suspension form.

Also provided herein are nucleic acid sequences encoding the AAV capsids having reduced deamidation. It is within the skill in the art to design nucleic acid sequences encoding this AAV capsid, including DNA (genomic or cDNA), or RNA (e.g., mRNA). Such nucleic acid sequences may be codon-optimized for expression in a selected system (i.e., cell type) and can be designed by various methods. This optimization may be performed using methods which are available on-line (e.g., GeneArt), published methods, or a company which provides codon optimizing services, e.g., DNA2.0 (Menlo Park, CA). One codon optimizing method is described, e.g., in International Patent Publication No. WO 2015/012924, which is incorporated by reference herein in its entirety. See also, e.g., US Patent Publication No. 2014/0032186 and US Patent Publication No. 2006/0136184. Suitably, the entire length of the open reading frame (ORF) for the product is modified. However, in some embodiments, only a fragment of the ORF may be altered. By using one of these methods, one can apply the frequencies to any given polypeptide sequence and produce a nucleic acid fragment of a codon-optimized coding region which encodes the polypeptide. A number of options are available for performing the actual changes to the codons or for synthesizing the codon-optimized coding regions designed as described herein. Such modifications or synthesis can be performed using standard and routine molecular biological manipulations well known to those of ordinary skill in the art. In one approach, a series of complementary oligonucleotide pairs of 80-90 nucleotides each in length and spanning the length of the desired sequence are synthesized by standard methods. These oligonucleotide pairs are synthesized such that upon annealing, they form double stranded fragments of 80-90 base pairs, containing cohesive ends, e.g., each oligonucleotide in the pair is synthesized to extend 3, 4, 5, 6, 7, 8, 9, 10, or more bases beyond the region that is complementary to the other oligonucleotide in the pair. The single-stranded ends of each pair of oligonucleotides are designed to anneal with the single-stranded end of another pair of oligonucleotides. The oligonucleotide pairs are allowed to anneal, and approximately five to six of these double-stranded fragments are then allowed to anneal together via the cohesive single stranded ends, and then they ligated together and cloned into a standard bacterial cloning vector, for example, a TOPO® vector available from Invitrogen Corporation, Carlsbad, Calif. The construct is then sequenced by standard methods. Several of these constructs consisting of 5 to 6 fragments of 80 to 90 base pair fragments ligated together, i.e., fragments of about 500 base pairs, are prepared, such that the entire desired sequence is represented in a series of plasmid constructs. The inserts of these plasmids are then cut with appropriate restriction enzymes and ligated together to form the final construct. The final construct is then cloned into a standard bacterial cloning vector, and sequenced. Additional methods would be immediately apparent to the skilled artisan. In addition, gene synthesis is readily available commercially.

In certain embodiments, AAV capsids are provided which have a heterogeneous population of AAV capsid isoforms (i.e., VP1, VP2, VP3) which contain multiple highly deamidated "NG" positions. In certain embodiments, the highly deamidated positions are in the locations identified below, with reference to the predicted full-length VP1 amino acid sequence. In other embodiments, the capsid gene is modified such that the referenced "NG" is ablated and a mutant "NG" is engineered into another position.

As used herein, the terms "target cell" and "target tissue" can refer to any cell or tissue which is intended to be transduced by the subject AAV vector. The term may refer to any one or more of muscle, liver, lung, airway epithelium, central nervous system, neurons, eye (ocular cells), or heart. In one embodiment, the target tissue is liver. In another embodiment, the target tissue is the heart. In another embodiment, the target tissue is brain. In another embodiment, the target tissue is muscle.

As used herein, the term "mammalian subject" or "subject" includes any mammal in need of the methods of treatment described herein or prophylaxis, including particularly humans. Other mammals in need of such treatment or prophylaxis include dogs, cats, or other domesticated animals, horses, livestock, laboratory animals, including non-human primates, etc. The subject may be male or female.

As used herein, the term "host cell" may refer to the packaging cell line in which the rAAV is produced from the plasmid. In the alternative, the term "host cell" may refer to the target cell in which expression of the transgene is desired.

A. THE AAV CAPSID

Provided herein is a novel AAV capsid protein having the vp1 sequence set forth in SEQ ID NO: 2. The AAV capsid consists of three overlapping coding sequences, which vary in length due to alternative start codon usage. These variable proteins are referred to as VP1, VP2 and VP3, with VP1 being the longest and VP3 being the shortest. The AAV particle consists of all three capsid proteins at a ratio of ~1:1:10 (VP1:VP2:VP3). VP3, which is comprised in VP1 and VP2 at the N-terminus, is the main structural component that builds the particle. The capsid protein can be referred to using several different numbering systems. For convenience, as used herein, the AAV sequences are referred to using VP1 numbering, which starts with aa 1 for the first residue of VP1. However, the capsid proteins described herein include VP1, VP2 and VP3 (used interchangeably herein with vp1, vp2 and vp3). The numbering of the variable proteins of the capsids are as follows:

Nucleotides (nt)

AAVrh.91: vp1—nt 1 to 2208; vp2—nt 412 to 2208; vp3—nt 607 to 2208 of SEQ ID NO: 1

AAVrh.91eng: vp1—nt 1 to 2208; vp2—nt 412 to 2208; vp3—nt 607 to 2208 of SEQ ID NO: 3

An alignment of the nucleic acid sequences for the capsids described herein is shown in FIG. 3A-FIG. 3D.

Amino Acids (aa)

AAVrh.91 and AAVrh.91eng: aa vp1—1 to 736; vp2—aa 138 to 736; vp3—aa 203 to 736 of SEQ ID NO: 2.

An alignment of the amino acid sequences for the capsids described herein is shown in FIG. 4A and FIG. 4B.

Included herein are rAAV comprising at least one of the vp1, vp2 and the vp3 of AAVrh.91 (SEQ ID NO: 2). Also provided herein are rAAV comprising AAV capsids encoded by at least one of the vp1, vp2 and the vp3 of AAVrh.91 (SEQ ID NO: 1) or AAVrh.91eng (SEQ ID NO: 3).

In one embodiment, a composition is provided which includes a mixed population of recombinant adeno-associated virus (rAAV), each of said rAAV comprising: (a) an AAV capsid comprising about 60 capsid proteins made up of vp1 proteins, vp2 proteins and vp3 proteins, wherein the vp1, vp2 and vp3 proteins are: a heterogeneous population of vp1 proteins which are produced from a nucleic acid sequence encoding a selected AAV vp1 amino acid sequence, a heterogeneous population of vp2 proteins which are produced from a nucleic acid sequence encoding a selected AAV vp2 amino acid sequence, a heterogeneous population of vp3 proteins which produced from a nucleic acid sequence encoding a selected AAV vp3 amino acid sequence, wherein: the vp1, vp2 and vp3 proteins contain subpopulations with amino acid modifications comprising at least two highly deamidated asparagines (N) in asparagine-glycine pairs in the AAV capsid and optionally further comprising subpopulations comprising other deamidated amino acids, wherein the deamidation results in an amino acid change; and (b) a vector genome in the AAV capsid, the vector genome comprising a nucleic acid molecule comprising AAV inverted terminal repeat sequences and a non-AAV nucleic acid sequence encoding a product operably linked to sequences which direct expression of the product in a host cell.

In certain embodiments, the deamidated asparagines are deamidated to aspartic acid, isoaspartic acid, an interconverting aspartic acid/isoaspartic acid pair, or combinations thereof. In certain embodiments, the capsid further comprises deamidated glutamine(s) which are deamidated to (α)-glutamic acid, γ-glutamic acid, an interconverting (α)-glutamic acid/γ-glutamic acid pair, or combinations thereof.

In certain embodiments, a novel isolated AAVrh.91 capsid is provided. A nucleic acid sequence encoding the AAVrh.91 capsid is provided in SEQ ID NO: 1 and the encoded amino acid sequence is provided in SEQ ID NO: 2. Provided herein is an rAAV comprising at least one of the vp1, vp2 and the vp3 of AAVrh.91 (SEQ ID NO: 2). Also provided herein are rAAV comprising an AAV capsid encoded by at least one of the vp1, vp2 and the vp3 of AAVrh.91 (SEQ ID NO: 1). In yet another embodiment, a nucleic acid sequence encoding the AAVrh.91 amino acid sequence is provided in SEQ ID NO: 3 and the encoded amino acid sequence is provided in SEQ ID NO: 2. Also provided herein are rAAV comprising an AAV capsid encoded by at least one of the vp1, vp2 and the vp3 of AAVrh.91eng (SEQ ID NO: 3). In certain embodiments, the vp1, vp2 and/or vp3 is the full-length capsid protein of AAVrh.91 (SEQ ID NO: 2). In other embodiments, the vp1, vp2 and/or vp3 has an N-terminal and/or a C-terminal truncation (e.g. truncation(s) of about 1 to about 10 amino acids).

In a further aspect, a recombinant adeno-associated virus (rAAV) is provided which comprises: (A) an AAVrh.91 capsid comprising one or more of: (1) AAVrh.91 capsid proteins comprising: a heterogeneous population of AAVrh.91 vp1 proteins selected from: vp1 proteins produced by expression from a nucleic acid sequence which encodes the predicted amino acid sequence of 1 to 736 of SEQ ID NO: 2, vp1 proteins produced from SEQ ID NO: 1, or vp1 proteins produced from a nucleic acid sequence at least 70% identical to SEQ ID NO: 1 which encodes the predicted amino acid sequence of 1 to 736 of SEQ ID NO: 2, a heterogeneous population of AAVrh.91 vp2 proteins selected from: vp2 proteins produced by expression from a nucleic acid sequence which encodes the predicted amino acid sequence of at least about amino acids 138 to 736 of SEQ ID NO: 2, vp2 proteins produced from a sequence comprising at least nucleotides 412 to 2208 of SEQ ID NO: 1, or vp2 proteins produced from a nucleic acid sequence at least 70% identical to at least nucleotides 412 to 2208 of SEQ ID NO: 1 which encodes the predicted amino acid sequence of at least about amino acids 138 to 736 of SEQ ID NO: 2, a heterogeneous population of AAVrh.91 vp3 proteins selected from: vp3 proteins produced by expression from a nucleic acid sequence which encodes the predicted amino acid sequence of at least about amino acids 203 to 736 of SEQ ID NO: 2, vp3 proteins produced from a sequence comprising at least nucleotides 607 to 2208 of SEQ ID NO: 1, or vp3 proteins produced from a nucleic acid sequence at least 70% identical to at least nucleotides 607 to 2208 of SEQ ID NO: 1 which encodes the predicted amino acid sequence of at least about amino acids 203 to 736 of SEQ ID NO: 1; and/or (2) a heterogeneous population of vp1 proteins which are the product of a nucleic acid sequence encoding the amino acid sequence of SEQ ID NO: 2, a heterogeneous population of vp2 proteins which are the product of a nucleic acid sequence encoding the amino acid sequence of at least about amino acids 138 to 736 of SEQ ID NO: 2, and a heterogeneous population of vp3 proteins which are the product of a nucleic acid sequence encoding at least amino acids 203 to 736 of SEQ ID NO: 2, wherein: the vp1, vp2 and vp3 proteins contain subpopulations with amino acid modifications comprising at least two highly deamidated asparagines (N) in asparagine-glycine pairs in SEQ ID NO: 2 and optionally further comprising subpopulations comprising other deamidated amino acids, wherein the deamidation results in an amino acid change; and (B) a vector genome in the AAVrh.91 capsid, the vector genome comprising a nucleic acid molecule comprising AAV inverted terminal repeat sequences and a non-AAV nucleic acid sequence encoding a product operably linked to sequences which direct expression of the product in a host cell.

In yet another aspect, a recombinant adeno-associated virus (rAAV) is provided which comprises: (A) an AAVrh.91 capsid comprising one or more of: (1) AAVrh.91 capsid proteins comprising: a heterogeneous population of AAVrh.91 vp1 proteins selected from: vp1 proteins produced by expression from a nucleic acid sequence which encodes the predicted amino acid sequence of 1 to 736 of SEQ ID NO: 2, vp1 proteins produced from SEQ ID NO: 3, or vp1 proteins produced from a nucleic acid sequence at least 70% identical to SEQ ID NO: 3 which encodes the predicted amino acid sequence of 1 to 736 of SEQ ID NO:

2, a heterogeneous population of AAVrh.91 vp2 proteins selected from: vp2 proteins produced by expression from a nucleic acid sequence which encodes the predicted amino acid sequence of at least about amino acids 138 to 736 of SEQ ID NO: 2, vp2 proteins produced from a sequence comprising at least nucleotides 412 to 2208 of SEQ ID NO: 3, or vp2 proteins produced from a nucleic acid sequence at least 70% identical to at least nucleotides 412 to 2208 of SEQ ID NO: 3 which encodes the predicted amino acid sequence of at least about amino acids 138 to 736 of SEQ ID NO: 2, a heterogeneous population of AAVrh.91 vp3 proteins selected from: vp3 proteins produced by expression from a nucleic acid sequence which encodes the predicted amino acid sequence of at least about amino acids 203 to 736 of SEQ ID NO: 2, vp3 proteins produced from a sequence comprising at least nucleotides 607 to 2208 of SEQ ID NO: 3, or vp3 proteins produced from a nucleic acid sequence at least 70% identical to at least nucleotides 607 to 2208 of SEQ ID NO: 3 which encodes the predicted amino acid sequence of at least about amino acids 203 to 736 of SEQ ID NO: 2; and/or (2) a heterogeneous population of vp1 proteins which are the product of a nucleic acid sequence encoding the amino acid sequence of SEQ ID NO: 2, a heterogeneous population of vp2 proteins which are the product of a nucleic acid sequence encoding the amino acid sequence of at least about amino acids 138 to 736 of SEQ ID NO: 2, and a heterogeneous population of vp3 proteins which are the product of a nucleic acid sequence encoding at least amino acids 203 to 736 of SEQ ID NO: 2, wherein: the vp1, vp2 and vp3 proteins contain subpopulations with amino acid modifications comprising at least two highly deamidated asparagines (N) in asparagine-glycine pairs in SEQ ID NO: 2 and optionally further comprising subpopulations comprising other deamidated amino acids, wherein the deamidation results in an amino acid change; and (B) a vector genome in the AAVrh.91 capsid, the vector genome comprising a nucleic acid molecule comprising AAV inverted terminal repeat sequences and a non-AAV nucleic acid sequence encoding a product operably linked to sequences which direct expression of the product in a host cell.

In certain embodiments, the AAVrh.91 vp1, vp2 and vp3 proteins contain subpopulations with amino acid modifications comprising at least two highly deamidated asparagines (N) in asparagine-glycine pairs in SEQ ID NO: 2 and optionally further comprising subpopulations comprising other deamidated amino acids, wherein the deamidation results in an amino acid change. High levels of deamidation at N-G pairs N57, N383 and/or N512 are observed, relative to the number of SEQ ID NO: 2. Deamidation has been observed in other residues, as shown in the table below and in FIG. 15B. In certain embodiments, AAVrh.91 may have other residues deamidated, e.g., typically at less than 10% and/or may have other modifications, including phosphorylation (e.g., where present, in the range of about 2 to about 30%, or about 2 to about 20%, or about 2 to about 10%) (e.g., at S149), or oxidation (e.g, at one or more of ~W22, ~M211, W247, M403, M435, M471, W478, W503, ~M537, ~M541, ~M559, ~M599, M635, and/or, W695). Optionally the W may oxidize to kynurenine.

TABLE

AAVrh.91 Deamidation

| AAVrh.91 Deamidation based on VP1 numbering | % Deamidation |
|---|---|
| N57 + Deamidation | 65-90, 70-95, 80-95, 75-100, 80-100, or 90-100 |
| N94 + Deamidation | 2-15 or 2-5 |
| N303 + Deamidation | 2-15 or 5-10 |
| N383 + Deamidation | 65-90, 70-95, 80-95, 75-100, 80-100, or 90-100 |
| N497 + Deamidation | 2-15 or 5-10 |
| N512 + Deamidation | 65-90, 70-95, 80-95, 75-100, 80-100, or 90-100 |
| ~N691 + Deamidation | 2-15, 2-10, or 5-10 |

In certain embodiments, an AAVrh.91 capsid is modified in one or more of the positions identified in the preceding table, in the ranges provided, as determined using mass spectrometry with a trypsin enzyme. In certain embodiments, one or more of the positions, or the glycine following the N is modified as described herein. Residue numbers are based on the AAVrh.91 sequence provided herein. See, SEQ ID NO: 2.

In certain embodiments, an AAVrh.91 capsid comprises: a heterogeneous population of vp1 proteins which are the product of a nucleic acid sequence encoding the amino acid sequence of SEQ ID NO: 2, a heterogeneous population of vp2 proteins which are the product of a nucleic acid sequence encoding the amino acid sequence of at least about amino acids 138 to 736 of SEQ ID NO: 2, and a heterogeneous population of vp3 proteins which are the product of a nucleic acid sequence encoding at least amino acids 203 to 736 of SEQ ID NO: 2.

In certain embodiments, the nucleic acid sequence encoding the AAVrh.91 vp1 capsid protein is provided in SEQ ID NO: 1. In other embodiments, a nucleic acid sequence of 70% to 99.9% identity to SEQ ID NO: 1 may be selected to express the AAVrh.91 capsid proteins. In certain other embodiments, the nucleic acid sequence is at least about 75% identical, at least 80% identical, at least 85%, at least 90%, at least 95%, at least 97% identical, or at least 99% to 99.9% identical to SEQ ID NO: 1. However, other nucleic acid sequences which encode the amino acid sequence of SEQ ID NO: 2 may be selected for use in producing rAAV capsids. In certain embodiments, the nucleic acid sequence has the nucleic acid sequence of SEQ ID NO: 1 or a sequence at least 70% to 99.9% identical, at least 75%, at least 80%, at least 85%, at least 90%, at least 95%, at least 97%, or at least 99% identical to SEQ ID NO: 1 which encodes SEQ ID NO: 2. In certain embodiments, the nucleic acid sequence has the nucleic acid sequence of SEQ ID NO: 1 or a sequence at least 70% to 99.9%, at least 75%, at least 80%, at least 85%, at least 90%, at least 95%, at least 97%, or at least 99% identical to about nt 412 to about nt 2208 of SEQ ID NO: 1 which encodes the vp2 capsid protein (about aa 138 to 736) of SEQ ID NO: 2. In certain embodiments, the nucleic acid sequence has the nucleic acid sequence of about nt 607 to about nt 2208 of SEQ ID NO: 1 or a sequence at least 70% to 99.9%, at least 75%, at least 80%, at least 85%, at least 90%, at least 95%, at least 97%, or at least 99% identical to nt 607 to about nt 2208 SEQ ID NO: 1 which encodes the vp3 capsid protein (about aa 203 to 736) of SEQ ID NO: 2.

In certain embodiments, the nucleic acid sequence encoding the AAVrh.91 vp1 capsid protein is provided in SEQ ID NO: 3. In other embodiments, a nucleic acid sequence of 70% to 99.9% identity to SEQ ID NO: 3 may be selected to express the AAVrh.91 capsid proteins. In certain other embodiments, the nucleic acid sequence is at least about 75% identical, at least 80% identical, at least 85%, at least 90%, at least 95%, at least 97% identical, or at least 99% to 99.9% identical to SEQ ID NO: 3. However, other nucleic acid sequences which encode the amino acid sequence of SEQ ID NO: 2 may be selected for use in producing rAAV capsids. In certain embodiments, the nucleic acid sequence has the nucleic acid sequence of SEQ ID NO: 3 or a sequence at least 70% to 99.9% identical, at least 75%, at least 80%, at least 85%, at least 90%, at least 95%, at least 97%, or at least 99% identical to SEQ ID NO: 3 which encodes SEQ ID NO: 2. In certain embodiments, the nucleic acid sequence has the nucleic acid sequence of SEQ ID NO: 3 or a sequence at least 70% to 99.9%, at least 75%, at least 80%, at least 85%, at least 90%, at least 95%, at least 97%, or at least 99% identical to about nt 412 to about nt 2208 of SEQ ID NO: 3 which encodes the vp2 capsid protein (about aa 138 to 736) of SEQ ID NO: 2. In certain embodiments, the nucleic acid sequence has the nucleic acid sequence of about nt 607 to about nt 2208 of SEQ ID NO: 3 or a sequence at least 70% to 99.9%, at least 75%, at least 80%, at least 85%, at least 90%, at least 95%, at least 97%, or at least 99% identical to nt 607 to about nt 2208 SEQ ID NO: 3 which encodes the vp3 capsid protein (about aa 203 to 736) of SEQ ID NO: 2.

The invention also encompasses nucleic acid sequences encoding the AAVrh.91 capsid sequence (SEQ ID NO: 2) or a mutant AAVrh.91, in which one or more residues has been altered in order to decrease deamidation, or other modifications which are identified herein. Such nucleic acid sequences can be used in production of mutant AAVrh.91 capsids.

In certain embodiments, provided herein is a nucleic acid molecule having the sequence of SEQ ID NO: 1 or a sequence at least 70%, at least 75%, at least 80%, at least 85%, at least 90%, at least 95%, at least 97%, at least 99% identical to SEQ ID NO: 1 which encodes the vp1 amino acid sequence of SEQ ID NO: 2 with a modification (e.g., deamidated amino acid) as described herein. In certain embodiments, provided herein is a nucleic acid molecule having the sequence of SEQ ID NO: 3 or a sequence at least 70%, at least 75%, at least 80%, at least 85%, at least 90%, at least 95%, at least 97%, at least 99% identical to SEQ ID NO: 3 which encodes the vp1 amino acid sequence of SEQ ID NO: 2 with a modification (e.g., deamidated amino acid) as described herein. In certain embodiments, the vp1 amino acid sequence is reproduced in SEQ ID NO: 2. In certain embodiments, a plasmid having a nucleic acid sequence described herein is provided.

The term "substantial homology" or "substantial similarity," when referring to a nucleic acid, or fragment thereof, indicates that, when optimally aligned with appropriate nucleotide insertions or deletions with another nucleic acid (or its complementary strand), there is nucleotide sequence identity in at least about 95 to 99% of the aligned sequences. Preferably, the homology is over full-length sequence, or an open reading frame thereof, or another suitable fragment which is at least 15 nucleotides in length. Examples of suitable fragments are described herein.

The term "percent (%) identity", "sequence identity", "percent sequence identity", or "percent identical" in the context of nucleic acid sequences refers to the residues in the two sequences which are the same when aligned for correspondence. The length of sequence identity comparison may be over the full-length of the genome, the full-length of a gene coding sequence, or a fragment of at least about 500 to 5000 nucleotides, is desired. However, identity among smaller fragments, e.g. of at least about nine nucleotides, usually at least about 20 to 24 nucleotides, at least about 28 to 32 nucleotides, at least about 36 or more nucleotides, may also be desired.

Percent identity may be readily determined for amino acid sequences over the full-length of a protein, polypeptide, about 32 amino acids, about 330 amino acids, or a peptide fragment thereof or the corresponding nucleic acid sequence coding sequences. A suitable amino acid fragment may be at least about 8 amino acids in length, and may be up to about 700 amino acids. Generally, when referring to "identity", "homology", or "similarity" between two different sequences, "identity", "homology" or "similarity" is determined in reference to "aligned" sequences. "Aligned" sequences or "alignments" refer to multiple nucleic acid sequences or protein (amino acids) sequences, often containing corrections for missing or additional bases or amino acids as compared to a reference sequence.

Identity may be determined by preparing an alignment of the sequences and through the use of a variety of algorithms and/or computer programs known in the art or commercially available [e.g., BLAST, ExPASy; ClustalO; FASTA; using, e.g., Needleman-Wunsch algorithm, Smith-Waterman algorithm]. Alignments are performed using any of a variety of publicly or commercially available Multiple Sequence Alignment Programs. Sequence alignment programs are available for amino acid sequences, e.g., the "Clustal Omega" "Clustal X", "MAP", "PIMA", "MSA", "BLOCK-MAKER", "MEME", and "Match-Box" programs. Generally, any of these programs are used at default settings, although one of skill in the art can alter these settings as needed. Alternatively, one of skill in the art can utilize another algorithm or computer program which provides at least the level of identity or alignment as that provided by the referenced algorithms and programs. See, e.g., J. D. Thomson et al, Nucl. Acids. Res., "A comprehensive comparison of multiple sequence alignments", 27(13):2682-2690 (1999).

Multiple sequence alignment programs are also available for nucleic acid sequences. Examples of such programs include, "Clustal Omega", "Clustal W", "CAP Sequence Assembly", "BLAST", "MAP", and "MEME", which are accessible through Web Servers on the internet. Other sources for such programs are known to those of skill in the art. Alternatively, Vector NTI utilities are also used. There are also a number of algorithms known in the art that can be used to measure nucleotide sequence identity, including those contained in the programs described above. As another example, polynucleotide sequences can be compared using Fasta™, a program in GCG Version 6.1. Fasta™ provides alignments and percent sequence identity of the regions of the best overlap between the query and search sequences. For instance, percent sequence identity between nucleic acid sequences can be determined using Fasta™ with its default parameters (a word size of 6 and the NOPAM factor for the scoring matrix) as provided in GCG Version 6.1, herein incorporated by reference.

B. rAAV VECTORS AND COMPOSITIONS

In another aspect, described herein are molecules which utilize the AAV capsid sequences described herein, including fragments thereof, for production of viral vectors useful in delivery of a heterologous gene or other nucleic acid sequences to a target cell. In one embodiment, the vectors useful in compositions and methods described herein contain, at a minimum, a sequence encoding an AAV capsid as described herein, e.g., an AAVrh.91 capsid, or a fragment thereof. In another embodiment, useful vectors contain, at a minimum, sequences encoding a selected AAV serotype rep protein, or a fragment thereof. Optionally, such vectors may contain both AAV cap and rep proteins. In vectors in which both AAV rep and cap are provided, the AAV rep and AAV cap sequences can both be of one serotype origin, e.g., all an AAVrh.91 origin. Alternatively, vectors may be used in which the rep sequences are from an AAV which differs from the wild type AAV providing the cap sequences. In one embodiment, the rep and cap sequences are expressed from separate sources (e.g., separate vectors, or a host cell and a vector). In another embodiment, these rep sequences are fused in frame to cap sequences of a different AAV serotype to form a chimeric AAV vector, such as AAV2/8 described in U.S. Pat. No. 7,282,199, which is incorporated by reference herein. Optionally, the vectors further contain a minigene comprising a selected transgene which is flanked by AAV 5' ITR and AAV 3' ITR. In another embodiment, the AAV is a self-complementary AAV (sc-AAV) (See, US 2012/0141422 which is incorporated herein by reference). Self-complementary vectors package an inverted repeat genome that can fold into dsDNA without the requirement for DNA synthesis or base-pairing between multiple vector genomes. Because scAAV have no need to convert the single-stranded DNA (ssDNA) genome into double-stranded DNA (dsDNA) prior to expression, they are more efficient vectors. However, the trade-off for this efficiency is the loss of half the coding capacity of the vector, ScAAV are useful for small protein-coding genes (up to ~55 kd) and any currently available RNA-based therapy.

Pseudotyped vectors, wherein the capsid of one AAV is replaced with a heterologous capsid protein, are useful herein. For illustrative purposes, AAV vectors utilizing an AAVrh.91 capsid as described herein, with AAV2 ITRs are used in the examples described below. See, Mussolino et al, cited above. Unless otherwise specified, the AAV ITRs, and other selected AAV components described herein, may be individually selected from among any AAV serotype, including, without limitation, AAV1, AAV2, AAV3, AAV4, AAV5, AAV6, AAV7, AAV8, AAV9 or other known and unknown AAV serotypes. In one desirable embodiment, the ITRs of AAV serotype 2 are used. However, ITRs from other suitable serotypes may be selected. These ITRs or other AAV components may be readily isolated using techniques available to those of skill in the art from an AAV serotype. Such AAV may be isolated or obtained from academic, commercial, or public sources (e.g., the American Type Culture Collection, Manassas, VA). Alternatively, the AAV sequences may be obtained through synthetic or other suitable means by reference to published sequences such as are available in the literature or in databases such as, e.g., GenBank, PubMed, or the like.

The rAAV described herein also comprise a vector genome. The vector genome is composed of, at a minimum, a non-AAV or heterologous nucleic acid sequence (the transgene), as described below, and its regulatory sequences, and 5' and 3' AAV inverted terminal repeats (ITRs). It is this minigene which is packaged into a capsid protein and delivered to a selected target cell.

The transgene is a nucleic acid sequence, heterologous to the vector sequences flanking the transgene, which encodes a polypeptide, protein, or other product, of interest. The nucleic acid coding sequence is operatively linked to regulatory components in a manner which permits transgene transcription, translation, and/or expression in a target cell.

The heterologous nucleic acid sequence (transgene) can be derived from any organism. The AAV may comprise one or more transgenes.

In certain embodiments, provided herein is a rAAVrh.91 vector that includes a transgene comprising a sequence encoding erythropoietin (EPO). In certain embodiments, the transgene encodes a canine or feline EPO gene. Such recombinant vectors are suitable, for example, for use in a regimen for treating chronic kidney disease and other conditions in a subject characterized by a decrease in the amount of circulating red blood cells.

In certain embodiments, provided herein is a rAAVrh.91 vector that includes a transgene comprising a sequence encoding an anti-nerve growth factor (NGF) antibody. In certain embodiments, the transgene encodes a canine or feline anti-NGF antibody. Such recombinant vectors are suitable, for example, for use in a regimen for treating osteoarthritis pain in a subject.

In certain embodiments, provided herein is a rAAVrh.91 vector that includes a transgene comprising a sequence encoding an anti-nerve growth factor (NGF) antibody. In certain embodiments, the transgene encodes a canine or feline anti-NGF antibody. Such recombinant vectors are suitable, for example, for use in a regimen for treating osteoarthritis pain in a subject.

In certain embodiments, provided herein is a rAAVrh.91 vector that includes a transgene comprising a sequence encoding glucagon-like peptide 1 (GLP-1). In certain embodiments, the transgene encodes a canine or feline GLP-1. Such recombinant vectors are suitable, for example, for use in a regimen for treating type II diabetes in a subject.

In certain embodiments, provided herein is a rAAVrh.91 vector that includes a transgene comprising a sequence encoding glucagon-like peptide 1 (GLP-1). In certain embodiments, the transgene encodes a canine or feline GLP-1. Such recombinant vectors are suitable, for example, for use in a regimen for treating type II diabetes in a subject.

In certain embodiments, provided herein is a rAAVrh.91 vector that includes a transgene comprising a sequence encoding insulin. In certain embodiments, the transgene encodes a canine or feline insulin. Such recombinant vectors are suitable, for example, for use in a regimen for treating type I diabetes or type II diabetes in a subject.

In certain embodiments, provided herein is a rAAVrh.91 vector that includes a transgene comprising a sequence encoding an antagonist for IgE, IL-32, or the interleukin-4 receptor alpha (IL-4Rα) subunit of IL-4/IL-13 receptors, including, e.g., antibodies and receptor-IgG fusion proteins. In certain embodiments, the transgene encodes an antagonist for a canine or feline IgE, IL-32, or IL-4Rα subunit. Such recombinant vectors are suitable, for example, for use in a regimen for treating atopic dermatitis in a subject.

The composition of the transgene sequence will depend upon the use to which the resulting vector will be put. For example, one type of transgene sequence includes a reporter sequence, which upon expression produces a detectable signal. Such reporter sequences include, without limitation, DNA sequences encoding β-lactamase, β-galactosidase (LacZ), alkaline phosphatase, thymidine kinase, green fluorescent protein (GFP), enhanced GFP (EGFP), chloramphenicol acetyltransferase (CAT), luciferase, membrane bound proteins including, for example, CD2, CD4, CD8, the influenza hemagglutinin protein, and others well known in the art, to which high affinity antibodies directed thereto exist or can be produced by conventional means, and fusion proteins comprising a membrane bound protein appropriately fused to an antigen tag domain from, among others, hemagglutinin or Myc.

These coding sequences, when associated with regulatory elements which drive their expression, provide signals detectable by conventional means, including enzymatic, radiographic, colorimetric, fluorescence or other spectrographic assays, fluorescent activating cell sorting assays and immunological assays, including enzyme linked immunosorbent assay (ELISA), radioimmunoassay (RIA) and immunohistochemistry. For example, where the marker sequence is the LacZ gene, the presence of the vector carrying the signal is detected by assays for beta-galactosidase activity. Where the transgene is green fluorescent protein or luciferase, the vector carrying the signal may be measured visually by color or light production in a luminometer.

However, desirably, the transgene is a non-marker sequence encoding a product which is useful in biology and medicine, such as proteins, peptides, RNA, enzymes, dominant negative mutants, or catalytic RNAs. Desirable RNA molecules include tRNA, dsRNA, ribosomal RNA, catalytic RNAs, siRNA, small hairpin RNA, trans-splicing RNA, and antisense RNAs. One example of a useful RNA sequence is a sequence which inhibits or extinguishes expression of a targeted nucleic acid sequence in the treated animal. Typically, suitable target sequences include oncologic targets and viral diseases. See, for examples of such targets the oncologic targets and viruses identified below in the section relating to immunogens.

The transgene may be used to correct or ameliorate gene deficiencies, which may include deficiencies in which normal genes are expressed at less than normal levels or deficiencies in which the functional gene product is not expressed. Alternatively, the transgene may provide a product to a cell which is not natively expressed in the cell type or in the host. A preferred type of transgene sequence encodes a therapeutic protein or polypeptide which is expressed in a host cell. The invention further includes using multiple transgenes. In certain situations, a different transgene may be used to encode each subunit of a protein, or to encode different peptides or proteins. This is desirable when the size of the DNA encoding the protein subunit is large, e.g., for an immunoglobulin, the platelet-derived growth factor, or a dystrophin protein. In order for the cell to produce the multi-subunit protein, a cell is infected with the recombinant virus containing each of the different subunits. Alternatively, different subunits of a protein may be encoded by the same transgene. In this case, a single transgene includes the DNA encoding each of the subunits, with the DNA for each subunit separated by an internal ribozyme entry site (IRES). This is desirable when the size of the DNA encoding each of the subunits is small, e.g., the total size of the DNA encoding the subunits and the IRES is less than five kilobases. As an alternative to an IRES, the DNA may be separated by sequences encoding a 2A peptide, which self-cleaves in a post-translational event. See, e.g., M. L. Donnelly, et al, J. Gen. Virol., 78(Pt 1):13-21 (January 1997); Furler, S., et al, Gene Ther., 8(11):864-873 (June 2001); Klump H., et al., Gene Ther., 8(10):811-817 (May 2001). This 2A peptide is significantly smaller than an IRES, making it well suited for use when space is a limiting factor. More often, when the transgene is large, consists of multi-subunits, or two transgenes are co-delivered, rAAV carrying the desired transgene(s) or subunits are co-administered to allow them to concatamerize in vivo to form a single vector genome. In such an embodiment, a first AAV may carry an expression cassette which expresses a single transgene and a second AAV may carry an expression cassette which expresses a different transgene for co-expression in the host cell. However, the selected transgene may encode any biologically active product or other product, e.g., a product desirable for study.

Examples of suitable transgenes or gene products include those associated with familial hypercholesterolemia, muscular dystrophy, cystic fibrosis, and rare or orphan diseases. Examples of such rare disease may include spinal muscular atrophy (SMA), Huntingdon's Disease, Rett Syndrome (e.g., methyl-CpG-binding protein 2 (MeCP2); UniProtKB—P51608), Amyotrophic Lateral Sclerosis (ALS), Duchenne Type Muscular dystrophy, Friedrichs Ataxia (e.g., frataxin), ATXN2 associated with spinocerebellar ataxia type 2 (SCA2)/ALS; TDP-43 associated with ALS, progranulin (PRGN) (associated with non-Alzheimer's cerebral degenerations, including, frontotemporal dementia (FTD), progressive non-fluent aphasia (PNFA) and semantic dementia), among others. See, e.g., www.orpha.net/consor/cgi-bin/Disease_Search_List.php; rarediseases.info.nih.gov/diseases.

Useful therapeutic products encoded by the transgene include hormones and growth and differentiation factors including, without limitation, insulin, glucagon, glucagon-like peptide 1 (GLP-1), growth hormone (GH), parathyroid hormone (PTH), growth hormone releasing factor (GRF), follicle stimulating hormone (FSH), luteinizing hormone (LH), human chorionic gonadotropin (hCG), vascular endothelial growth factor (VEGF), angiopoietins, angiostatin, granulocyte colony stimulating factor (GCSF), erythropoietin (EPO), connective tissue growth factor (CTGF), basic fibroblast growth factor (bFGF), acidic fibroblast growth factor (aFGF), epidermal growth factor (EGF), transforming growth factor α (TGFα), platelet-derived growth factor (PDGF), insulin growth factors I and II (IGF-I and IGF-II), any one of the transforming growth factor 13 superfamily, including TGF (3, activins, inhibins, or any of the bone morphogenic proteins (BMP) BMPs 1-15, any one of the heregluin/neuregulin/ARIA/neu differentiation factor (NDF) family of growth factors, nerve growth factor (NGF), brain-derived neurotrophic factor (BDNF), neurotrophins NT-3 and NT-4/5, ciliary neurotrophic factor (CNTF), glial cell line derived neurotrophic factor (GDNF), neurturin, agrin, any one of the family of semaphorins/collapsins, netrin-1 and netrin-2, hepatocyte growth factor (HGF), ephrins, noggin, sonic hedgehog and tyrosine hydroxylase.

Other useful transgene products include proteins that regulate the immune system including, without limitation, cytokines and lymphokines such as thrombopoietin (TPO), interleukins (IL) IL-1 through IL-25 (including, IL-2, IL-4, IL-12, and IL-18), monocyte chemoattractant protein, leukemia inhibitory factor, granulocyte-macrophage colony stimulating factor, Fas ligand, tumor necrosis factors α and β, interferons α, β, and γ, stem cell factor, flk-2/flt3 ligand. Gene products produced by the immune system are also useful in the invention. These include, without limitations, immunoglobulins IgG, IgM, IgA, IgD and IgE, chimeric immunoglobulins, humanized antibodies, single chain antibodies, T cell receptors, chimeric T cell receptors, single chain T cell receptors, class I and class II MHC molecules, as well as engineered immunoglobulins and MHC molecules. Useful gene products also include complement regulatory proteins such as complement regulatory proteins, membrane cofactor protein (MCP), decay accelerating factor (DAF), CR1, CF2 and CD59.

Still other useful gene products include any one of the receptors for the hormones, growth factors, cytokines, lymphokines, regulatory proteins and immune system proteins. The invention encompasses receptors for cholesterol regulation, including the low density lipoprotein (LDL) receptor, high density lipoprotein (HDL) receptor, the very low density lipoprotein (VLDL) receptor, and the scavenger receptor. The invention also encompasses gene products such as members of the steroid hormone receptor superfamily including glucocorticoid receptors and estrogen receptors, Vitamin D receptors and other nuclear receptors. In addition, useful gene products include transcription factors such as jun, fos, max, mad, serum response factor (SRF), AP-1, AP2, myb, MyoD and myogenin, ETS-box containing proteins, TFE3, E2F, ATF1, ATF2, ATF3, ATF4, ZF5, NFAT, CREB, HNF-4, C/EBP, SP1, CCAAT-box binding proteins, interferon regulation factor (IRF-1), Wilms tumor protein, ETS-binding protein, STAT, GATA-box binding proteins, e.g., GATA-3, and the forkhead family of winged helix proteins.

Other useful gene products include, carbamoyl synthetase I, ornithine transcarbamylase, arginosuccinate synthetase, arginosuccinate lyase, arginase, fumarylacetacetate hydrolase, phenylalanine hydroxylase, alpha-1 antitrypsin, glucose-6-phosphatase, porphobilinogen deaminase, factor VIII, factor IX, cystathione beta-synthase, branched chain ketoacid decarboxylase, albumin, isovaleryl-coA dehydrogenase, propionyl CoA carboxylase, methyl malonyl CoA mutase, glutaryl CoA dehydrogenase, insulin, beta-glucosidase, pyruvate carboxylate, hepatic phosphorylase, phosphorylase kinase, glycine decarboxylase, H-protein, T-protein, a cystic fibrosis transmembrane regulator (CFTR) sequence, and a dystrophin sequence or functional fragment thereof. Still other useful gene products include enzymes such as may be useful in enzyme replacement therapy, which is useful in a variety of conditions resulting from deficient activity of enzyme. For example, enzymes that contain mannose-6-phosphate may be utilized in therapies for lysosomal storage diseases (e.g., a suitable gene includes that encodes β-glucuronidase (GUSB)). In another example, the gene product is ubiquitin protein ligase E3A (UBE3A). Still useful gene products include UDP Glucuronosyltransferase Family 1 Member A1 (UGT1A1).

Other useful gene products include non-naturally occurring polypeptides, such as chimeric or hybrid polypeptides having a non-naturally occurring amino acid sequence containing insertions, deletions or amino acid substitutions. For example, single-chain engineered immunoglobulins could be useful in certain immunocompromised patients. Other types of non-naturally occurring gene sequences include antisense molecules and catalytic nucleic acids, such as ribozymes, which could be used to reduce overexpression of a target.

Reduction and/or modulation of expression of a gene is particularly desirable for treatment of hyperproliferative conditions characterized by hyperproliferating cells, as are cancers and psoriasis. Target polypeptides include those polypeptides which are produced exclusively or at higher levels in hyperproliferative cells as compared to normal cells. Target antigens include polypeptides encoded by oncogenes such as myb, myc, fyn, and the translocation gene bcr/abl, ras, src, P53, neu, trk and EGRF. In addition to oncogene products as target antigens, target polypeptides for anti-cancer treatments and protective regimens include variable regions of antibodies made by B cell lymphomas and variable regions of T cell receptors of T cell lymphomas which, in some embodiments, are also used as target antigens for autoimmune disease. Other tumor-associated polypeptides can be used as target polypeptides such as polypeptides which are found at higher levels in tumor cells including the polypeptide recognized by monoclonal antibody 17-1A and folate binding polypeptides.

Other suitable therapeutic polypeptides and proteins include those which may be useful for treating individuals suffering from autoimmune diseases and disorders by conferring a broad based protective immune response against targets that are associated with autoimmunity including cell receptors and cells which produce self-directed antibodies. T cell mediated autoimmune diseases include Rheumatoid arthritis (RA), multiple sclerosis (MS), Sjögren's syndrome, sarcoidosis, insulin dependent diabetes mellitus (IDDM), autoimmune thyroiditis, reactive arthritis, ankylosing spondylitis, scleroderma, polymyositis, dermatomyositis, psoriasis, vasculitis, Wegener's granulomatosis, Crohn's disease and ulcerative colitis. Each of these diseases is characterized by T cell receptors (TCRs) that bind to endogenous antigens and initiate the inflammatory cascade associated with autoimmune diseases.

Still other useful gene products include those used for treatment of hemophilia, including hemophilia B (including Factor IX) and hemophilia A (including Factor VIII and its variants, such as the light chain and heavy chain of the heterodimer and the B-deleted domain; U.S. Pat. Nos. 6,200,560 and 6,221,349). In some embodiments, the minigene comprises first 57 base pairs of the Factor VIII heavy chain which encodes the 10 amino acid signal sequence, as well as the human growth hormone (hGH) polyadenylation sequence. In alternative embodiments, the minigene further comprises the A1 and A2 domains, as well as 5 amino acids from the N-terminus of the B domain, and/or 85 amino acids of the C-terminus of the B domain, as well as the A3, C1 and C2 domains. In yet other embodiments, the nucleic acids encoding Factor VIII heavy chain and light chain are provided in a single minigene separated by 42 nucleic acids coding for 14 amino acids of the B domain [U.S. Pat. No. 6,200,560].

Further illustrative genes which may be delivered via the rAAV include, without limitation, glucose-6-phosphatase, associated with glycogen storage disease or deficiency type 1A (GSD1), phosphoenolpyruvate-carboxykinase (PEPCK), associated with PEPCK deficiency; cyclin-dependent kinase-like 5 (CDKL5), also known as serine/threonine kinase 9 (STK9) associated with seizures and severe neurodevelopmental impairment; galactose-1 phosphate uridyl transferase, associated with galactosemia; phenylalanine hydroxylase (PAH), associated with phenylketonuria (PKU); gene products associated with Primary Hyperoxaluria Type 1 including Hydroxyacid Oxidase 1 (GO/HAO1) and AGXT, branched chain alpha-ketoacid dehydrogenase, including BCKDH, BCKDH-E2, BAKDH-E1a, and BAKDH-E1b, associated with Maple syrup urine disease; fumarylacetoacetate hydrolase, associated with tyrosinemia type 1; methylmalonyl-CoA mutase, associated with methylmalonic acidemia; medium chain acyl CoA dehydrogenase, associated with medium chain acetyl CoA deficiency; ornithine transcarbamylase (OTC), associated with ornithine transcarbamylase deficiency; argininosuccinic acid synthetase (ASS1), associated with citrullinemia; lecithin-cholesterol acyltransferase (LCAT) deficiency; amethylmalonic acidemia (MMA); NPC1 associated with Niemann-Pick disease, type C1); propionic academia (PA); TTR associated with Transthyretin (TTR)-related Hereditary Amyloidosis; low density lipoprotein receptor (LDLR) protein, associated with familial hypercholesterolemia LDLR variant, such as those described in WO 2015/164778; PCSK9; ApoE and ApoC proteins, associated with dementia; UDP-glucuronosyltransferase, associated with Crigler-Najjar disease;

adenosine deaminase, associated with severe combined immunodeficiency disease; hypoxanthine guanine phosphoribosyl transferase, associated with Gout and Lesch-Nyan syndrome; biotimidase, associated with biotimidase deficiency; alpha-galactosidase A (a-Gal A) associated with Fabry disease); beta-galactosidase (GLB1) associated with GM1 gangliosidosis; ATP7B associated with Wilson's Disease; beta-glucocerebrosidase, associated with Gaucher disease type 2 and 3; peroxisome membrane protein 70 kDa, associated with Zellweger syndrome; arylsulfatase A (ARSA) associated with metachromatic leukodystrophy, galactocerebrosidase (GALC) enzyme associated with Krabbe disease, alpha-glucosidase (GAA) associated with Pompe disease; sphingomyelinase (SMPD1) gene associated with Nieman Pick disease type A; argininosuccinate synthase associated with adult onset type II citrullinemia (CTLN2); carbamoyl-phosphate synthase 1 (CPS1) associated with urea cycle disorders; survival motor neuron (SMN) protein, associated with spinal muscular atrophy; ceramidase associated with Farber lipogranulomatosis; b-hexosaminidase associated with GM2 gangliosidosis and Tay-Sachs and Sandhoff diseases; aspartylglucosaminidase associated with aspartyl-glucosaminuria; α-fucosidase associated with fucosidosis; α-mannosidase associated with alpha-mannosidosis; porphobilinogen deaminase, associated with acute intermittent porphyria (AIP); alpha-1 antitrypsin for treatment of alpha-1 antitrypsin deficiency (emphysema); erythropoietin for treatment of anemia due to thalassemia or to renal failure; vascular endothelial growth factor, angiopoietin-1, and fibroblast growth factor for the treatment of ischemic diseases; thrombomodulin and tissue factor pathway inhibitor for the treatment of occluded blood vessels as seen in, for example, atherosclerosis, thrombosis, or embolisms; aromatic amino acid decarboxylase (AADC), and tyrosine hydroxylase (III) for the treatment of Parkinson's disease; the beta adrenergic receptor, anti-sense to, or a mutant form of, phospholamban, the sarco(endo)plasmic reticulum adenosine triphosphatase-2 (SERCA2), and the cardiac adenylyl cyclase for the treatment of congestive heart failure; a tumor suppressor gene such as p53 for the treatment of various cancers; a cytokine such as one of the various interleukins for the treatment of inflammatory and immune disorders and cancers; dystrophin or minidystrophin and utrophin or miniutrophin for the treatment of muscular dystrophies; and, insulin or G-LP-1 for the treatment of diabetes.

Alternatively, or in addition, the vectors of the invention may contain AAV sequences of the invention and a transgene encoding a peptide, polypeptide or protein which induces an immune response to a selected immunogen. For example, immunogens may be selected from a variety of viral families. Example of desirable viral families against which an immune response would be desirable include, the picornavirus family, which includes the genera rhinoviruses, which are responsible for about 50% of cases of the common cold; the genera enteroviruses, which include polioviruses, coxsackieviruses, echoviruses, and human enteroviruses such as hepatitis A virus; and the genera apthoviruses, which are responsible for foot and mouth diseases, primarily in non-human animals. Within the picornavirus family of viruses, target antigens include the VP1, VP2, VP3, VP4, and VPG. Another viral family includes the calcivirus family, which encompasses the Norwalk group of viruses, which are an important causative agent of epidemic gastroenteritis. Still another viral family desirable for use in targeting antigens for inducing immune responses in humans and non-human animals is the togavirus family, which includes the genera alphavirus, which include Sindbis viruses, RossRiver virus, and Venezuelan, Eastern & Western Equine encephalitis, and rubivirus, including Rubella virus. The flaviviridae family includes dengue, yellow fever, Japanese encephalitis, St. Louis encephalitis and tick borne encephalitis viruses. Other target antigens may be generated from the Hepatitis C or the coronavirus family, which includes a number of non-human viruses such as infectious bronchitis virus (poultry), porcine transmissible gastroenteric virus (pig), porcine hemagglutinating encephalomyelitis virus (pig), feline infectious peritonitis virus (cats), feline enteric coronavirus (cat), canine coronavirus (dog), and human respiratory coronaviruses, which may cause the common cold and/or non-A, B or C hepatitis. Within the coronavirus family, target antigens include the E1 (also called M or matrix protein), E2 (also called S or Spike protein), E3 (also called HE or hemagglutin-elterose) glycoprotein (not present in all coronaviruses), or N (nucleocapsid). Still other antigens may be targeted against the rhabdovirus family, which includes the genera vesiculovirus (e.g., Vesicular Stomatitis Virus), and the general lyssavirus (e.g., rabies). Within the rhabdovirus family, suitable antigens may be derived from the G protein or the N protein. The family filoviridae, which includes hemorrhagic fever viruses such as Marburg and Ebola virus may be a suitable source of antigens. The paramyxovirus family includes parainfluenza Virus Type 1, parainfluenza Virus Type 3, bovine parainfluenza Virus Type 3, rubulavirus (mumps virus, parainfluenza Virus Type 2, parainfluenza virus Type 4, Newcastle disease virus (chickens), rinderpest, morbillivirus, which includes measles and canine distemper, and pneumovirus, which includes respiratory syncytial virus. The influenza virus is classified within the family orthomyxovirus and is a suitable source of antigen (e.g., the HA protein, the N1 protein). The bunyavirus family includes the genera bunyavirus (California encephalitis, La Crosse), phlebovirus (Rift Valley Fever), hantavirus (puremala is a hemahagin fever virus), nairovirus (Nairobi sheep disease) and various unassigned bungaviruses. The arenavirus family provides a source of antigens against LCM and Lassa fever virus. The reovirus family includes the genera reovirus, rotavirus (which causes acute gastroenteritis in children), orbiviruses, and cultivirus (Colorado Tick fever, Lebombo (humans), equine encephalosis, blue tongue).

The retrovirus family includes the sub-family oncoriviriinal which encompasses such human and veterinary diseases as feline leukemia virus, HTLVI and HTLVII, lentivirinal (which includes human immunodeficiency virus (HIV), simian immunodeficiency virus (SIV), feline immunodeficiency virus (FIV), equine infectious anemia virus, and spumaviriinal). Between the HIV and SIV, many suitable antigens have been described and can readily be selected. Examples of suitable HIV and SIV antigens include, without limitation the gag, pol, Vif, Vpx, VPR, Env, Tat and Rev proteins, as well as various fragments thereof. In addition, a variety of modifications to these antigens have been described. Suitable antigens for this purpose are known to those of skill in the art. For example, one may select a sequence encoding the gag, pol, Vif, and Vpr, Env, Tat and Rev, amongst other proteins. See, e.g., the modified gag protein which is described in U.S. Pat. No. 5,972,596. See, also, the HIV and SIV proteins described in D. H. Barouch et al, J. Virol., 75(5):2462-2467 (March 2001), and R. R. Amara, et al, Science, 292:69-74 (6 Apr. 2001). These proteins or subunits thereof may be delivered alone, or in combination via separate vectors or from a single vector.

The papovavirus family includes the sub-family polyomaviruses (BKU and JCU viruses) and the sub-family papillomavirus (associated with cancers or malignant progression of papilloma). The adenovirus family includes viruses (EX, AD7, ARD, O.B.) which cause respiratory disease and/or enteritis. The parvovirus family feline parvovirus (feline enteritis), feline panleucopeniavirus, canine parvovirus, and porcine parvovirus. The herpesvirus family includes the sub-family alphaherpesvirinae, which encompasses the genera simplexvirus (HSVI, HSVII), varicellovirus (pseudorabies, varicella zoster) and the sub-family betaherpesvirinae, which includes the genera cytomegalovirus (HCMV, muromegalovirus) and the sub-family gammaherpesvirinae, which includes the genera lymphocryptovirus, EBV (Burkitts lymphoma), infectious rhinotracheitis, Marek's disease virus, and rhadinovirus. The poxvirus family includes the sub-family chordopoxvirinae, which encompasses the genera orthopoxvirus (Variola (Smallpox) and Vaccinia (Cowpox)), parapoxvirus, avipoxvirus, capripoxvirus, leporipoxvirus, suipoxvirus, and the sub-family entomopoxvirinae. The hepadnavirus family includes the Hepatitis B virus. One unclassified virus which may be suitable source of antigens is the Hepatitis delta virus. Still other viral sources may include avian infectious bursal disease virus and porcine respiratory and reproductive syndrome virus. The alphavirus family includes equine arteritis virus and various Encephalitis viruses.

The present invention may also encompass immunogens which are useful to immunize a human or non-human animal against other pathogens including bacteria, fungi, parasitic microorganisms or multicellular parasites which infect human and non-human vertebrates, or from a cancer cell or tumor cell. Examples of bacterial pathogens include pathogenic gram-positive cocci include pneumococci; staphylococci; and streptococci. Pathogenic gram-negative cocci include meningococcus; gonococcus. Pathogenic enteric gram-negative bacilli include enterobacteriaceae; pseudomonas, acinetobacteria and eikenella; melioidosis; salmonella; shigella; haemophilus; moraxella; H ducreyi (which causes chancroid); brucella; *Franisella tularensis* (which causes tularemia); yersinia (pasteurella); streptobacillus moniliformis and spirillum; Gram-positive bacilli include *Listeria monocytogenes*; erysipelothrix rhusiopathiae; *Corynebacterium diphtheria* (diphtheria); cholera; *B. anthraces* (anthrax); donovanosis (granuloma inguinale); and bartonellosis. Diseases caused by pathogenic anaerobic bacteria include tetanus; botulism; other clostridia; tuberculosis; leprosy; and other mycobacteria. Pathogenic spirochetal diseases include syphilis; treponematoses: yaws, pinta and endemic syphilis; and leptospirosis. Other infections caused by higher pathogen bacteria and pathogenic fungi include actinomycosis; nocardiosis; cryptococcosis, blastomycosis, histoplasmosis and coccidioidomycosis; candidiasis, aspergillosis, and mucormycosis; sporotrichosis; paracoccidiodomycosis, petriellidiosis, torulopsosis, mycetoma and chromomycosis; and dermatophytosis. Rickettsial infections include Typhus fever, Rocky Mountain spotted fever, Q fever, and Rickettsialpox. Examples of mycoplasma and chlamydial infections include: *Mycoplasma pneumoniae*; lymphogranuloma venereum; psittacosis; and perinatal chlamydial infections. Pathogenic eukaryotes encompass pathogenic protozoans and helminths and infections produced thereby include: amebiasis; malaria; leishmaniasis; trypanosomiasis; toxoplasmosis; *Pneumocystis carinii*; Trichans; *Toxoplasma gondii*; babesiosis; giardiasis; trichinosis; filariasis; schistosomiasis; nematodes; trematodes or flukes; and cestode (tapeworm) infections.

Many of these organisms and/or toxins produced thereby have been identified by the Centers for Disease Control [(CDC), Department of Health and Human Services, USA], as agents which have potential for use in biological attacks. For example, some of these biological agents, include, *Bacillus anthraces* (anthrax), *Clostridium botulinum* and its toxin (botulism), *Yersinia pestis* (plague), variola major (smallpox), *Francisella tularensis* (tularemia), and viral hemorrhagic fever, all of which are currently classified as Category A agents; *Coxiella burnetti* (Q fever); *Brucella* species (brucellosis), *Burkholderia mallei* (glanders), *Ricinus communis* and its toxin (ricin toxin), *Clostridium perfringens* and its toxin (epsilon toxin), *Staphylococcus* species and their toxins (enterotoxin B), all of which are currently classified as Category B agents; and Nipan virus and hantaviruses, which are currently classified as Category C agents. In addition, other organisms, which are so classified or differently classified, may be identified and/or used for such a purpose in the future. It will be readily understood that the viral vectors and other constructs described herein are useful to deliver antigens from these organisms, viruses, their toxins or other by-products, which will prevent and/or treat infection or other adverse reactions with these biological agents.

Administration of the vectors of the invention to deliver immunogens against the variable region of the T cells elicit an immune response including CTLs to eliminate those T cells. In rheumatoid arthritis (RA), several specific variable regions of T cell receptors (TCRs) which are involved in the disease have been characterized. These TCRs include V-3, V-14, V-17 and Vα-17. Thus, delivery of a nucleic acid sequence that encodes at least one of these polypeptides will elicit an immune response that will target T cells involved in RA. In multiple sclerosis (MS), several specific variable regions of TCRs which are involved in the disease have been characterized. These TCRs include V-7 and Vα-10. Thus, delivery of a nucleic acid sequence that encodes at least one of these polypeptides will elicit an immune response that will target T cells involved in MS. In scleroderma, several specific variable regions of TCRs which are involved in the disease have been characterized. These TCRs include V-6, V-8, V-14 and Vα-16, Vα-3C, Vα-7, Vα-14, Vα-15, Vα-16, Vα-28 and Vα-12. Thus, delivery of a nucleic acid molecule that encodes at least one of these polypeptides will elicit an immune response that will target T cells involved in scleroderma.

In one embodiment, the transgene is selected to provide optogenetic therapy. In optogenetic therapy, artificial photoreceptors are constructed by gene delivery of light-activated channels or pumps to surviving cell types in the remaining retinal circuit. This is particularly useful for patients who have lost a significant amount of photoreceptor function, but whose bipolar cell circuitry to ganglion cells and optic nerve remains intact. In one embodiment, the heterologous nucleic acid sequence (transgene) is an opsin. The opsin sequence can be derived from any suitable single- or multicellular-organism, including human, algae and bacteria. In one embodiment, the opsin is rhodopsin, photopsin, L/M wavelength (red/green)-opsin, or short wavelength (S) opsin (blue). In another embodiment, the opsin is channelrhodopsin or halorhodopsin.

In another embodiment, the transgene is selected for use in gene augmentation therapy, i.e., to provide replacement copy of a gene that is missing or defective. In this embodiment, the transgene may be readily selected by one of skill in the art to provide the necessary replacement gene. In one embodiment, the missing/defective gene is related to an ocular disorder. In another embodiment, the transgene is NYX, GRM6, TRPM1L or GPR179 and the ocular disorder is Congenital Stationary Night Blindness. See, e.g., Zeitz et al, Am J Hum Genet. 2013 Jan. 10; 92(1):67-75. Epub 2012 Dec. 13 which is incorporated herein by reference. In another embodiment, the transgene is RPGR.

In another embodiment, the transgene is selected for use in gene suppression therapy, i.e., expression of one or more native genes is interrupted or suppressed at transcriptional or translational levels. This can be accomplished using short hairpin RNA (shRNA) or other techniques well known in the art. See, e.g., Sun et al, Int J Cancer. 2010 Feb. 1; 126(3): 764-74 and O'Reilly M, et al. Am J Hum Genet. 2007 July; 81(1):127-35, which are incorporated herein by reference. In this embodiment, the transgene may be readily selected by one of skill in the art based upon the gene which is desired to be silenced.

In another embodiment, the transgene comprises more than one transgene. This may be accomplished using a single vector carrying two or more heterologous sequences, or using two or more AAV each carrying one or more heterologous sequences. In one embodiment, the AAV is used for gene suppression (or knockdown) and gene augmentation co-therapy. In knockdown/augmentation co-therapy, the defective copy of the gene of interest is silenced and a non-mutated copy is supplied. In one embodiment, this is accomplished using two or more co-administered vectors. See, Millington-Ward et al, Molecular Therapy, April 2011, 19(4):642-649 which is incorporated herein by reference. The transgenes may be readily selected by one of skill in the art based on the desired result.

In another embodiment, the transgene is selected for use in gene correction therapy. This may be accomplished using, e.g., a zinc-finger nuclease (ZFN)-induced DNA double-strand break in conjunction with an exogenous DNA donor substrate. See, e.g., Ellis et al, Gene Therapy (epub January 2012) 20:35-42 which is incorporated herein by reference. The transgenes may be readily selected by one of skill in the art based on the desired result.

In one embodiment, the capsids described herein are useful in the CRISPR-Cas dual vector system described in U.S. Provisional Patent Application Nos. 61/153,470, 62/183,825, 62/254,225 and 62/287,511, each of which is incorporated herein by reference. The capsids are also useful for delivery homing endonucleases or other meganucleases.

In another embodiment, the transgenes useful herein include reporter sequences, which upon expression produce a detectable signal. Such reporter sequences include, without limitation, DNA sequences encoding β-lactamase, β-galactosidase (LacZ), alkaline phosphatase, thymidine kinase, green fluorescent protein (GFP), red fluorescent protein (RFP), chloramphenicol acetyltransferase (CAT), luciferase, membrane bound proteins including, for example, CD2, CD4, CD8, the influenza hemagglutinin protein, and others well known in the art, to which high affinity antibodies directed thereto exist or can be produced by conventional means, and fusion proteins comprising a membrane bound protein appropriately fused to an antigen tag domain from, among others, hemagglutinin or Myc.

These coding sequences, when associated with regulatory elements which drive their expression, provide signals detectable by conventional means, including enzymatic, radiographic, colorimetric, fluorescence or other spectrographic assays, fluorescent activating cell sorting assays and immunological assays, including enzyme linked immunosorbent assay (ELISA), radioimmunoassay (RIA) and immunohistochemistry. For example, where the marker sequence is the LacZ gene, the presence of the vector carrying the signal is detected by assays for beta-galactosidase activity. Where the transgene is green fluorescent protein or luciferase, the vector carrying the signal may be measured visually by color or light production in a luminometer.

Desirably, the transgene encodes a product which is useful in biology and medicine, such as proteins, peptides, RNA, enzymes, or catalytic RNAs. Desirable RNA molecules include shRNA, tRNA, dsRNA, ribosomal RNA, catalytic RNAs, and antisense RNAs. One example of a useful RNA sequence is a sequence which extinguishes expression of a targeted nucleic acid sequence in the treated animal.

The regulatory sequences include conventional control elements which are operably linked to the transgene in a manner which permits its transcription, translation and/or expression in a cell transfected with the vector or infected with the virus produced as described herein. As used herein, "operably linked" sequences include both expression control sequences that are contiguous with the gene of interest and expression control sequences that act in trans or at a distance to control the gene of interest.

The term "heterologous" when used with reference to a protein or a nucleic acid indicates that the protein or the nucleic acid comprises two or more sequences or subsequences which are not found in the same relationship to each other in nature. For instance, the nucleic acid is typically recombinantly produced, having two or more sequences from unrelated genes arranged to make a new functional nucleic acid. For example, in one embodiment, the nucleic acid has a promoter from one gene arranged to direct the expression of a coding sequence from a different gene. Thus, with reference to the coding sequence, the promoter is heterologous.

Expression control sequences include appropriate transcription initiation, termination, promoter and enhancer sequences; efficient RNA processing signals such as splicing and polyadenylation (polyA) signals; sequences that stabilize cytoplasmic mRNA; sequences that enhance translation efficiency (i.e., Kozak consensus sequence); sequences that enhance protein stability; and when desired, sequences that enhance secretion of the encoded product. A great number of expression control sequences, including promoters, are known in the art and may be utilized.

The regulatory sequences useful in the constructs provided herein may also contain an intron, desirably located between the promoter/enhancer sequence and the gene. One desirable intron sequence is derived from SV-40, and is a 100 bp mini-intron splice donor/splice acceptor referred to as SD-SA. Another suitable sequence includes the woodchuck hepatitis virus post-transcriptional element. (See, e.g., L. Wang and I. Verma, 1999 Proc. Natl. Acad. Sci., USA, 96:3906-3910). PolyA signals may be derived from many suitable species, including, without limitation SV-40, human and bovine.

Another regulatory component of the rAAV useful in the methods described herein is an internal ribosome entry site (IRES). An IRES sequence, or other suitable systems, may be used to produce more than one polypeptide from a single gene transcript. An IRES (or other suitable sequence) is used to produce a protein that contains more than one polypeptide chain or to express two different proteins from or within the same cell. An exemplary IRES is the poliovirus internal ribosome entry sequence, which supports transgene expression in photoreceptors, RPE and ganglion cells. Preferably, the IRES is located 3' to the transgene in the rAAV vector.

In one embodiment, the expression cassette or vector genome comprises a promoter (or a functional fragment of a promoter). The selection of the promoter to be employed in the rAAV may be made from among a wide number of constitutive or inducible promoters that can express the selected transgene in the desired target cell. In one embodiment, the target cell is an ocular cell. The promoter may be derived from any species, including human. Desirably, in one embodiment, the promoter is "cell specific". The term "cell-specific" means that the particular promoter selected for the recombinant vector can direct expression of the selected transgene in a particular cell tissue. In one embodiment, the promoter is specific for expression of the transgene in muscle cells. In another embodiment, the promoter is specific for expression in lung. In another embodiment, the promoter is specific for expression of the transgene in liver cells. In another embodiment, the promoter is specific for expression of the transgene in airway epithelium. In another embodiment, the promoter is specific for expression of the transgene in neurons. In another embodiment, the promoter is specific for expression of the transgene in heart.

The expression cassette typically contains a promoter sequence as part of the expression control sequences, e.g., located between the selected 5' ITR sequence and the immunoglobulin construct coding sequence. In one embodiment, expression in liver is desirable. Thus, in one embodiment, a liver-specific promoter is used. Tissue specific promoters, constitutive promoters, regulatable promoters [see, e.g., WO 2011/126808 and WO 2013/04943], or a promoter responsive to physiologic cues may be used may be utilized in the vectors described herein. In another embodiment, expression in muscle is desirable. Thus, in one embodiment, a muscle-specific promoter is used. In one embodiment, the promoter is an MCK based promoter, such as the dMCK (509-bp) or tMCK (720-bp) promoters (see, e.g., Wang et al, Gene Ther. 2008 November; 15(22):1489-99. doi: 10.1038/gt.2008.104. Epub 2008 Jun. 19, which is incorporated herein by reference). Another useful promoter is the SPcS-12 promoter (see Rasowo et al, European Scientific Journal June 2014 edition vol. 10, No. 18, which is incorporated herein by reference). In one embodiment, the promoter is a CMV promoter. In another embodiment, the promoter is a TBG promoter. In another embodiment, a CB7 promoter or CAG promoter is used. CB7 is a chicken β-actin promoter with cytomegalovirus enhancer elements. Alternatively, other liver-specific promoters may be used [see, e.g., The Liver Specific Gene Promoter Database, Cold Spring Harbor, rulai.schl.edu/LSPD, alpha 1 anti-trypsin (A1AT); human albumin Miyatake et al., J. Virol., 71:5124 32 (1997), humAlb; and hepatitis B virus core promoter, Sandig et al., Gene Ther., 3:1002 9 (1996)]. TTR minimal enhancer/promoter, alpha-antitrypsin promoter, LSP (845 nt)25 (requires intron-less scAAV).

The promoter(s) can be selected from different sources, e.g., human cytomegalovirus (CMV) immediate-early enhancer/promoter, the SV40 early enhancer/promoter, the JC polymovirus promoter, myelin basic protein (MBP) or glial fibrillary acidic protein (GFAP) promoters, herpes simplex virus (HSV-1) latency associated promoter (LAP), rouse sarcoma virus (RSV) long terminal repeat (LTR) promoter, neuron-specific promoter (NSE), platelet derived growth factor (PDGF) promoter, hSYN, melanin-concentrating hormone (MCH) promoter, CBA, matrix metalloprotein promoter (MPP), and the chicken beta-actin promoter.

The expression cassette may contain at least one enhancer, i.e., CMV enhancer. Still other enhancer elements may include, e.g., an apolipoprotein enhancer, a zebrafish enhancer, a GFAP enhancer element, and brain specific enhancers such as described in WO 2013/1555222, woodchuck post hepatitis post-transcriptional regulatory element. Additionally, or alternatively, other, e.g., the hybrid human cytomegalovirus (HCMV)-immediate early (IE)-PDGR promoter or other promoter-enhancer elements may be selected. Other enhancer sequences useful herein include the IRBP enhancer (Nicoud 2007, J Gene Med. 2007 December; 9(12):1015-23), immediate early cytomegalovirus enhancer, one derived from an immunoglobulin gene or SV40 enhancer, the cis-acting element identified in the mouse proximal promoter, etc.

In addition to a promoter, an expression cassette and/or a vector may contain other appropriate transcription initiation, termination, enhancer sequences, efficient RNA processing signals such as splicing and polyadenylation (polyA) signals; sequences that stabilize cytoplasmic mRNA; sequences that enhance translation efficiency (i.e., Kozak consensus sequence); sequences that enhance protein stability; and when desired, sequences that enhance secretion of the encoded product. A variety of suitable polyA are known. In one example, the polyA is rabbit beta globin, such as the 127 bp rabbit beta-globin polyadenylation signal (GenBank #V00882.1). In other embodiments, an SV40 polyA signal is selected. Still other suitable polyA sequences may be selected. In certain embodiments, an intron is included. One suitable intron is a chicken beta-actin intron. In one embodiment, the intron is 875 bp (GenBank #X00182.1). In another embodiment, a chimeric intron available from Promega is used. However, other suitable introns may be selected. In one embodiment, spacers are included such that the vector genome is approximately the same size as the native AAV vector genome (e.g., between 4.1 and 5.2 kb). In one embodiment, spacers are included such that the vector genome is approximately 4.7 kb. See, Wu et al, Effect of Genome Size on AAV Vector Packaging, Mol Ther. 2010 January; 18(1): 80-86, which is incorporated herein by reference.

Selection of these and other common vector and regulatory elements are conventional and many such sequences are available. See, e.g., Sambrook et al, and references cited therein at, for example, pages 3.18-3.26 and 16.17-16.27 and Ausubel et al., Current Protocols in Molecular Biology, John Wiley & Sons, New York, 1989. Of course, not all vectors and expression control sequences will function equally well to express all of the transgenes as described herein. However, one of skill in the art can select among these, and other, expression control sequences without departing from the scope of this invention.

In certain embodiments, the expression cassette contains at least one miRNA target sequence that is a miR-183 target sequence. In certain embodiments, the vector genome or expression cassette contains an miR-183 target sequence that includes AGTGAATTCTACCAGTGCCATA (SEQ ID NO: 13), where the sequence complementary to the miR-183 seed sequence is underlined. In certain embodiments, the vector genome or expression cassette contains more than one copy (e.g. two or three copies) of a sequence that is 100% complementary to the miR-183 seed sequence. In certain embodiments, a miR-183 target sequence is about 7 nucleotides to about 28 nucleotides in length and includes at least one region that is at least 100% complementary to the miR-183 seed sequence. In certain embodiments, a miR-183 target sequence contains a sequence with partial complementarity to SEQ ID NO: 13 and, thus, when aligned to SEQ ID NO: 13, there are one or more mismatches. In certain embodiments, a miR-183 target sequence comprises a sequence having at least 1, 2, 3, 4, 5, 6, 7, 8, 9, or 10 mismatches when aligned to SEQ ID NO: 13, where the mismatches may be non-contiguous. In certain embodiments, a miR-183 target sequence includes a region of 100% complementarity which also comprises at least 30% of the length of the miR-183 target sequence. In certain embodiments, the region of 100% complementarity includes a sequence with 100% complementarity to the miR-183 seed sequence. In certain embodiments, the remainder of a miR-183 target sequence has at least about 80% to about 99% complementarity to miR-183. In certain embodiments, the expression cassette or vector genome includes a miR-183 target sequence that comprises a truncated SEQ ID NO: 13, i.e., a sequence that lacks at least 1, 2, 3, 4, 5, 6, 7, 8, 9, or 10 nucleotides at either or both the 5' or 3' ends of SEQ ID NO: 13. In certain embodiments, the expression cassette or vector genome comprises a transgene and one miR-183 target sequence. In yet other embodiments, the expression cassette or vector genome comprises at least two, three or four miR-183 target sequences.

In certain embodiments, the expression cassette contains at least one miRNA target sequence that is a miR-182 target sequence. In certain embodiments, the vector genome or expression cassette contains an miR-182 target sequence that includes AGTGTGAGTTCTACCATTGCCAAA (SEQ ID NO: 14). In certain embodiments, the vector genome or expression cassette contains more than one copy (e.g. two or three copies) of a sequence that is 100% complementary to the miR-182 seed sequence. In certain embodiments, a miR-182 target sequence is about 7 nucleotides to about 28 nucleotides in length and includes at least one region that is at least 100% complementary to the miR-182 seed sequence. In certain embodiments, a miR-182 target sequence contains a sequence with partial complementarity to SEQ ID NO: 14 and, thus, when aligned to SEQ ID NO: 14, there are one or more mismatches. In certain embodiments, a miR-183 target sequence comprises a sequence having at least 1, 2, 3, 4, 5, 6, 7, 8, 9, or 10 mismatches when aligned to SEQ ID NO: 14, where the mismatches may be non-contiguous. In certain embodiments, a miR-182 target sequence includes a region of 100% complementarity which also comprises at least 30% of the length of the miR-182 target sequence. In certain embodiments, the region of 100% complementarity includes a sequence with 100% complementarity to the miR-182 seed sequence. In certain embodiments, the remainder of a miR-182 target sequence has at least about 80% to about 99% complementarity to miR-182. In certain embodiments, the expression cassette or vector genome includes a miR-182 target sequence that comprises a truncated SEQ ID NO: 14, i.e., a sequence that lacks at least 1, 2, 3, 4, 5, 6, 7, 8, 9, or 10 nucleotides at either or both the 5' or 3' ends of SEQ ID NO: 14. In certain embodiments, the expression cassette or vector genome comprises a transgene and one miR-182 target sequence. In yet other embodiments, the expression cassette or vector genome comprises at least two, three or four miR-182 target sequences.

The term "tandem repeats" is used herein to refer to the presence of two or more consecutive miRNA target sequences. These miRNA target sequences may be continuous, i.e., located directly after one another such that the 3' end of one is directly upstream of the 5' end of the next with no intervening sequences, or vice versa. In another embodiment, two or more of the miRNA target sequences are separated by a short spacer sequence.

As used herein, as "spacer" is any selected nucleic acid sequence, e.g., of 1, 2, 3, 4, 5, 6, 7, 8, 9 or 10 nucleotides in length which is located between two or more consecutive miRNA target sequences. In certain embodiments, the spacer is 1 to 8 nucleotides in length, 2 to 7 nucleotides in length, 3 to 6 nucleotides in length, four nucleotides in length, 4 to 9 nucleotides, 3 to 7 nucleotides, or values which are longer. Suitably, a spacer is a non-coding sequence. In certain embodiments, the spacer may be of four (4) nucleotides. In certain embodiments, the spacer is GGAT. In certain embodiments, the spacer is six (6) nucleotides. In certain embodiments, the spacer is CACGTG or GCATGC.

In certain embodiments, the tandem repeats contain two, three, four or more of the same miRNA target sequence. In certain embodiments, the tandem repeats contain at least two different miRNA target sequences, at least three different miRNA target sequences, or at least four different miRNA target sequences, etc. In certain embodiments, the tandem repeats may contain two or three of the same miRNA target sequence and a fourth miRNA target sequence which is different.

In certain embodiments, there may be at least two different sets of tandem repeats in the expression cassette. For example, a 3' UTR may contain a tandem repeat immediately downstream of the transgene, UTR sequences, and two or more tandem repeats closer to the 3' end of the UTR. In another example, the 5' UTR may contain one, two or more miRNA target sequences. In another example the 3' may contain tandem repeats and the 5' UTR may contain at least one miRNA target sequence.

In certain embodiments, the expression cassette contains two, three, four or more tandem repeats which start within about 0 to 20 nucleotides of the stop codon for the transgene. In other embodiments, the expression cassette contains the miRNA tandem repeats at least 100 to about 4000 nucleotides from the stop codon for the transgene.

See, PCT/US19/67872, filed Dec. 20, 2019, which is incorporated by reference herein and which claims priority to US Provisional U.S. Patent Application No. 62/783,956, filed Dec. 21, 2018, which is hereby incorporated by reference.

In another embodiment, a method of generating a recombinant adeno-associated virus is provided. A suitable recombinant adeno-associated virus (AAV) is generated by culturing a host cell which contains a nucleic acid sequence encoding an AAV capsid protein as described herein, or fragment thereof; a functional rep gene; a minigene composed of, at a minimum, AAV inverted terminal repeats (ITRs) and a heterologous nucleic acid sequence encoding a desirable transgene; and sufficient helper functions to permit packaging of the minigene into the AAV capsid protein. The components required to be cultured in the host cell to package an AAV minigene in an AAV capsid may be provided to the host cell in trans. Alternatively, any one or more of the required components (e.g., minigene, rep sequences, cap sequences, and/or helper functions) may be provided by a stable host cell which has been engineered to contain one or more of the required components using methods known to those of skill in the art. Methods of generating a capsid, coding sequences therefore, and methods for production of rAAV viral vectors have been described. See, e.g., Gao, et al, Proc. Natl. Acad. Sci. U.S.A. 100 (10), 6081-6086 (2003) and US 2013/0045186A1, which are incorporated by reference herein.

Also provided herein are host cells transduced with an rAAV as described herein. Most suitably, such a stable host cell will contain the required component(s) under the control of an inducible promoter. However, the required component(s) may be under the control of a constitutive promoter. Examples of suitable inducible and constitutive promoters are provided herein, in the discussion below of regulatory elements suitable for use with the transgene. In still another alternative, a selected stable host cell may contain selected component(s) under the control of a constitutive promoter and other selected component(s) under the control of one or more inducible promoters. For example, a stable host cell may be generated which is derived from 293 cells (which contain E1 helper functions under the control of a constitutive promoter), but which contains the rep and/or cap proteins under the control of inducible promoters. Still other stable host cells may be generated by one of skill in the art. In another embodiment, the host cell comprises a nucleic acid molecule as described herein. In certain embodiments, the novel vectors described have improved productions (i.e. higher yields) compared to known capsids. For example, production of AAVrh.91 vectors demonstrated improved yields compared to AAV1 and AAV6.

The minigene, rep sequences, cap sequences, and helper functions required for producing the rAAV described herein may be delivered to the packaging host cell in the form of any genetic element which transfers the sequences carried thereon. The selected genetic element may be delivered by any suitable method, including those described herein. The methods used to construct any embodiment of this invention are known to those with skill in nucleic acid manipulation and include genetic engineering, recombinant engineering, and synthetic techniques. See, e.g., Sambrook et al, Molecular Cloning: A Laboratory Manual, Cold Spring Harbor Press, Cold Spring Harbor, NY. Similarly, methods of generating rAAV virions are well known and the selection of a suitable method is not a limitation on the present invention. See, e.g., K. Fisher et al, 1993 *J. Virol.*, 70:520-532 and U.S. Pat. No. 5,478,745, among others. These publications are incorporated by reference herein. Also provided herein, are plasmids for use in producing the vectors described herein.

C. PHARMACEUTICAL COMPOSITIONS AND ADMINISTRATION

In one embodiment, the recombinant AAV containing the desired transgene and promoter for use in the target cells as detailed above is optionally assessed for contamination by conventional methods and then formulated into a pharmaceutical composition intended for administration to a subject in need thereof. Such formulation involves the use of a pharmaceutically and/or physiologically acceptable vehicle or carrier, such as buffered saline or other buffers, e.g., HEPES, to maintain pH at appropriate physiological levels, and, optionally, other medicinal agents, pharmaceutical agents, stabilizing agents, buffers, carriers, adjuvants, diluents, etc. For injection, the carrier will typically be a liquid. Exemplary physiologically acceptable carriers include sterile, pyrogen-free water and sterile, pyrogen-free, phosphate buffered saline. A variety of such known carriers are provided in U.S. Pat. No. 7,629,322, incorporated herein by reference. In one embodiment, the carrier is an isotonic sodium chloride solution. In another embodiment, the carrier is balanced salt solution. In one embodiment, the carrier includes tween. If the virus is to be stored long-term, it may be frozen in the presence of glycerol or Tween20. In another embodiment, the pharmaceutically acceptable carrier comprises a surfactant, such as perfluorooctane (Perfluoron liquid). The vector is formulated in a buffer/carrier suitable for infusion in human subjects. The buffer/carrier should include a component that prevents the rAAV from sticking to the infusion tubing but does not interfere with the rAAV binding activity in vivo.

In certain embodiments of the methods described herein, the pharmaceutical composition described above is administered to the subject intramuscularly (IM). In other embodiments, the pharmaceutical composition is administered by intravenously (IV). In other embodiments, the pharmaceutical composition is administered by intracerebroventricular (ICV) injection. In other embodiments, the pharmaceutical composition is administered by intra-cisterna magna (ICM) injection. Other forms of administration that may be useful in the methods described herein include, but are not limited to, direct delivery to a desired organ (e.g., the eye), including subretinal or intravitreal delivery, oral, inhalation, intranasal, intratracheal, intravenous, intramuscular, subcutaneous, intradermal, and other parental routes of administration. Routes of administration may be combined, if desired.

As used herein, the terms "intrathecal delivery" or "intrathecal administration" refer to a route of administration via an injection into the spinal canal, more specifically into the subarachnoid space so that it reaches the cerebrospinal fluid (CSF). Intrathecal delivery may include lumbar puncture, intraventricular (including intracerebroventricular (ICV)), suboccipital/intracisternal, and/or C1-2 puncture. For example, material may be introduced for diffusion throughout the subarachnoid space by means of lumbar puncture. In another example, injection may be into the cisterna magna.

As used herein, the terms "intracisternal delivery" or "intracisternal administration" refer to a route of administration directly into the cerebrospinal fluid of the cisterna magna cerebellomedularis, more specifically via a suboccipital puncture or by direct injection into the cisterna magna or via permanently positioned tube.

The composition may be delivered in a volume of from about 0.1 µL to about 10 mL, including all numbers within the range, depending on the size of the area to be treated, the viral titer used, the route of administration, and the desired effect of the method. In one embodiment, the volume is about 50 µL. In another embodiment, the volume is about 70 µL. In another embodiment, the volume is about 100 µL. In another embodiment, the volume is about 125 µL. In another embodiment, the volume is about 150 µL. In another embodiment, the volume is about 175 µL. In yet another embodiment, the volume is about 200 µL. In another embodiment, the volume is about 250 µL. In another embodiment, the volume is about 300 µL. In another embodiment, the volume is about 450 µL. In another embodiment, the volume is about 500 µL. In another embodiment, the volume is about 600 µL. In another embodiment, the volume is about 750 µL. In another embodiment, the volume is about 850 µL. In another embodiment, the volume is about 1000 µL. In another embodiment, the volume is about 1.5 mL. In another embodiment, the volume is about 2 mL. In another embodiment, the volume is about 2.5 mL. In another embodiment, the volume is about 3 mL. In another embodiment, the volume is about 3.5 mL. In another embodiment, the volume is about 4 mL. In another embodiment, the volume is about 5 mL. In another embodiment, the volume is about 5.5 mL. In another embodiment, the volume is about 6 mL. In another embodiment, the volume is about 6.5 mL. In another embodiment, the volume is about 7 mL. In another embodiment, the volume is about 8 mL. In another embodiment, the volume is about 8.5 mL. In another embodiment, the volume is about 9 mL. In another embodiment, the volume is about 9.5 mL. In another embodiment, the volume is about 10 mL.

An effective concentration of a recombinant adeno-associated virus carrying a nucleic acid sequence encoding the desired transgene under the control of the regulatory sequences desirably ranges from about $10^7$ and $10^{14}$ vector genomes per milliliter (vg/mL) (also called genome copies/mL (GC/mL)). In one embodiment, the rAAV vector genomes are measured by real-time PCR. In another embodiment, the rAAV vector genomes are measured by digital PCR. See, Lock et al, Absolute determination of single-stranded and self-complementary adeno-associated viral vector genome titers by droplet digital PCR, Hum Gene Ther Methods. 2014 April; 25(2):115-25. doi: 10.1089/hgtb.2013.131. Epub 2014 Feb. 14, which are incorporated herein by reference. In another embodiment, the rAAV infectious units are measured as described in S. K. McLaughlin et al, 1988 J. Virol., 62:1963, which is incorporated herein by reference.

Preferably, the concentration is from about $1.5\times10^9$ vg/mL to about $1.5\times10^{13}$ vg/mL, and more preferably from about $1.5\times10^9$ vg/mL to about $1.5\times10^{11}$ vg/mL. In one embodiment, the effective concentration is about $1.4\times10^8$ vg/mL. In one embodiment, the effective concentration is about $3.5\times10^{10}$ vg/mL. In another embodiment, the effective concentration is about $5.6\times10^{11}$ vg/mL. In another embodiment, the effective concentration is about $5.3\times10^{12}$ vg/mL. In yet another embodiment, the effective concentration is about $1.5\times10^{12}$ vg/mL. In another embodiment, the effective concentration is about $1.5\times10^{13}$ vg/mL. All ranges described herein are inclusive of the endpoints.

In one embodiment, the dosage is from about $1.5\times10^9$ vg/kg of body weight to about $1.5\times10^{13}$ vg/kg, and more preferably from about $1.5\times10^9$ vg/kg to about $1.5\times10^{11}$ vg/kg. In one embodiment, the dosage is about $1.4\times10^8$ vg/kg. In one embodiment, the dosage is about $3.5\times10^{10}$ vg/kg. In another embodiment, the dosage is about $5.6\times10^{11}$ vg/kg. In another embodiment, the dosage is about $5.3\times10^{12}$ vg/kg. In yet another embodiment, the dosage is about $1.5\times10^{12}$ vg/kg. In another embodiment, the dosage is about $1.5\times10^{13}$ vg/kg. In another embodiment, the dosage is about $3.0\times10^{13}$ vg/kg. In another embodiment, the dosage is about $1.0\times10^{14}$ vg/kg. All ranges described herein are inclusive of the endpoints.

In one embodiment, the effective dosage (total genome copies delivered) is from about $10^7$ to $10^{13}$ vector genomes. In one embodiment, the total dosage is about $10^8$ genome copies. In one embodiment, the total dosage is about $10^9$ genome copies. In one embodiment, the total dosage is about $10^{10}$ genome copies. In one embodiment, the total dosage is about $10^{11}$ genome copies. In one embodiment, the total dosage is about $10^{12}$ genome copies. In one embodiment, the total dosage is about $10^{13}$ genome copies. In one embodiment, the total dosage is about $10^{14}$ genome copies. In one embodiment, the total dosage is about $10^{15}$ genome copies.

It is desirable that the lowest effective concentration of virus be utilized in order to reduce the risk of undesirable effects, such as toxicity. Still other dosages and administration volumes in these ranges may be selected by the attending physician, taking into account the physical state of the subject, preferably human, being treated, the age of the subject, the particular disorder and the degree to which the disorder, if progressive, has developed. Intravenous delivery, for example may require doses on the order of $1.5\times10^{13}$ vg/kg.

D. METHODS

In another aspect, a method of transducing a target cell or tissue is provided. In one embodiment, the method includes administering a rAAV having an AAVrh.91 capsid as described herein. As shown in the examples below, the inventors have shown that the AAV termed AAVrh.91 effectively transduces heart (smooth muscle), CNS cells, and skeletal (striated) muscle. In certain embodiments, the methods include systemic administration of a AAVrh.91 vector. In certain embodiments, the AAVrh.91 vector is delivered via a route of administration suitable to target a particular cell or tissue type.

In certain embodiments, provided herein is a method of transducing cells of the CNS (for example, one or more of neurons, endothelial cells, glial cells, and ependymal cells) comprising administering an rAAV having a AAVrh.91 capsid. In one embodiment, intravenous administration is employed. In another embodiment, ICV administration is employed. In yet another embodiment, ICM administration is employed. In certain embodiments, provided herein is a method of delivering a transgene to a cell of the CNS, including but not limited to any of spinal cord, hippocampus, motor cortex, cerebellum, and motor neurons. The method includes contacting the cell with an rAAV having the AAVrh.91 capsid, wherein said rAAV comprises a transgene. In another aspect, the use of an rAAV having the AAVrh.91 capsid is provided for delivering a transgene to the CNS.

As discussed herein, the vectors comprising the AAV capsids described herein are capable of transducing heart tissue at high levels. Provided herein is a method of delivering a transgene to a heart cell. The method includes contacting the heart cell with an rAAV having the AAVrh.91 capsid, wherein said rAAV comprises a transgene. In another aspect, the use of an rAAV having the AAVrh.91 capsid is provided for delivering a transgene to heart. In certain embodiments, the method of delivering a transgene to cells of the heart comprises systemic delivery (e.g., IV administration) of a rAVV having an AAVrh.91 capsid.

In certain embodiments, provided herein is a method of transducing skeletal muscle comprising administering an rAAV having the AAVrh.91 capsid. In certain embodiments, the method comprises delivering an AAVrh.91 capsid to skeletal (striated) muscle. In certain embodiments, a method of delivering a transgene to skeletal muscle is provided. The method includes contacting skeletal muscle with an rAAV having the AAVrh.91 capsid, wherein said rAAV comprises a transgene. In certain embodiments, the method of delivering a transgene skeletal muscle comprises systemic delivery (e.g., IV administration) of a rAVV having an AAVrh.91 capsid.

Single Genome Amplification

AAV genomes have been traditionally isolated from within whole mammalian genomic DNA using PCR based methods: primers are used to detect conserved regions that flank the majority of the diverse VP1 (capsid) gene. The PCR products are then cloned into plasmid backbones and individual clones are sequenced using the Sanger method. Traditional PCR and molecular cloning based viral isolation methods are effective for recovering novel AAV genomes but the genomes recovered can be influenced by PCR-mediated recombination and polymerase errors. In addition, currently available next-generation sequencing technologies have allowed us to sequence viral genomes with unparalleled accuracy compared to the previously used Sanger technology. Provided herein is a novel, higher-throughput, PCR and next-generation sequencing based method of accurately isolating individual AAV genomes from within a viral population. This method, AAV-Single Genome Amplification (AAV-SGA), can be used to improve our knowledge of AAV diversity within mammalian hosts. Moreover, it has allowed us to identify novel capsids for use as vectors for gene therapy.

AAV-SGA has been validated and optimized to effectively recover individual AAV sequences from samples that contain a population of genomes. This technique has been previously used to isolate single HIV and HCV genomes from within human and nonhuman primate hosts. The genomic DNA samples that screen positive for AAV by capsid detection PCR are endpoint-diluted. The dilution at which PCR amplification yields less than 30% positive reactions, according to a Poisson distribution, with 80% confidence, contains a single amplifiable AAV genome. This procedure allows for the PCR amplification of viral genomes with a reduced chance of PCR-mediated recombination caused by template switching of the polymerase. The AAV-SGA PCR amplicons are sequenced using the Illumina MiSeq platform using 2×150 or 2×250 paired-end sequencing. This method allows for accurate de novo assembly of full length AAV VP1 sequences without concern of convergence of sequencing reads from a single sample containing multiple viruses that have regions of high homology.

The AAV-SGA technique has been successful for isolation of multiple novel AAV capsid sequences from rhesus macaque tissues. Multiple viruses from different clades of AAV have been identified from single samples; this demonstrates that a population of AAVs can exist in the host tissues. For example, capsids with sequence similarity to clades D, E, and the outlying "fringe" viruses were isolated from a single liver tissue sample.

The application to of SGA to AAV discovery has not been previously described. The approach addresses the template switching and polymerase error issues which can result in invalid AAV genome sequences. Additionally, the quality of the isolated genome is self-evident when the same sequence is recovered repeated from the same host sample as single isolates.

The following Examples are provided to illustrate various embodiments of the present invention. The Examples are not intended to limit the invention in any way.

E. EXAMPLES

Example 1: Materials and Methods

Detection and Isolation of AAV Sequences
Nonhuman Primate Tissue Sources

Rhesus macaques from the University of Pennsylvania colony were captive-bred and were of Chinese or Indian origin. Liver tissue samples of rhesus macaques were kindly provided by Gene Therapy Program and the laboratory of Timothy H. Lucas, University of Pennsylvania.

Novel AAV Isolation

Genomic DNA was extracted (QIAmp DNA Mini Kit, QIAGEN) and analyzed for the presence of AAV DNA by using a PCR strategy to amplify a 3.1-kb full-length Cap fragment from NHP liver tissue specimens. A 5' primer within a conserved region of the AAV Rep gene was used (AV1NS, 5'-GCTGCGTCAACTGGACCAATGAGAAC-3') (SEQ ID NO: 9) in combination with a 3' primer located in a conserved region downstream of the AAV Cap gene (AV2CAS, 5'-CGCAGAGACCAAAGTTCAACT-GAAACGA-3') (SEQ ID NO: 10) for amplification of full-length AAV Cap amplicons. Q5 High-Fidelity Hot Start DNA Polymerase (New England Biolabs) was used to amplify AAV DNA using the following cycling conditions: 98° C. for 30 s; 98° C. for 10 s, 59° C. for 10 s, 72° C. for 93 s, 50 cycles; and a 72° C. extension for 120 s.

Template genomic DNA samples that resulted in a positive PCR reaction were subjected to AAV-Single Genome Amplification (AAV-SGA). Genomic DNA was endpoint diluted in 96-well plates such that fewer than 29 PCR reactions, using the same primers mentioned above, out of 96 yielded an amplification product. According to a Poisson distribution, the DNA dilution that yields PCR products in no more than 30% of wells contains one amplifiable AAV DNA template per positive PCR more than 80% of the time. AAV DNA amplicons from positive PCR reactions was sequenced using the Illumina MiSeq 2×150 or 2×250 paired end sequencing platforms and resulting reads were de novo assembled using the SPAdes assembler (cab.spbu.ru/software/spades). Sequence analysis was performed using NCBI BLASTn (blast.ncbi.nlm.nih.gov) and the Vector NTI AlignX software (Thermo Fisher).

Vector Production Using Novel AAV Capsids

AAV capsid gene DNA sequences from PCR products of interest were TOPO-cloned and amplified (Invitrogen). Amplified capsid genes were further cloned into AAV transplasmid backbones containing the AAV2 Rep gene and other associated plasmid elements.

AAV vectors were produced and titrated by the Penn Vector Core as described before (see, e.g., Lock, M., et al. (2010) Hum. Gene Ther. 21:1259-71). HEK293 cells were triple transfected then the cell culture supernatant was harvested, concentrated, and purified with an iodixanol gradient. The purified vectors were titrated with droplet digital PCR using primers targeting the rabbit beta-globin polyA sequence as described before (see, e.g., Lock, M., et al. (2014) Hum. Gene Ther. Methods 25:115-125).

In Vivo Characterization of Novel AAV Capsids in Rodents
Animals

All animal protocols were approved by the Institutional Animal Care and Use Committee of the University of Pennsylvania. C56BL/6J mice were purchased from the Jackson Laboratory. For GFP reporter gene experiments, adult (6-8 weeks old) males were injected. Animals were housed in standard caging of two to five animals per cage. Cages, water bottles, and bedding substrates were autoclaved in the barrier facility, and cages were changed once per week. An automatically controlled 12-h light or dark cycle was maintained. Each dark period began at 7:00 p.m. (±30 min). Irradiated laboratory rodent food was provided ad libitum.

Test Articles and Study Design

Mice received $1\times10^{12}$ GC per mouse of each vector in 0.1 mL intravenously (IV) via the lateral tail vein or were injected intracerebroventricularly (ICV) into the lateral ventricle of the brain at a dose of $1\times10^{11}$ GC in 5 uL per mouse. Three or five mice were dosed for each group.

Mice were euthanized by inhalation of $CO_2$ 14 days post injection. Tissues were collected, snap-frozen on dry ice for biodistribution analysis or were immersion-fixed in 10% neutral formalin, cryo-preserved in sucrose, frozen in OCT, and sectioned with a cryostat for GFP direct observation. Tissues used for endothelial cell transduction analysis were paraffin-embedded after necropsy.

Vector Biodistribution

Tissue genomic DNA was extracted with QIAamp DNA Mini Kit (QIAGEN), and

AAV vector genomes were quantified by real-time PCR using Taqman reagents (Applied Biosystems, Life Technologies) with primers/probe targeting the EGFP sequence of the vectors.

Reporter Gene Visualization

To observe direct GFP fluorescence, tissue samples were fixed in formalin for about 24 hours, briefly washed in PBS, equilibrated sequentially in 15% and 30% sucrose in PBS until they reached maximum density, and were then frozen in OCT embedding medium for the preparation of cryosections. Sections were mounted in Fluoromount G containing DAPI (Electron Microscopy Sciences, Hatfield, PA) as nuclear counterstain.

GFP immunohistochemistry was performed on paraffin-embedded tissue samples. Sections were deparaffinized with ethanol and xylene, boiled for 6 min in 10 mM citrate buffer (pH 6.0) for antigen retrieval, treated sequentially with 2% $H_2O_2$ for 15 min, avidin/biotin blocking reagents for 15 min each (Vector Laboratories), and blocking buffer (1% donkey serum in PBS+0.2% Triton) for 10 min. This was followed by incubation with primary antibodies for 1 hour and biotinylated secondary antibodies in blocking buffer for 45 min (Jackson Immunoresearch). The primary antibody, chicken anti-GFP (Abcam ab13970) and rabbit anti-CD31 (Abcam ab28364) endothelial cell marker, were used. A Vectastain Elite ABC kit (Vector Laboratories) was used following the manufacturer's instructions, with DAB as substrate, to visualize bound antibodies as brown precipitate.

For immunofluorescence, paraffin sections were deparaffinized and blocked after antigen retrieval with 1% donkey serum in PBS+0.2% Triton for 15 min followed by sequential incubation with primary (1 h) and fluorescence-labeled secondary antibodies (45 min, Jackson Immunoresearch) diluted in blocking buffer. Antibodies used were chicken anti-GFP (Abcam ab13970), rabbit anti-CD31 (Abcam ab28364), and mouse anti-NF-200 (clone RT97, Millipore CBL212). The primary antibodies were mixed together and the GFP and NF-200 antibodies were detected via FITC- and TRITC-labeled secondary antibodies, respectively. The signal for the rabbit antibody against CD31 was enhanced using a VectaFluor™ Excel Amplified DyLight® 488 Anti-Rabbit IgG kit according to the manufacturer's protocol (Vector Labs). Fluorescence and brightfield microscopy images were taken with a Nikon Eclipse TiE microscope.

Nonhuman Primate Transduction Evaluation of Barcoded Vector Transgenes

Test Articles and Study Design

Five novel capsids and five control capsids (AAVrh.90, AAVrh.91, AAVrh.92, AAVrh.93, AAVrh.91.93, AAV8, AAV6, AAVrh32.33, AAV7, and AAA/9) were used to package modified ATG-depleted self-complementary eGFP (dGFP) transgenes. Each unique capsid preparation contained the dGFP transgene with a corresponding unique 6 bp barcode prior to the polyadenylation sequence of the vector genome. The transgene contained a CB8 promoter and an SV40 polyadenylation sequence (AAVsc.CB8.dGFP.barcode.SV40). AAV vectors were produced and titrated by the Penn Vector Core as described before (see, e.g., Lock, M., et al. (2010) Hum. Gene Ther. 21:1259-71). HEK293 cells were triple transfected then the cell culture supernatant was harvested, concentrated, and purified with an iodixanol gradient. The purified vectors were titrated with droplet digital PCR using primers targeting the SV40 polyA sequence as described before (see, e.g., Lock, M., et al. (2014) Hum. Gene Ther. Methods 25:115-25).

The ten purified vectors were pooled at equal genome copy quantities for injection into two separate animals: total doses delivered were 2e13 GC/kg via IV delivery and 3e13 GC/animal via intra-cisterna magna (ICM) delivery into the intrathecal space. Animals were sacrificed at 30 days post injection and all tissues were harvested in RNAlater (QIAGEN) for downstream transgene RNA expression analysis.

Animals

All animal procedures were approved by the Institutional Animal Care and Use Committee of the University of Pennsylvania. Cynomolgus macaques (*Macaca fascicularis*) were donated from Bristol Meyers Squibb (USA). Animals were housed in an Association for Assessment and Accreditation of Laboratory Animal Care International-accredited Nonhuman Primate Research Program facility at the Children's Hospital of Philadelphia, Philadelphia, PA in stainless-steel squeeze back cages. Animals received varied enrichments such as food treats, visual and auditory stimuli, manipulatives, and social interactions.

A 10-year-old male, 8 kg animal was used for the ICM study. A 6-year-old, male, 6.98 kg animal was used for the IV study. This animal was screened for the presence of AAV-neutralizing antibodies and was seronegative for AAV6, AAV8, and AAVrh32.33, at baseline. At baseline, this animal had neutralizing antibody titers of 1:5 and 1:10 against AAV7 and AAV9, respectively.

ICM Injection Procedure

The anesthetized macaque was placed on an X-ray table in the lateral decubitus position with the head flexed forward. Aseptic technique was used to advance a 21 G-27 G, 1- to 1.5-inch Quincke spinal needle (Becton Dickinson, Franklin Lakes, NJ, USA) into the suboccipital space until the flow of CSF was observed. 1 mL of CSF was collected for baseline analysis. The correct placement of needle was verified by fluoroscopy (OEC 9800 C-arm; GE Healthcare, Little Chalfont, UK) in order to avoid potential injury of the brainstem. After CSF collection, a Luer access extension or a small-bore T port extension set catheter was connected to the spinal needle to facilitate dosing of 180 mg/mL Iohexol contrast media (GE Healthcare, Little Chalfont, UK). After verifying needle placement, a syringe containing the test article (volume equivalent to 1 mL plus the syringe volume and linker dead space) was connected to the flexible linker and injected over 30±5 s. The needle was removed, and direct pressure was applied to the puncture site.

IV Injection Procedure

The macaque was administered with 10 mL of vector test article into a peripheral vein at a rate of 1 mL/min via an infusion pump (Harvard Apparatus, Holliston, MA).

Transgene Expression Analysis

Whole tissue RNA was extracted from all RNALater-treated tissues using TRIzol according to the manufacturer's specifications (Life Technologies). Extracted RNA was treated with DNase I according to the manufacturer's protocol (Roche, Basel, Switzerland). RNA was purified using the RNeasy Mini Kit (QIAGEN). Reverse transcription synthesis of cDNA was performed using the Applied Biosystems High Capacity cDNA Reverse Transcriptase Kit (Life Technologies). Primers targeting regions flanking the 6 bp unique barcode were used to PCR amplify a 117 bp amplicon ((forward primer: GGCGAACAGCGGACACC-GATATGAA (SEQ ID NO: 11), reverse primer: GGCTCTCGTCGCGTGAGAATGAGAA (SEQ ID NO: 12)) and Q5 High-Fidelity Hot Start DNA Polymerase (New England Biolabs) was used to perform the reactions using the following cycling conditions: 98° C. for 30 s; 98° C. for 10 s, 72° C. for 17 s, 25 cycles; and a 72° C. extension for 120 s. Amplicons were sequenced using the MiSeq Standard 2×150 bp sequencing platform (Illumina).

Barcode reads were analyzed using the fastq-join program from the Expression Analysis package (github.com/ExpressionAnalysis/ea-utils), cutadapt (cutadapt.readthedocs.io/ en/stable/), the fastx toolkit package (hannonlab.cshl.edu/fastx_toolkit/), and R version 3.3.1. (cran.r-project.org/bin/windows/base/old/3.3.1/). Barcode expression count data from tissue samples were normalized to barcode counts from the sequenced injection vector material for each animal and barcode proportions from each tissue sample were plotted using GraphPad Prism version 7.04.

ICM AAVrh.91 Transduction Characterization Studies in NHP

Animals and Study Design

All animal procedures were approved by the Institutional Animal Care and Use Committee of the University of Pennsylvania. 6 adult Rhesus macaques (*Macaca mulatta*) were sourced from Orient Bioresources (Alice, TX) via PreLabs. Animals were housed in an Association for Assessment and Accreditation of Laboratory Animal Care International-accredited Nonhuman Primate Research Program facility at the Children's Hospital of Philadelphia, Philadelphia, PA in stainless-steel squeeze back cages. Animals received varied enrichments such as food treats, visual and auditory stimuli, manipulatives, and social interactions.

AAVrh.91, AAV1, and AAV9 capsids were packaged with the AAV.CB7.CI.eGFP.WPRE.rBG transgene using methods that were previously described (see, e.g., Lock, M., et al. (2010) Hum. Gene Ther. 21:1259-71 and Lock, M., et al. (2014) Hum. Gene Ther. Methods 25:115-25). A dose of 1.557e13 GC were injected ICM into each animal. ICM injection methods are described above. Animals were sacrificed 28-31 days after injection and tissues were harvested on dry ice for DNA Vector Biodistribution studies. The brain was collected whole, trimmed, and sectioned using a brain mold according to the Recommended Practices for Sampling and Processing the Nervous System (Brain, Spinal Cord, Nerve, and Eye) during Nonclinical General Toxicity Studies. Pardo, et. al. (2012). STP Position Paper. Tissues were also collected, formalin-fixed, and were paraffin-embedded for histopathological analyses.

Histological Analyses of Vector Transduction

For GFP immunohistochemistry (IHC), sections were deparaffinized with ethanol and xylene, boiled for 6 min in 10 mM citrate buffer (pH 6.0) for antigen retrieval, treated sequentially with 2% H2O2 for 15 min, avidin/biotin blocking reagents for 15 min each (Vector Laboratories), and blocking buffer (1% donkey serum in PBS+0.2% Triton) for 10 min. This was followed by incubation with a goat antibody against GFP (Novus Biologicals, NB100-1770, 1:500) overnight at 4° C. in blocking buffer and, after washing in PBS, biotinylated secondary anti-goat antibodies for 45 min (Jackson ImmunoResearch, 1:500) in blocking buffer. After washing in PBS a Vectastain Elite ABC kit (Vector Laboratories) was applied following the manufacturer's instructions, with DAB as substrate, to visualize bound antibodies as brown precipitate.

For immunofluorescence (IF), paraffin sections were pretreated similarly but without $H_2O_2$ and avidin/biotin blocking. The following primary antibodies were combined and sections incubated for 1 h at 37° C.: goat anti-GFP (Novus Biologicals, NB100-1770; 1:300-500), guinea pig anti-NeuN (Millipore, ABN90; 1:500), chicken anti-GFAP (Abcam, ab4674; 1:1000). This was followed after washing in PBS by incubation with fluorochrome-labeled secondary antibodies (FITC anti-goat, Cy5 anti-guinea pig, TRITC anti-GFAP; Jackson ImmunoResearch, 1 h at room temperature, 1:200). After washing in PBS, sections were mounted in Fluoromount G containing DAPI (Electron Microscopy Sciences) to counterstain nuclei.

Vector Biodistribution Analysis

Tissue genomic DNA was extracted with QIAamp DNA Mini Kit (QIAGEN), and AAV vector genomes were quantified by real-time PCR using Taqman reagents (Applied Biosystems, Life Technologies) with primers/probe targeting the EGFP sequence of the vectors.

Cellular Transduction Quantification Analyses in Central Nervous System Tissues (CNS)

IF slides were prepared as described above and scanned using an Aperio VERSA Scanning System. Whole slides were scanned at low magnification (1.25×) first to define the regions of interest. After the initial 1.25× scans, slides were scanned at 20× magnification with four different channels DAPI, FITC, TRITC and Cy5. Transduced neurons and astrocytes were quantified from the final 20× scans using co-staining detection algorithms developed with Visiopharm image analysis software v.2019.07.

Mass Spectrometry (MS) Analysis for Modification of Amino Acids on AAV Capsid Reagents Ammonium bicarbonate, dithiothreitol (DTT), iodoacetamide (IAM) were purchased from Sigma (St. Louis, MO). Acetonitrile, formic acid, and trifluoroacetic acid (TFA), 8M guanidine hydrochloride (GndHCl), and trypsin were purchased Thermo Fisher Scientific (Rockford, IL).

Trypsin Digestion

Stock solutions of 1 M DTT and 1.0 M iodoacetamide were prepared. Capsid proteins were denatured and reduced at 90° C. for 10 minutes in the presence of 10 mM DTT and 2M GndHCl. The samples were allowed to cool to room temperature then alkylated with 30 mM IAM at room temperature for 30 minutes in the dark. The alkylation reaction was quenched with the addition of 1 mL DTT. To the denatured protein solution add 20 mM Ammonium Bicarbonate, pH 7.5-8 at a volume that dilutes the final GndHCl concentration to 200 mM. Add trypsin solution for a 1:20 trypsin to protein ratio and incubate at 37° C. for 4 hours. After digestion, add TFA to a final of 0.5% to quench digestion reaction.

LC-MS/MS

Online chromatography was performed with an Acclaim PepMap column (15 cm long, 300-μm inner diameter) and a Thermo UltiMate 3000 RSLC system (Thermo Fisher Scientific) coupled to a Q Exactive HF with a NanoFlex source (Thermo Fisher Scientific). During on-line analysis the column temperature was regulated to a temperature of 35° C. Peptides were separated with a gradient of mobile phase A (MilliQ water with 0.1% formic acid) and mobile phase B (acetonitrile with 0.1% formic acid). The gradient was run from 4% B to 6% B over 15 min, then to 10% B for 25 min (40 minutes total), then to 30% B for 46 min (86 minutes total). Samples are loaded directly to the column. The column size is 75 cm×15 um I.D. and is packed with 2 micron C18 media (Acclaim PepMap). Due to the loading, lead-in, and washing steps, the total time for an LC-MS/MS run was about 2 hours.

MS data were acquired using a data-dependent top-20 method for the Q Exactive HF, dynamically choosing the most abundant not-yet-sequenced precursor ions from the survey scans (200-2000 m/z). Sequencing was performed via higher energy collisional dissociation fragmentation with a target value of 1e5 ions determined with predictive automatic gain control and an isolation of precursors was performed with a window of 4 m/z. Survey scans were acquired at a resolution of 120,000 at m/z 200. Resolution for HCD spectra was set to 30,000 at m/z200 with a maximum ion injection time of 50 ms and a normalized collision energy of 30. The S-lens RF level was set at 50, which gave optimal transmission of the m/z region occupied by the peptides from our digest. We excluded precursor ions with single, unassigned, or six and higher charge states from fragmentation selection.

Data Processing

BioPharma Finder 1.0 software (Thermo Fisher Scientific) was used for analysis of all data acquired. For peptide mapping, searches were performed using a single-entry protein FASTA database with carbamidomethylation set as a fixed modification; and oxidation, deamidation, and phosphorylation set as variable modifications, a 10 ppm mass accuracy, a high protease specificity, and a confidence level of 0.8 for MS/MS spectra. The percent modification of a peptide was determined by dividing the mass area of the modified peptide by the sum of the area of the modified and native peptides. Considering the number of possible modification sites, isobaric species which are modified at different sites may co-migrate in a single peak. Consequently, fragment ions originating from peptides with multiple potential modification sites can be used to locate or differentiate multiple sites of modification. In these cases, the relative intensities within the observed isotope patterns can be used to specifically determine the relative abundance of the different modified peptide isomers. This method assumes that the fragmentation efficiency for all isomeric species is the same and independent on the site of modification. This approach allows the definition of the specific modified sites and also the potential combinations involved.

Example 2: AAV-SGA

Adeno-associated viruses (AAVs) are single-stranded DNA parvoviruses that are non-pathogenic and weakly immunogenic which make them effective candidates as vectors for gene therapy. Since the discovery of the first generation of AAVs (AAV1-6), our lab has led the effort to isolate a large number of viruses from a variety of higher primate species. This second generation of AAVs identified here were isolated using bulk PCR-based techniques using primers against conserved regions that were specific for primate-derived AAV genomes. Using AAV-SGA we have explored the genetic variation of AAVs in their natural mammalian hosts (FIG. 1).

Figure 2:
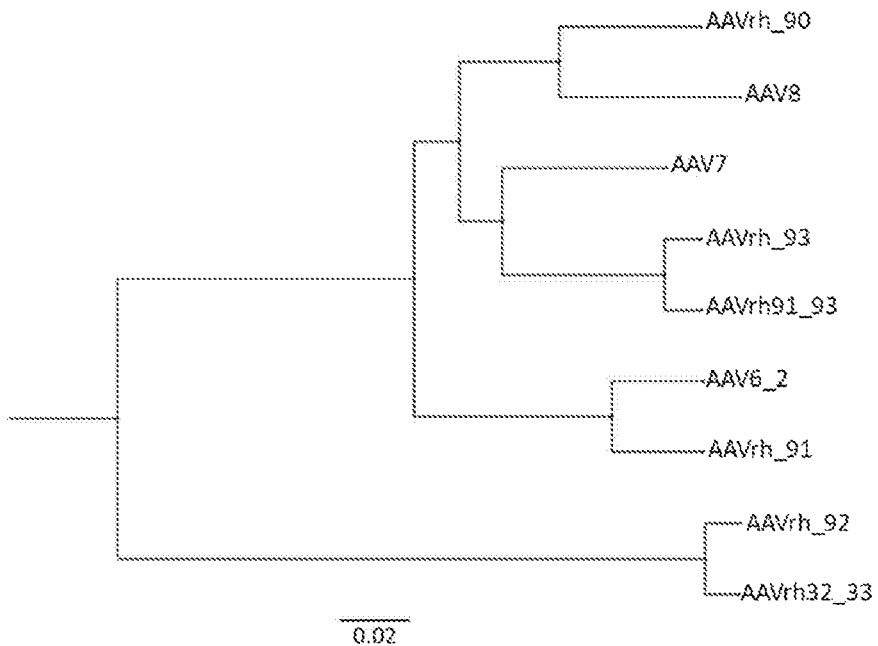
FIG. 2 is a diagram showing the neighbor-joining phylogeny of DNA genome sequences of novel AAV natural isolates and representative clade controls.

AAV-SGA is a powerful technique that can be used to isolate single viral genomes from within a mixed population with high accuracy. In this study, we used AAV-SGA to identify novel AAV genomes from rhesus macaque tissue specimens. The novel viral isolates were genetically diverse and can be classified into clades D, E, and the Fringe clade (FIG. 2).

Vectors containing the enhanced GFP (eGFP) gene were produced using the novel capsids and previously identified capsids. The vectors with various capsids were tested in mice via intravenous (IV) (FIG. 5A) and intracerebroventricular (ICV) (FIG. 5C) delivery routes. Biodistribution of vector genomes was assayed in heart, skeletal muscle, liver, and brain tissues (FIG. 5B and FIG. 5D). Our mouse studies showed that the novel capsids typically demonstrated clade-specific transduction patterns (with the exception of the clade D capsids). For AAV6.2 and AAVrh.91, analysis of cerebellum and ventricle/choroid plexus revealed transduction following ICV delivery, although patterns of eGFP detection differed. IV delivery of the clade A members resulted in high levels of transduction in heart, brain, and muscle tissues.

Figure 6A:
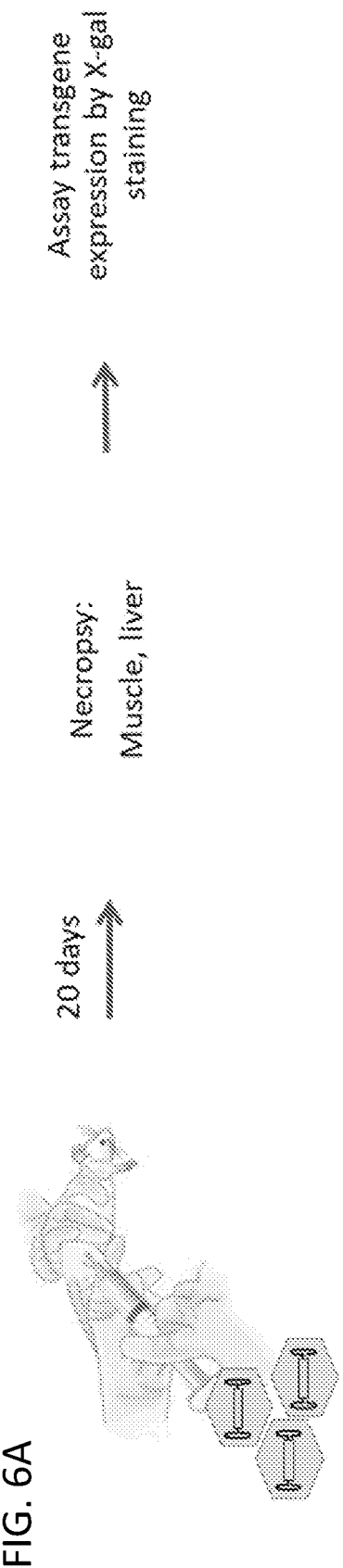
FIG. 6A and FIG. 6B show analysis of LacZ expression in muscle following IM delivery of AAV vectors. Mice were administered 3e9 GC of vectors having various capsids and expressing LacZ under the CMV promoter. On day 20, muscle tissue was harvested, and transgene expression was evaluated by X-gal staining (darker staining).
Figure 6B:
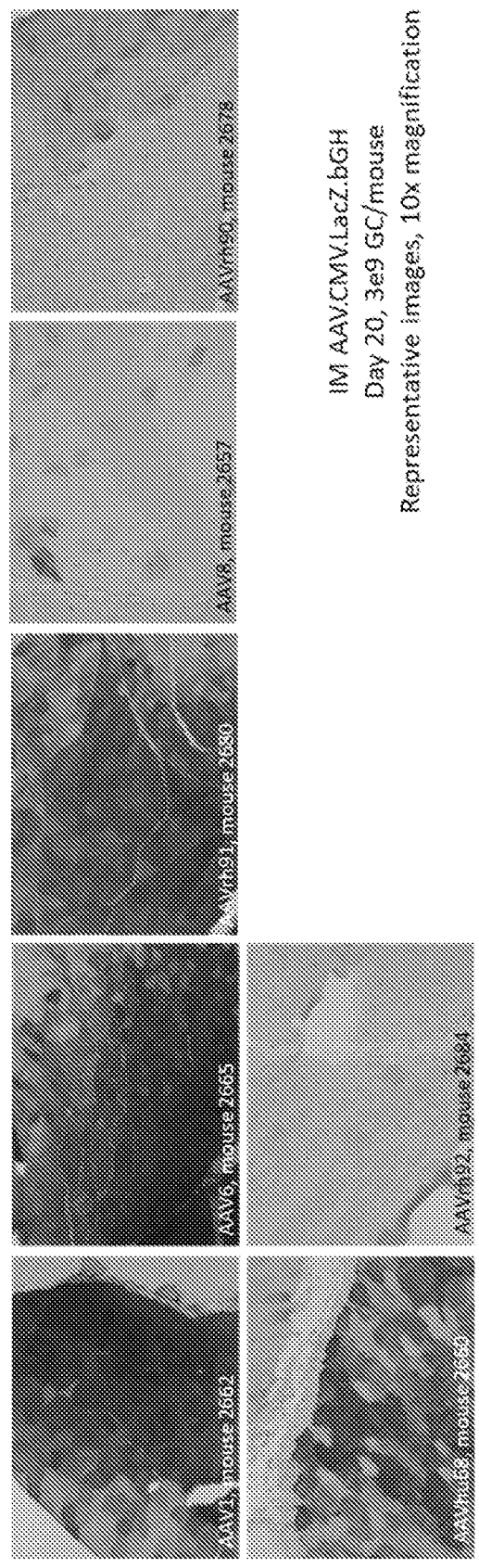
Figure 7:
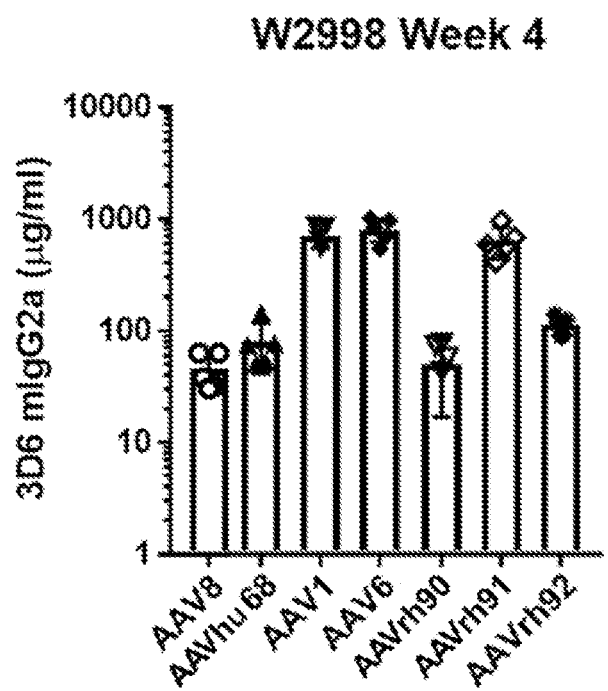
FIG. 7 shows levels of mAb in serum following IM delivery of various AAV vectors. B6 mice were administered 1e11 GC of vector expressing the 3D6 antibody under the tMCK promoter.

Additional studies were conducted to evaluate transduction of muscle tissue of following IM delivery. Vectors having various capsids and expressing LacZ (FIG. 6A) or a mAb were delivered IM and expression of the transgenes was analyzed via staining of muscle fibers (for LacZ) or detection in serum (for mAb). FIG. 6B shows a comparison of muscle transduction by detection of LacZ. The clade A vector AAVrh.91 transduced muscle fibers with high efficiency (darker staining). IM delivery via AAVrh.91 also resulted in high levels of detectable mAb in serum (FIG. 7). FIG. 8 shows yields for various preparations of mAb and LacZ vectors. For both transgenes, AAVrh.91 had higher yields compared to AAV1 and AAV6.

Figure 9:
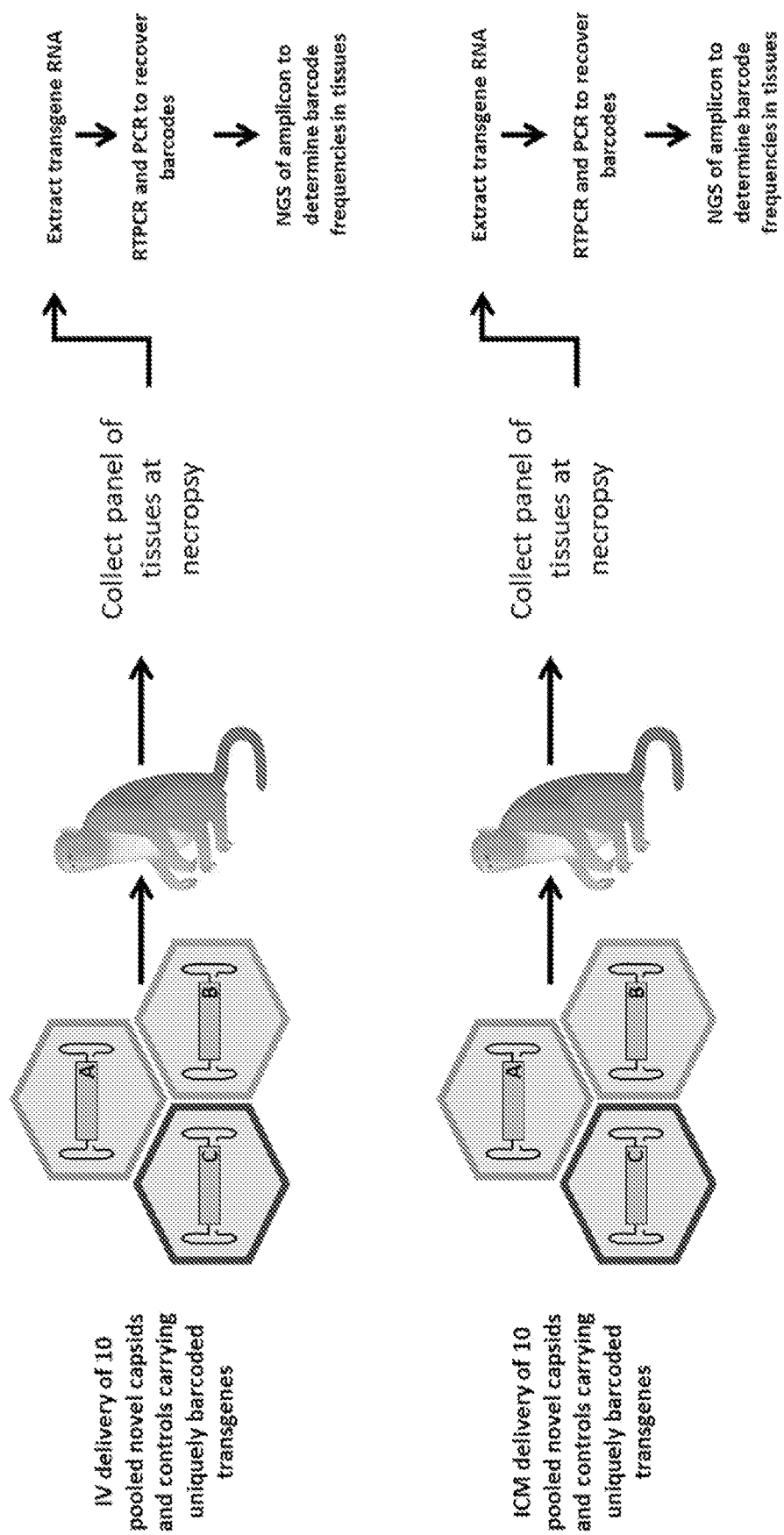
FIG. 9 shows experimental designs for the pooled barcoded vector studies in NHP (data shown in FIG. 10A-FIG. 10C). Five novel capsids and five controls (AAVrh.90, AAVrh9.1, AAVrh.92, AAVrh.93, AAVrh.91.93, AAV8, AAV6.2, AAVrh32.33, AAV7, and AAV9) were packaged with a modified ATG-depleted GFP transgene with unique 6 bp barcodes. Vectors were pooled at equal quantities and injected IV or ICM in cynomologus macaques (total doses: 2e13 GC/kg IV and 3e13 GC ICM). The IV injected animal was seronegative for AAV6, AAV8, and AAVrh32.33 at baseline and had neutralizing antibody titers of 1:5 and 1:10 against AAV7 and AAV9, respectively.

Example 3: Transduction Evaluation of Novel AAV Natural Isolates in Nonhuman Primates Using a Barcoded Transgene System Adeno-associated virus (AAV) vectors have been shown to be safe and effective gene transfer vehicles in clinical applications yet they can be hindered by preexisting immunity to the virus and can have restricted tissue tropism. We demonstrated that a barcoded transgenes method is effective to compare transduction of various tissues in a single animal by multiple AAV serotypes simultaneously. This technique reduces number of animals used and prevents foreign transgene-related immune responses. Accordingly, the novel capsids and their respective prototypical clade member controls (AAV6.2, AAV7, AAV8, AAVrh32.33, and AAV9) were made into vectors containing a modified eGFP transgene and unique six base pair barcodes prior to the polyA signal of the transcript (FIG. 9). The transgene was modified by deletion of ATG sequence motifs to prevent polypeptide translation and consequent immune response towards a foreign protein. Vectors were pooled at equal quantities and injected IV or ICM in cynomologus macaques (total doses: 2e13 GC/kg IV and 3e13 GC ICM) to assess systemic and central nervous system transduction patterns of the novel capsids. The IV injected animal was seronegative for AAV6, AAV8, and AAVrh32.33 at baseline and had neutralizing antibody titers of 1:5 and 1:10 against AAV7 and AAV9, respectively.

Figure 10A:
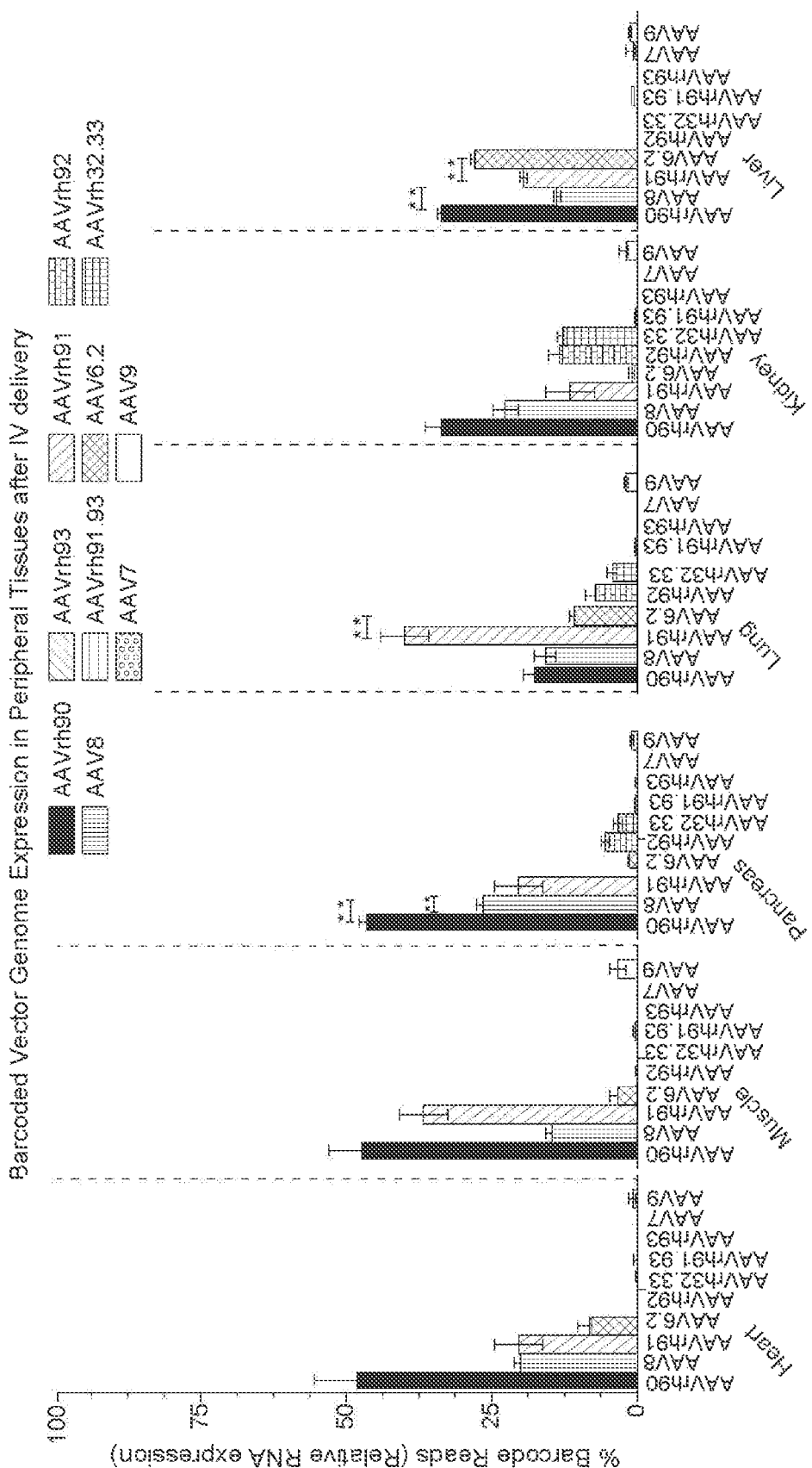
FIG. 10A-FIG. 10C are graphs showing RNA expression analysis of barcoded capsids after IV delivery (FIG. 10A and FIG. 10B) and ICM delivery (FIG. 10C). IV Administration—2e13 GC/kg total dose, necropsy at day 30 (This animal had low levels of AAV7 and AAV9 Nabs at baseline). ICM Administration—3e13 GC/animal, necropsy at day 30. Barcode frequencies in each tissue RNA sample were normalized to frequencies in injection input material such that each barcode had an equivalent representation (10%) in the mixtures. Input quantities of ten vectors ranged from 8.5-12% Values are expressed as mean±SEM, **p<0.001.
Figure 10B:
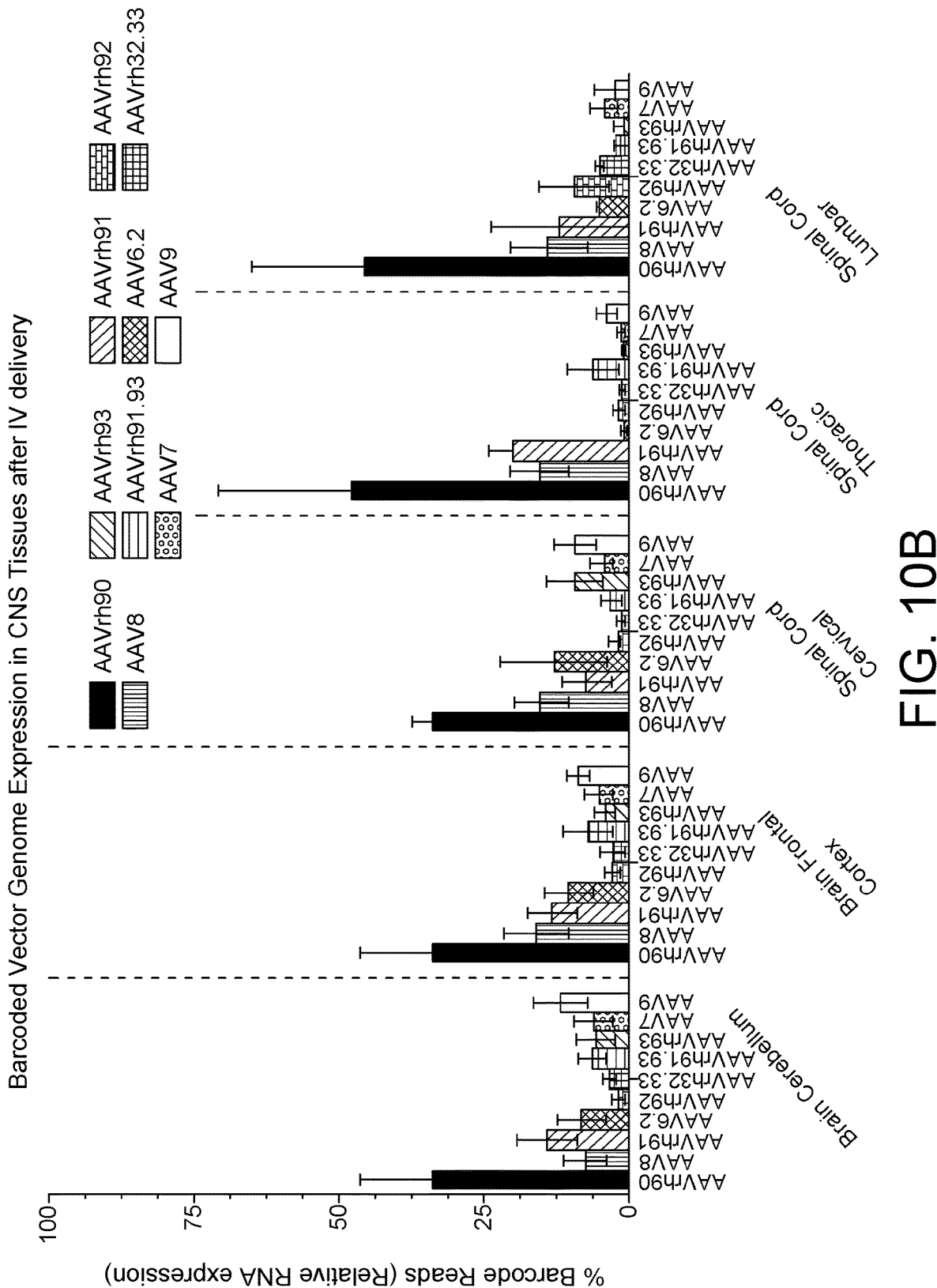
Figure 10C:
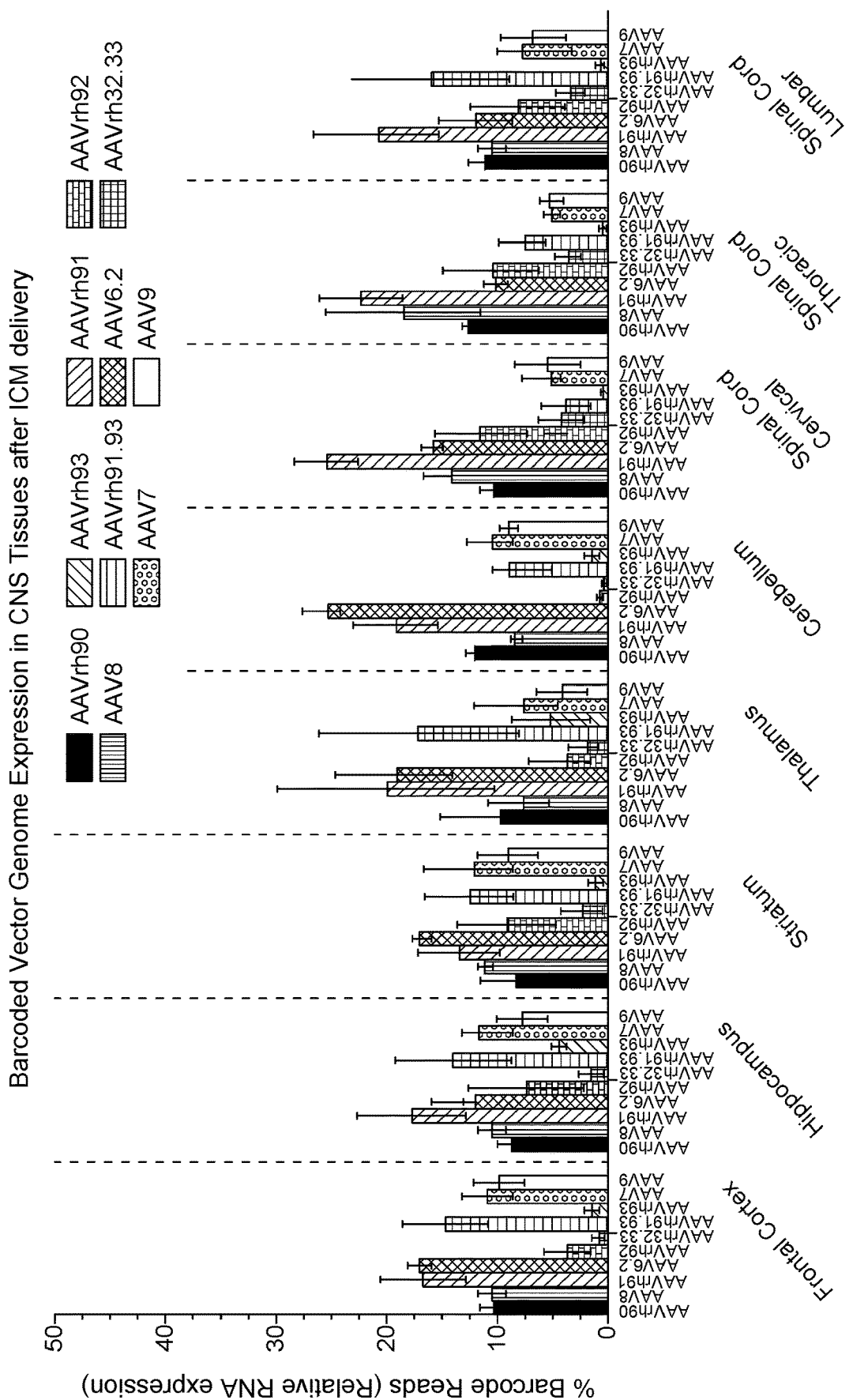
Figure 11A:
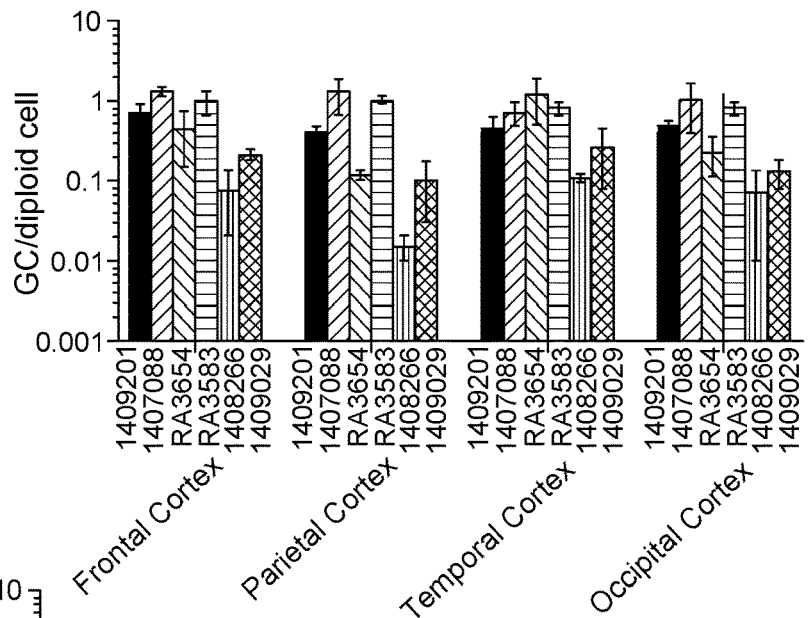
FIG. 11A-FIG. 11C show detection of biodistribution following delivery of AAVrh.91, AAV1, and AAV9 capsids with CB7.CI.eGFP.WPRE.rBG to NHP. A dose of 1.557e13 GC was injected ICM into each animal. Animals were sacrificed 28-31 days after injection and tissues were harvested for analysis (detection of eGFP by qPCR). Values are expressed as mean±SD. Animals: AAVrh.91 (1409201 and 1407088), AAV1 (RA3654 and RA3583), AAV9 (1408266 and 1409029).
Figure 11B:
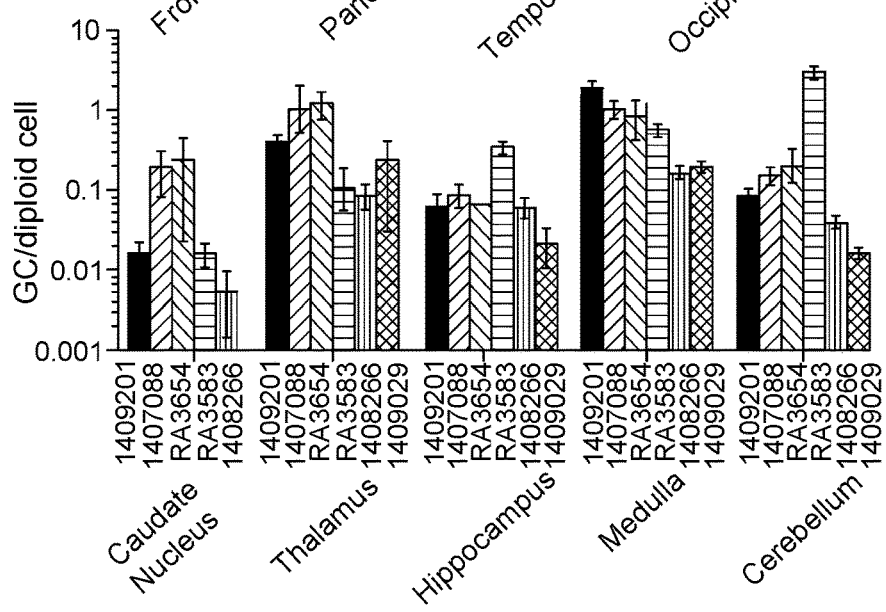
Figure 11C:
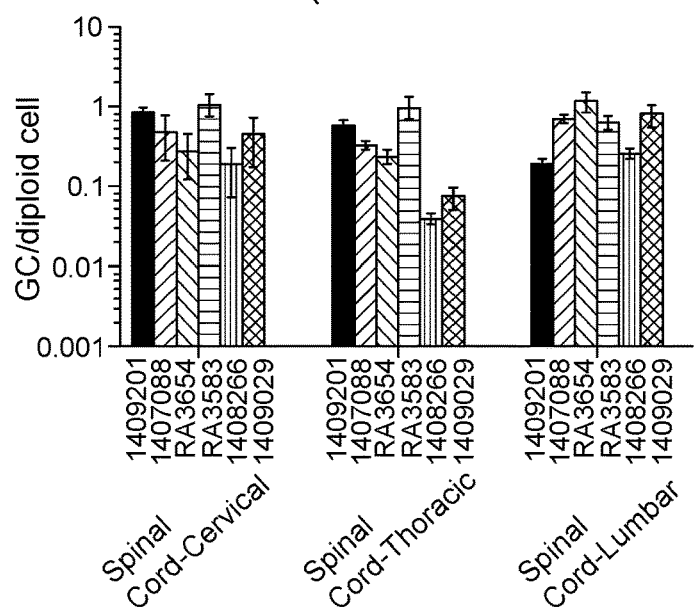
Figure 12:
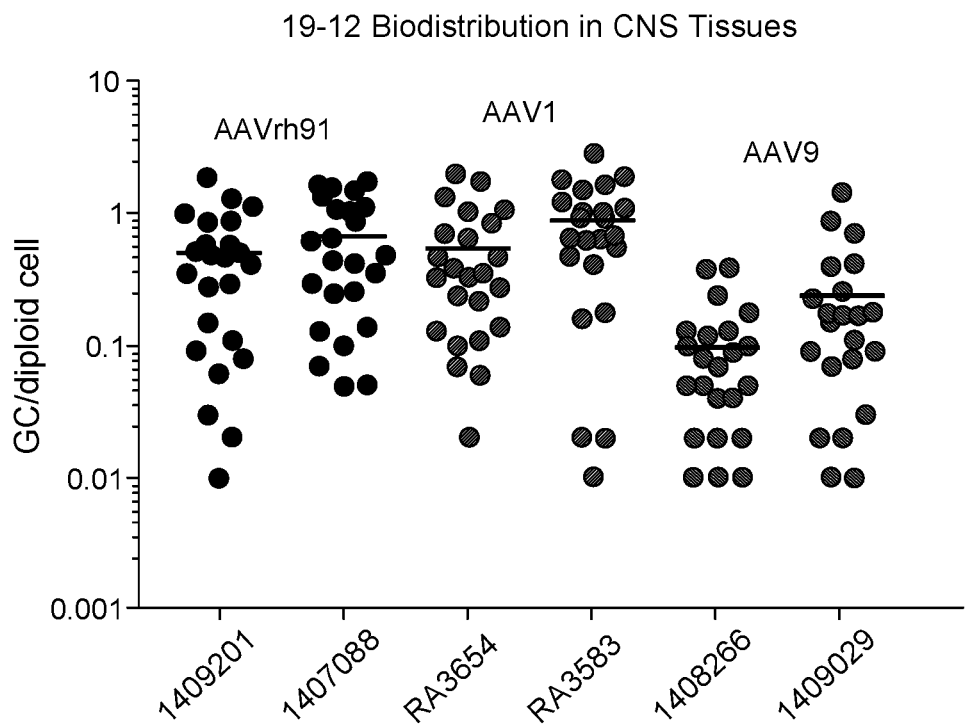
FIG. 12 shows biodistribution in CNS tissues. Data shown correspond to tissue GC values shown in FIG. 11A-FIG. 11C grouped by animal.

As shown in FIG. 10A, IV delivery of the clade A vector, AAVrh.91, transduced peripheral organs, including lung, muscle, and heart, with high efficiency compared to the other capsids tested. AAVrh.91 also showed high transduction levels in NHP CNS tissues following ICM delivery (FIG. 10C).

Figure 13A:
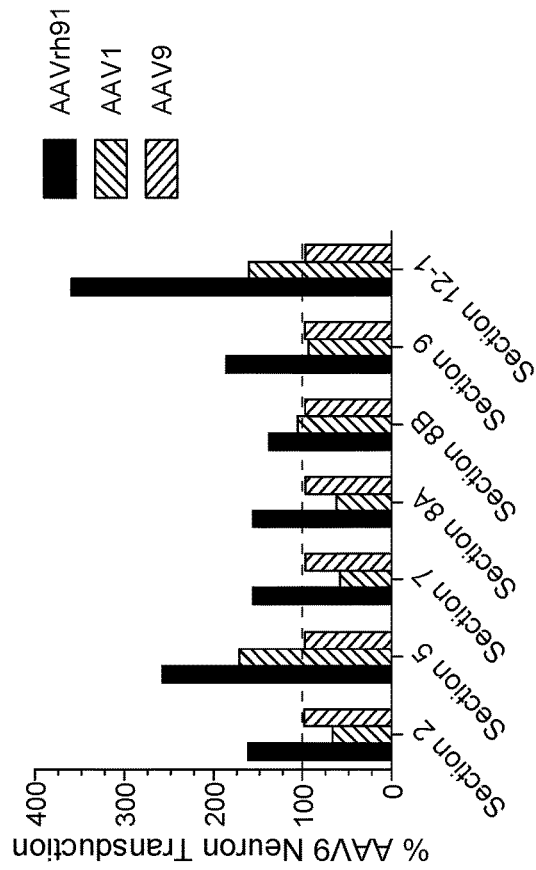
FIG. 13A-FIG. 13C show an analysis of neuron transduction following delivery of AAVrh.91, AAV1, and AAV9 vectors to NHP (as described for FIG. 11A-FIG. 11C)
Figure 13B:
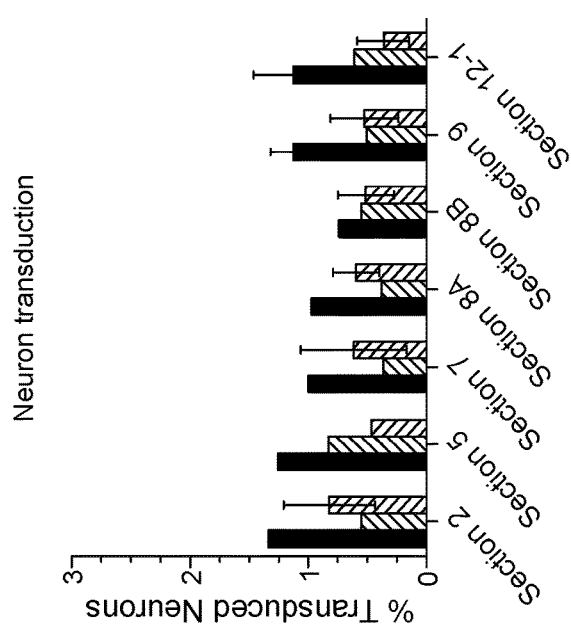
Figure 13C:
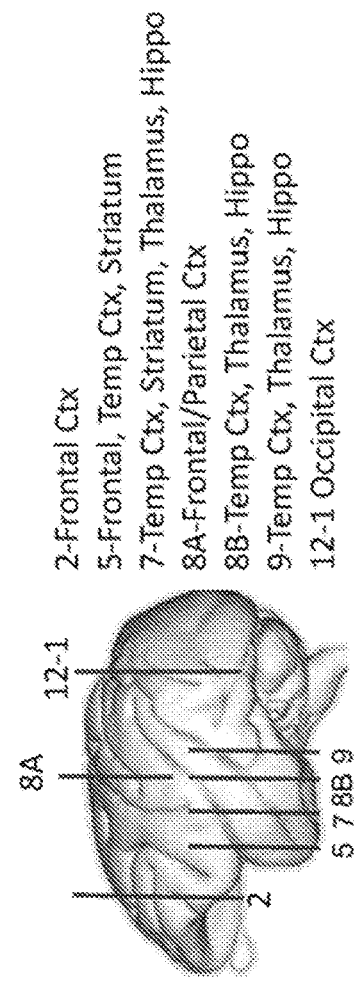

Subsequent studies to evaluate ICM delivery also revealed improved transduction in the brain and spinal cord of NHPs with AAVrh.91 (1409201, 1407088) in comparison to AAV1 (RA3654, RA3583) and AAV9 (1408266, 1409029) (FIG. 11A-FIG. 11C, FIG. 12). AAVrh.91 effectively transduced frontal, temporal, and occipital cortices following ICM delivery. AAVrh.91 also transduced both neurons and astrocytes at high levels compared to AAV9 (FIG. 13A-FIG. 13C). AAVrh.91 showed robust motor neuron transduction in the spinal cord. Interestingly, IHC staining revealed that AAVrh.91 and AAV1 both showed efficient transduction of ependymal cells that line the ventricles of the brain. Levels of liver transduction by AAVrh.91 correlated with neurocortex transduction levels in each animal after ICM delivery. There were variable levels of vector transduction in the heart after ICM delivery by all vectors that were tested. Notably, GFP expression in heart did not correlate with higher levels of brain (cortical) expression after ICM delivery, while high levels of liver were observed. Taken together, these results demonstrate that AAVrh.91 is a potent gene therapy vector that is efficient to produce and effectively transduces a variety of cell types in the brain and spinal cord after ICM delivery in primates.

Figure 14A:
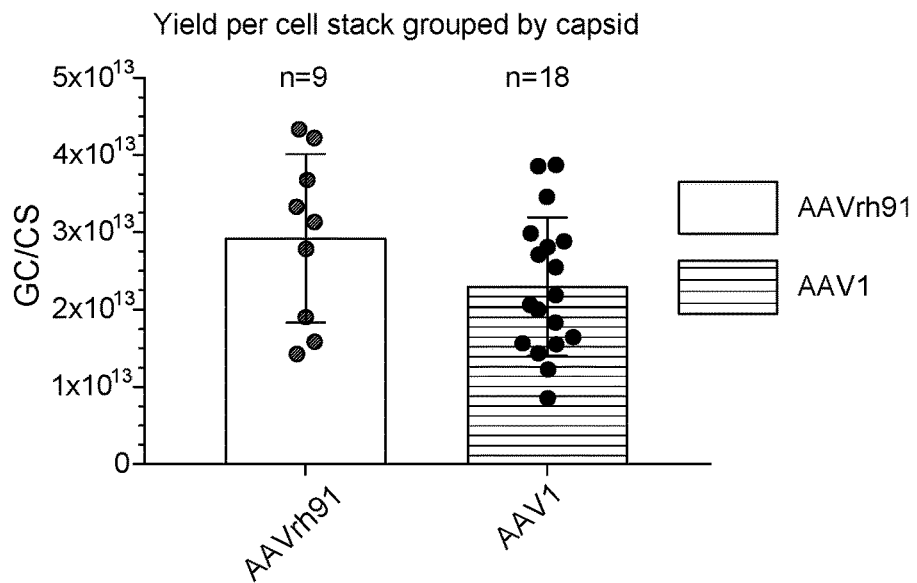
FIG. 14A-FIG. 14B show small scale preparation titers for production of various AAV vectors. Each dot represents an individual small-scale preparation. Values are expressed as mean±SD.
Figure 14B:
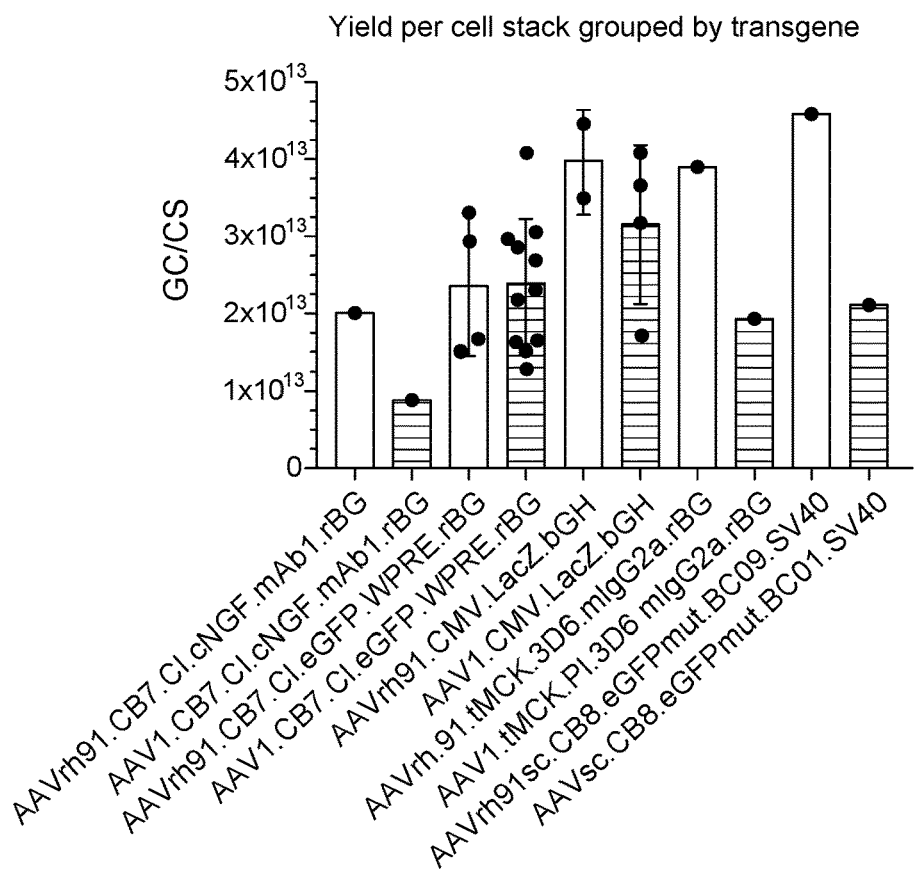
Figure 15A:
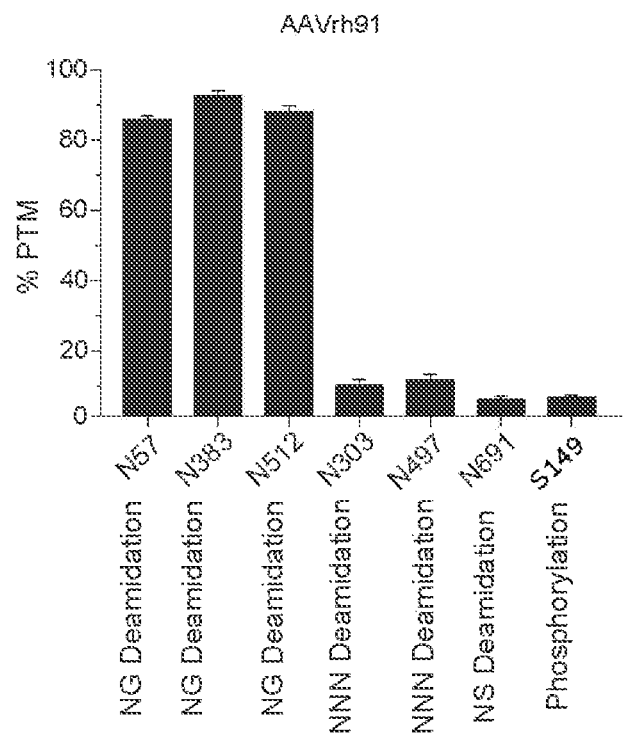

When manufactured by the triple transfection method in HEK293 cells, AAVrh.91 yields 2-3 fold higher quantities of vector than its clade counterpart, AAV1 (FIG. 14A and FIG. 14B). AAVrh.91 capsids were analyzed for deamidation and other modifications as previously described (see PCT/US19/019804 and PCT/US19/2019/019861). As shown in FIG. 15A and FIG. 15B, the results indicated that AAVrh.91 has three amino acids that are highly deamidated (N57, N383, and N512), which correspond to asparagines in asparagine-glycine pairs (numbering of AAVrh.91 as in SEQ ID NO: 2). Lower deamidation percentages were consistently observed in residues N303, N497, and N691, as well as phosphorylation at S149.

SEQUENCE LISTING FREE TEXT

The following information is provided for sequences containing free text under numeric identifier <223>.

| SEQ ID NO: | Free Text under <223> |
|---|---|
| 3 | <223> synthetic construct<br><220><br><221> CDS<br><222> (1) ... (2211) |
| 4 | <223> Synthetic Construct |
| 5 | <223> AAV6 mutant<br><220><br><221> CDS<br><222> (1) ... (2211) |
| 6 | <223> Synthetic Construct |
| 9 | <223> primer sequence |
| 10 | <223> primer sequence |
| 11 | <223> primer sequence |
| 12 | <223> primer sequence |
| 13 | <223> miRNA target sequence |
| 14 | <223> miRNA target sequence |

All documents cited in this specification are incorporated herein by reference. U.S. Provisional Patent Application No. 62/924,095, filed Oct. 21, 2019, U.S. Provisional Patent Application No. 62/913,314, filed Oct. 10, 2019, and U.S. Provisional Patent Application No. 62/840,184, filed Apr. 29, 2019, are incorporated by reference in their entireties, together with their sequence listings. The sequence listing filed herewith named "19-8901PCT2_ST25.txt" and the sequences and text therein are incorporated by reference. While the invention has been described with reference to particular embodiments, it will be appreciated that modifications can be made without departing from the spirit of the invention. Such modifications are intended to fall within the scope of the appended claims.

What is claimed is:

1. A recombinant adeno-associated virus (AAV) having an AAVrh.91 capsid comprising AAVrh.91 vp1 proteins, AAVrh.91 vp2 proteins, and AAVrh.91 vp3 proteins produced by expression of a nucleotide sequence encoding amino acids 1 to 736 of SEQ ID NO: 2 and a vector genome comprising a heterologous nucleic acid sequence operably linked to regulatory sequences that direct expression of a product encoded by the heterologous nucleic acid sequence in a target cell.

2. The recombinant AAV according to claim 1, wherein the nucleotide sequence encoding amino acids 1 to 736 of SEQ ID NO: 2 comprises SEQ ID NO: 1 or 3, or a nucleotide sequence sharing at least 90%, at least 95%, at least 97%, at least 98%, or at least 99% identity with SEQ ID NO: 1 or 3.

3. The recombinant AAV according to claim 1, wherein the vector genome comprises a 5' AAV inverted terminal repeat (ITR) sequence and a 3' AAV ITR sequence from AAV2.

4. A composition comprising the recombinant AAV according to claim 1 and a physiologically compatible carrier, buffer, adjuvant, and/or diluent.

5. A packaging cell comprising the recombinant AAV according to claim 1.

6. A recombinant AAV having an AAVrh.91 capsid comprising a vector genome in the AAVrh.91 capsid, the AAVrh.91 capsid comprising a heterogeneous population of AAVrh.91 vp1 proteins comprising amino acids 1 to 736 of SEQ ID NO: 2 comprising at least 50% deamidated asparagines at positions N57, N383, and N512, a heterogeneous population of AAVrh.91 vp2 proteins comprising amino acids 138 to 736 of SEQ ID NO: 2 comprising at least 50% deamidated asparagines at positions N383 and N512, and a heterogenous population of AAVrh.91 vp3 proteins comprising amino acids 203 to 736 of SEQ ID NO: 2 comprising at least 50% deamidated asparagines at positions N383 and N512, wherein the percentage of deamidation is as determined by mass spectrometry, said vector genome comprising a heterologous nucleic acid sequence operably linked to regulatory sequences which direct expression of a product encoded by the heterologous nucleic acid sequence in a target cell, wherein the deamidated asparagines are aspartic acid, isoaspartic acid, or a combination thereof.

7. The recombinant AAV according to claim 6, wherein the vector genome comprises a 5' AAV ITR sequence and a 3' AAV ITR sequence from AAV2.

8. The recombinant AAV according to claim 6, wherein the AAVrh.91 vp1 proteins, the AAVrh.91 vp2 proteins, and the AAVrh.91 vp3 proteins is are produced from a nucleic acid sequence comprising SEQ ID NO: 1 or 3, or a sequence at least 80% identical to SEQ ID NO: 1 or 3.

9. The recombinant AAV according to claim 6, wherein the AAVrh.91 capsid comprises:
 a heterogeneous population of AAVrh.91 vp1 proteins selected from: vp1 proteins produced by expression from a nucleic acid sequence that encodes amino acids 1 to 736 of SEQ ID NO: 2, vp1 proteins produced by expression from the nucleic acid sequence of SEQ ID NO: 1 or 3, or vp1 proteins produced by expression from a nucleic acid sequence at least 90% identical to the nucleic acid sequence of SEQ ID NO: 1 or 3 that encodes amino acids 1 to 736 of SEQ ID NO: 2,
 a heterogeneous population of AAVrh.91 vp2 proteins selected from: vp2 proteins produced by expression from a nucleic acid sequence that encodes amino acids 138 to 736 of SEQ ID NO: 2, vp2 proteins produced by expression from a nucleic acid sequence comprising at least nucleotides 412 to 2208 of SEQ ID NO: 1 or 3, or vp2 proteins produced by expression from a nucleic acid sequence at least 90% identical to at least nucleotides 412 to 2208 of SEQ ID NO: 1 or 3 that encodes the amino acids 138 to 736 of SEQ ID NO: 2, and
 a heterogeneous population of AAVrh.91 vp3 proteins selected from: vp3 proteins produced by expression from a nucleic acid sequence that encodes amino acids 203 to 736 of SEQ ID NO: 2, vp3 proteins produced by expression from a nucleic acid sequence comprising at least nucleotides 607 to 2208 of SEQ ID NO: 1 or 3, or vp3 proteins produced by expression from a nucleic acid sequence at least 90% identical to at least nucleotides 607 to 2208 of SEQ ID NO: 1 or 3 that encodes amino acids 203 to 736 of SEQ ID NO: 2.

10. The recombinant AAV according to claim 9, wherein the nucleic acid sequence encoding the AAVrh.91 vp1 proteins, the AAVrh.91 vp2 proteins, and the AAVrh.91 vp3 proteins is SEQ ID NO: 1 or 3, or a sequence at least 80% identical to SEQ ID NO: 1 or 3.

11. The recombinant AAV according to claim 9, wherein the vector genome comprises a 5' AAV ITR sequence and a 3' AAV ITR sequence from AAV2.

12. The recombinant AAV according to claim 6, wherein
 (a) the AAVrh.91 vp1 proteins comprise 2% to 15% deamidated asparagines at position N94 and/or 65% to 90% deamidated asparagines at positions N57, as determined by mass spectrometry;
 (b) the AAVrh.91 vp1 proteins, the AAVrh.91 vp2 proteins, and/or the AAVrh.91 vp3 proteins comprise 80% to 100% deamidated asparagines at positions N383 and/or N512, as determined by mass spectrometry; and/or
 (c) the AAVrh.91 vp1 proteins, the AAVrh.91 vp2 proteins, and/or the AAVrh.91 vp3 proteins comprise 2% to 15% deamidated asparagines at position N303, 2% to 15% deamidated asparagines at position N497, and/or 2% to 5% deamidated asparagines at position N691, as determined by mass spectrometry.

13. The recombinant AAV according to claim 1, wherein
 (a) the AAVrh.91 vp1 proteins comprise 2% to 15% deamidated asparagines at position N94 and/or 65% to 90% deamidated asparagines at position N57, as determined by mass spectrometry;
 (b) the AAVrh.91 vp1 proteins, the AAVrh.91 vp2 proteins, and/or the AAVrh.91 vp3 proteins comprise 80% to 100% deamidated asparagines at positions N383 and/or N512, as determined by mass spectrometry; and/or
 (c) the AAVrh.91 vp1 proteins, the AAVrh.91 vp2 proteins, and/or the AAVrh.91 vp3 proteins comprise 2% to 15% deamidated asparagines at position N303, 2% to 15% deamidated asparagines at position N497, and/or 2% to 5% deamidated asparagines at position N691, as determined by mass spectrometry.

14. A composition comprising the recombinant AAV according to claim 6 and a physiologically compatible carrier, buffer, adjuvant, and/or diluent.

15. A packaging host-cell comprising the recombinant AAV according to claim 6.

16. A recombinant adeno-associated virus (AAV) having an AAVrh.91 capsid comprising a heterogeneous population of AAVrh.91 vp1 capsid proteins, a heterogeneous population of AAVrh.91 vp2 capsid proteins, and a heterogeneous population AAVrh.91 vp3 capsid proteins, and a vector genome comprising a heterologous nucleic acid sequence operably linked to regulatory sequences that direct expression of a product encoded by the heterologous nucleic acid sequence in a target cell,
 wherein the heterogeneous population of AAVrh.91 vp1 capsid proteins comprise amino acids 1 to 736 of SEQ ID NO: 2, the heterogeneous population of AAVrh.91 vp2 capsid proteins comprise amino acids 138 to 736 of SEQ ID NO: 2, and the heterogeneous population of AAVrh.91 vp3 capsid proteins comprise amino acids 203 to 736 of SEQ ID NO: 2.

17. The recombinant AAV vector of claim 16, wherein the heterogeneous population of AAVrh.91 vp1 capsid proteins, the heterogeneous population of AAVrh.91 vp2 capsid proteins, and the heterogeneous population AAVrh.91 vp3 capsid proteins comprise at least 50% deamidated asparagines at residues N383 and N512 of SEQ ID NO: 2, wherein the percentage of deamidation is as determined by mass spectrometry.

18. The recombinant AAV vector of claim 16, wherein the heterogeneous population of AAVrh.91 vp1 capsid proteins comprise at least 50% deamidated asparagines at residue N57 of SEQ ID NO: 2, wherein the percentage of deamidation is as determined by mass spectrometry.

* * * * *

SEQUENCE LISTING

```
<160> NUMBER OF SEQ ID NOS: 14

<210> SEQ ID NO 1
<211> LENGTH: 2211
<212> TYPE: DNA
<213> ORGANISM: adeno-associated virus rh.91
<220> FEATURE:
<221> NAME/KEY: CDS
<222> LOCATION: (1)..(2211)

<400> SEQUENCE: 1 atg gct gcc gat ggt tat ctt cca gat tgg ctc gag gac aac ctc tct      48
Met Ala Ala Asp Gly Tyr Leu Pro Asp Trp Leu Glu Asp Asn Leu Ser
1               5                   10                  15 gag ggc att cgc gag tgg tgg gcg ctg aaa cct gga gcc ccg aaa ccc      96
Glu Gly Ile Arg Glu Trp Trp Ala Leu Lys Pro Gly Ala Pro Lys Pro
            20                  25                  30 aaa gcc aac cag caa aag cag gac gac ggc cgg ggt ctg gtg ctt cct     144
Lys Ala Asn Gln Gln Lys Gln Asp Asp Gly Arg Gly Leu Val Leu Pro
        35                  40                  45 ggc tac aag tac ctc gga ccc ttc aac gga ctc gac aag ggg gag ccc     192
Gly Tyr Lys Tyr Leu Gly Pro Phe Asn Gly Leu Asp Lys Gly Glu Pro
    50                  55                  60 gtc aac gcg gcg gac gca gcg gcc ctc gag cac gac aag gcc tac gac     240
Val Asn Ala Ala Asp Ala Ala Ala Leu Glu His Asp Lys Ala Tyr Asp
65                  70                  75                  80 cag cag ctc aaa gcg ggt gac aat ccg tac ctg cgg tat aac cac gcc     288
Gln Gln Leu Lys Ala Gly Asp Asn Pro Tyr Leu Arg Tyr Asn His Ala
                85                  90                  95 gac gcc gag ttt cag gag cgt ctg caa gaa gat acg tct ttt ggg ggc     336
Asp Ala Glu Phe Gln Glu Arg Leu Gln Glu Asp Thr Ser Phe Gly Gly
            100                 105                 110 aac ctc ggg cga gca gtc ttc cag gcc aag aag cgg gtt ctc gaa cct     384
Asn Leu Gly Arg Ala Val Phe Gln Ala Lys Lys Arg Val Leu Glu Pro
```

```
              115                 120                 125
ttt ggt ctg gtt gag gaa gca gct aag acg gct cct gga aag aaa cgt      432
Phe Gly Leu Val Glu Glu Ala Ala Lys Thr Ala Pro Gly Lys Lys Arg
    130                 135                 140 ccg gta gag cag tcg ccc caa gaa cca gac tcc tcc tcg ggc att ggc      480
Pro Val Glu Gln Ser Pro Gln Glu Pro Asp Ser Ser Ser Gly Ile Gly
145                 150                 155                 160 aaa tca ggc cag cag ccc gcc aaa aag aga ctc aat ttc ggt cag act      528
Lys Ser Gly Gln Gln Pro Ala Lys Lys Arg Leu Asn Phe Gly Gln Thr
                165                 170                 175 ggc gac tca gag tca gtc ccc gac cct caa cct ctc gga gaa cct cca      576
Gly Asp Ser Glu Ser Val Pro Asp Pro Gln Pro Leu Gly Glu Pro Pro
        180                 185                 190 gaa acc ccc gct gct gtg gga cct act aca atg gct tca ggc ggt ggc      624
Glu Thr Pro Ala Ala Val Gly Pro Thr Thr Met Ala Ser Gly Gly Gly
            195                 200                 205 gca cca atg gca gac aat aac gaa ggc gcc gac gga gtg ggt aat gcc      672
Ala Pro Met Ala Asp Asn Asn Glu Gly Ala Asp Gly Val Gly Asn Ala
    210                 215                 220 tca gga aat tgg cat tgc gat tcc aca tgg ctg ggc gac aga gtc atc      720
Ser Gly Asn Trp His Cys Asp Ser Thr Trp Leu Gly Asp Arg Val Ile
225                 230                 235                 240 acc acc agc acc cga acc tgg gcc ctt cct acc tac aac aac cac ctc      768
Thr Thr Ser Thr Arg Thr Trp Ala Leu Pro Thr Tyr Asn Asn His Leu
                245                 250                 255 tac aag caa atc tcc agc gct tca acg ggg gcc agt aac gac aac cac      816
Tyr Lys Gln Ile Ser Ser Ala Ser Thr Gly Ala Ser Asn Asp Asn His
        260                 265                 270 tac ttt ggc tac agc acc ccc tgg ggg tat ttt gat ttc aac aga ttc      864
Tyr Phe Gly Tyr Ser Thr Pro Trp Gly Tyr Phe Asp Phe Asn Arg Phe
            275                 280                 285 cac tgc cac ttc tca cca cgt gac tgg cag cga ctc att aac aac aac      912
His Cys His Phe Ser Pro Arg Asp Trp Gln Arg Leu Ile Asn Asn Asn
    290                 295                 300 tgg gga ttc cgg ccc aag aga ctc aac ttc aag ctc ttc aac atc cag      960
Trp Gly Phe Arg Pro Lys Arg Leu Asn Phe Lys Leu Phe Asn Ile Gln
305                 310                 315                 320 gtc aag gag gtc acg acg aat gat ggc gtc aca acc atc gct aat aac     1008
Val Lys Glu Val Thr Thr Asn Asp Gly Val Thr Thr Ile Ala Asn Asn
                325                 330                 335 ctt acc agc acg gtt caa gtg ttc tcg gac tcg gag tac cag ctg ccg     1056
Leu Thr Ser Thr Val Gln Val Phe Ser Asp Ser Glu Tyr Gln Leu Pro
        340                 345                 350 tac gtc ctc ggt tct gcg cac cag ggc tgc ctc cct ccg ttc ccg gcg     1104
Tyr Val Leu Gly Ser Ala His Gln Gly Cys Leu Pro Pro Phe Pro Ala
            355                 360                 365 gac gta ttc atg att cct cag tac ggc tac cta acg ctc aac aat ggc     1152
Asp Val Phe Met Ile Pro Gln Tyr Gly Tyr Leu Thr Leu Asn Asn Gly
    370                 375                 380 agc cag gcc gta gga cgt tca tcc ttt tat tgc ctg gaa tat ttc cca     1200
Ser Gln Ala Val Gly Arg Ser Ser Phe Tyr Cys Leu Glu Tyr Phe Pro
385                 390                 395                 400 tct caa atg ctg aga acg ggc aac aac ttt acc ttc agc tac acc ttt     1248
Ser Gln Met Leu Arg Thr Gly Asn Asn Phe Thr Phe Ser Tyr Thr Phe
                405                 410                 415 gaa gat gtg cct ttc cac agc agt tac gcg cac agc cag agc ctg gac     1296
Glu Asp Val Pro Phe His Ser Ser Tyr Ala His Ser Gln Ser Leu Asp
        420                 425                 430 agg cta atg aat cct cta atc gac cag tac ctg tat tac cta aac aga     1344
```

```
Arg Leu Met Asn Pro Leu Ile Asp Gln Tyr Leu Tyr Leu Asn Arg
            435                 440                 445 act cag aat caa tcc gga agt gca caa aac aag gac ttg ctg ttt agc    1392
Thr Gln Asn Gln Ser Gly Ser Ala Gln Asn Lys Asp Leu Leu Phe Ser
450                 455                 460 cgg ggg tct cca gct ggc atg tct gtt cag ccc aaa aac tgg cta ccc    1440
Arg Gly Ser Pro Ala Gly Met Ser Val Gln Pro Lys Asn Trp Leu Pro
465                 470                 475                 480 ggg ccc tgt tac cga cag cag cgt gtt tct aaa aca aaa aca gac aac    1488
Gly Pro Cys Tyr Arg Gln Gln Arg Val Ser Lys Thr Lys Thr Asp Asn
                485                 490                 495 aac aac agc aac ttt acc tgg act ggt gcc tcc aaa tac aat ctg aac    1536
Asn Asn Ser Asn Phe Thr Trp Thr Gly Ala Ser Lys Tyr Asn Leu Asn
            500                 505                 510 gga cgt gaa tcc atc att aac cct ggc acc gct atg gca tcc cac aag    1584
Gly Arg Glu Ser Ile Ile Asn Pro Gly Thr Ala Met Ala Ser His Lys
        515                 520                 525 gac gac gaa gac aaa ttt ttt ccc atg agc ggt gtt atg att ttt ggc    1632
Asp Asp Glu Asp Lys Phe Phe Pro Met Ser Gly Val Met Ile Phe Gly
530                 535                 540 aaa gaa aat gca gga gca tca aac act gca tta gac aat gtt atg att    1680
Lys Glu Asn Ala Gly Ala Ser Asn Thr Ala Leu Asp Asn Val Met Ile
545                 550                 555                 560 aca gat gaa gag gaa att aaa gct acc aac ccc gtg gcc acc gag aga    1728
Thr Asp Glu Glu Glu Ile Lys Ala Thr Asn Pro Val Ala Thr Glu Arg
                565                 570                 575 ttt gga act gtg gca gtc aat ctc caa agc agc aat aca gac cct gca    1776
Phe Gly Thr Val Ala Val Asn Leu Gln Ser Ser Asn Thr Asp Pro Ala
            580                 585                 590 aca gga gac gtg cat gtc atg ggg gct tta cct ggc atg gtg tgg caa    1824
Thr Gly Asp Val His Val Met Gly Ala Leu Pro Gly Met Val Trp Gln
        595                 600                 605 gac aga gac gtg tac ctg cag ggt ccc att tgg gcc aag att cct cac    1872
Asp Arg Asp Val Tyr Leu Gln Gly Pro Ile Trp Ala Lys Ile Pro His
610                 615                 620 acg gat gga cac ttt cac ccg tct cct ctt atg ggc ggc ttt gga ctt    1920
Thr Asp Gly His Phe His Pro Ser Pro Leu Met Gly Gly Phe Gly Leu
625                 630                 635                 640 aag cac ccg cct cct cag atc ctc atc aaa aac acg cct gtt cct gcg    1968
Lys His Pro Pro Pro Gln Ile Leu Ile Lys Asn Thr Pro Val Pro Ala
                645                 650                 655 aat cct ccg gca gag ttt tcg gct aca aag ttt gct tca ttc atc acc    2016
Asn Pro Pro Ala Glu Phe Ser Ala Thr Lys Phe Ala Ser Phe Ile Thr
            660                 665                 670 cag tac tcc aca gga caa gtg agc gtg gaa att gaa tgg gag ctg cag    2064
Gln Tyr Ser Thr Gly Gln Val Ser Val Glu Ile Glu Trp Glu Leu Gln
        675                 680                 685 aaa gaa aac agt aag cgc tgg aat cct gaa gtg cag tac acc tcc aac    2112
Lys Glu Asn Ser Lys Arg Trp Asn Pro Glu Val Gln Tyr Thr Ser Asn
690                 695                 700 tac gcg aaa tct gcc aac gtt gat ttc act gtg gac aac aat gga ctt    2160
Tyr Ala Lys Ser Ala Asn Val Asp Phe Thr Val Asp Asn Asn Gly Leu
705                 710                 715                 720 tat act gag cct cgc ccc att ggc acc cgt tac ctt acc cgt ccc ctt    2208
Tyr Thr Glu Pro Arg Pro Ile Gly Thr Arg Tyr Leu Thr Arg Pro Leu
                725                 730                 735 taa                                                                2211

<210> SEQ ID NO 2
```

<211> LENGTH: 736
<212> TYPE: PRT
<213> ORGANISM: adeno-associated virus rh.91

<400> SEQUENCE: 2

```
Met Ala Ala Asp Gly Tyr Leu Pro Asp Trp Leu Glu Asp Asn Leu Ser
1               5                   10                  15

Glu Gly Ile Arg Glu Trp Trp Ala Leu Lys Pro Gly Ala Pro Lys Pro
            20                  25                  30

Lys Ala Asn Gln Gln Lys Gln Asp Asp Gly Arg Gly Leu Val Leu Pro
        35                  40                  45

Gly Tyr Lys Tyr Leu Gly Pro Phe Asn Gly Leu Asp Lys Gly Glu Pro
    50                  55                  60

Val Asn Ala Ala Asp Ala Ala Ala Leu Glu His Asp Lys Ala Tyr Asp
65                  70                  75                  80

Gln Gln Leu Lys Ala Gly Asp Asn Pro Tyr Leu Arg Tyr Asn His Ala
                85                  90                  95

Asp Ala Glu Phe Gln Glu Arg Leu Gln Glu Asp Thr Ser Phe Gly Gly
            100                 105                 110

Asn Leu Gly Arg Ala Val Phe Gln Ala Lys Lys Arg Val Leu Glu Pro
        115                 120                 125

Phe Gly Leu Val Glu Glu Ala Ala Lys Thr Ala Pro Gly Lys Lys Arg
    130                 135                 140

Pro Val Glu Gln Ser Pro Gln Glu Pro Asp Ser Ser Ser Gly Ile Gly
145                 150                 155                 160

Lys Ser Gly Gln Gln Pro Ala Lys Lys Arg Leu Asn Phe Gly Gln Thr
                165                 170                 175

Gly Asp Ser Glu Ser Val Pro Asp Pro Gln Pro Leu Gly Glu Pro Pro
            180                 185                 190

Glu Thr Pro Ala Ala Val Gly Pro Thr Thr Met Ala Ser Gly Gly Gly
        195                 200                 205

Ala Pro Met Ala Asp Asn Asn Glu Gly Ala Asp Gly Val Gly Asn Ala
    210                 215                 220

Ser Gly Asn Trp His Cys Asp Ser Thr Trp Leu Gly Asp Arg Val Ile
225                 230                 235                 240

Thr Thr Ser Thr Arg Thr Trp Ala Leu Pro Thr Tyr Asn Asn His Leu
                245                 250                 255

Tyr Lys Gln Ile Ser Ser Ala Ser Thr Gly Ala Ser Asn Asp Asn His
            260                 265                 270

Tyr Phe Gly Tyr Ser Thr Pro Trp Gly Tyr Phe Asp Phe Asn Arg Phe
        275                 280                 285

His Cys His Phe Ser Pro Arg Asp Trp Gln Arg Leu Ile Asn Asn Asn
    290                 295                 300

Trp Gly Phe Arg Pro Lys Arg Leu Asn Phe Lys Leu Phe Asn Ile Gln
305                 310                 315                 320

Val Lys Glu Val Thr Thr Asn Asp Gly Val Thr Thr Ile Ala Asn Asn
                325                 330                 335

Leu Thr Ser Thr Val Gln Val Phe Ser Asp Ser Glu Tyr Gln Leu Pro
            340                 345                 350

Tyr Val Leu Gly Ser Ala His Gln Gly Cys Leu Pro Pro Phe Pro Ala
        355                 360                 365

Asp Val Phe Met Ile Pro Gln Tyr Gly Tyr Leu Thr Leu Asn Asn Gly
    370                 375                 380

Ser Gln Ala Val Gly Arg Ser Ser Phe Tyr Cys Leu Glu Tyr Phe Pro
```

```
                385                 390                 395                 400
        Ser Gln Met Leu Arg Thr Gly Asn Asn Phe Thr Phe Ser Tyr Thr Phe
                        405                 410                 415

Glu Asp Val Pro Phe His Ser Ser Tyr Ala His Ser Gln Ser Leu Asp
                        420                 425                 430

Arg Leu Met Asn Pro Leu Ile Asp Gln Tyr Leu Tyr Tyr Leu Asn Arg
                        435                 440                 445

Thr Gln Asn Gln Ser Gly Ser Ala Gln Asn Lys Asp Leu Leu Phe Ser
                        450                 455                 460

Arg Gly Ser Pro Ala Gly Met Ser Val Gln Pro Lys Asn Trp Leu Pro
        465                 470                 475                 480

Gly Pro Cys Tyr Arg Gln Gln Arg Val Ser Lys Thr Lys Thr Asp Asn
                        485                 490                 495

Asn Asn Ser Asn Phe Thr Trp Thr Gly Ala Ser Lys Tyr Asn Leu Asn
                        500                 505                 510

Gly Arg Glu Ser Ile Ile Asn Pro Gly Thr Ala Met Ala Ser His Lys
                        515                 520                 525

Asp Asp Glu Asp Lys Phe Phe Pro Met Ser Gly Val Met Ile Phe Gly
                        530                 535                 540

Lys Glu Asn Ala Gly Ala Ser Asn Thr Ala Leu Asp Asn Val Met Ile
        545                 550                 555                 560

Thr Asp Glu Glu Glu Ile Lys Ala Thr Asn Pro Val Ala Thr Glu Arg
                        565                 570                 575

Phe Gly Thr Val Ala Val Asn Leu Gln Ser Ser Asn Thr Asp Pro Ala
                        580                 585                 590

Thr Gly Asp Val His Val Met Gly Ala Leu Pro Gly Met Val Trp Gln
                        595                 600                 605

Asp Arg Asp Val Tyr Leu Gln Gly Pro Ile Trp Ala Lys Ile Pro His
                        610                 615                 620

Thr Asp Gly His Phe His Pro Ser Pro Leu Met Gly Gly Phe Gly Leu
        625                 630                 635                 640

Lys His Pro Pro Pro Gln Ile Leu Ile Lys Asn Thr Pro Val Pro Ala
                        645                 650                 655

Asn Pro Pro Ala Glu Phe Ser Ala Thr Lys Phe Ala Ser Phe Ile Thr
                        660                 665                 670

Gln Tyr Ser Thr Gly Gln Val Ser Val Glu Ile Glu Trp Glu Leu Gln
                        675                 680                 685

Lys Glu Asn Ser Lys Arg Trp Asn Pro Glu Val Gln Tyr Thr Ser Asn
        690                 695                 700

Tyr Ala Lys Ser Ala Asn Val Asp Phe Thr Val Asp Asn Asn Gly Leu
                        705                 710                 715                 720

Tyr Thr Glu Pro Arg Pro Ile Gly Thr Arg Tyr Leu Thr Arg Pro Leu
                        725                 730                 735
```

<210> SEQ ID NO 3
<211> LENGTH: 2211
<212> TYPE: DNA
<213> ORGANISM: Artificial Sequence
<220> FEATURE:
<223> OTHER INFORMATION: synthetic construct
<220> FEATURE:
<221> NAME/KEY: CDS
<222> LOCATION: (1)..(2211)

<400> SEQUENCE: 3 atg gct gct gac ggt tat ctt cca gat tgg ctc gag gac aac ctt tct    48

```
                Met Ala Ala Asp Gly Tyr Leu Pro Asp Trp Leu Glu Asp Asn Leu Ser
                1               5                   10                  15 gaa ggc att cgt gag tgg tgg gct ctg aaa cct gga gcc cct aaa ccc             96
Glu Gly Ile Arg Glu Trp Trp Ala Leu Lys Pro Gly Ala Pro Lys Pro
            20                  25                  30 aaa gcg aac caa caa aag cag gac gac ggc cgg ggt ctt gtg ctt ccg            144
Lys Ala Asn Gln Gln Lys Gln Asp Asp Gly Arg Gly Leu Val Leu Pro
        35                  40                  45 ggt tac aaa tac ctc gga ccc ttc aac gga ctc gac aaa gga gag ccg            192
Gly Tyr Lys Tyr Leu Gly Pro Phe Asn Gly Leu Asp Lys Gly Glu Pro
    50                  55                  60 gtc aac gcg gcg gac gcg gca gcc ctc gaa cac gac aaa gct tac gac            240
Val Asn Ala Ala Asp Ala Ala Ala Leu Glu His Asp Lys Ala Tyr Asp
65                  70                  75                  80 cag cag ctc aag gcc ggt gac aac ccg tac ctc cgg tac aac cac gcc            288
Gln Gln Leu Lys Ala Gly Asp Asn Pro Tyr Leu Arg Tyr Asn His Ala
                85                  90                  95 gac gcc gag ttt cag gag cgt ctt caa gaa gat acg tct ttt ggg ggc            336
Asp Ala Glu Phe Gln Glu Arg Leu Gln Glu Asp Thr Ser Phe Gly Gly
            100                 105                 110 aac ctt ggc aga gca gtc ttc cag gcc aaa aag agg gtt ctt gag cct            384
Asn Leu Gly Arg Ala Val Phe Gln Ala Lys Lys Arg Val Leu Glu Pro
        115                 120                 125 ttt ggt ctg gtt gag gaa gca gct aaa acg gct cct gga aag aag agg            432
Phe Gly Leu Val Glu Glu Ala Ala Lys Thr Ala Pro Gly Lys Lys Arg
    130                 135                 140 cct gta gag cag tct cct cag gaa ccg gac tca tca tct ggt att ggc            480
Pro Val Glu Gln Ser Pro Gln Glu Pro Asp Ser Ser Ser Gly Ile Gly
145                 150                 155                 160 aaa tcg ggc cag cag cct gcc aaa aaa aga cta aat ttc ggt cag act            528
Lys Ser Gly Gln Gln Pro Ala Lys Lys Arg Leu Asn Phe Gly Gln Thr
                165                 170                 175 ggc gac tca gag tca gtc ccc gac cct caa cct ctc gga gaa cct cca            576
Gly Asp Ser Glu Ser Val Pro Asp Pro Gln Pro Leu Gly Glu Pro Pro
            180                 185                 190 gaa acc ccc gct gct gtg gga cct act aca atg gct tca ggc ggt ggc            624
Glu Thr Pro Ala Ala Val Gly Pro Thr Thr Met Ala Ser Gly Gly Gly
        195                 200                 205 gca cca atg gca gac aat aac gaa ggc gcc gac gga gtg ggt aat gcc            672
Ala Pro Met Ala Asp Asn Asn Glu Gly Ala Asp Gly Val Gly Asn Ala
    210                 215                 220 tca gga aat tgg cat tgc gat tcc aca tgg ctg ggc gac aga gtc atc            720
Ser Gly Asn Trp His Cys Asp Ser Thr Trp Leu Gly Asp Arg Val Ile
225                 230                 235                 240 acc acc agc acc cga acc tgg gcc ctt cct acc tac aac aac cac ctc            768
Thr Thr Ser Thr Arg Thr Trp Ala Leu Pro Thr Tyr Asn Asn His Leu
                245                 250                 255 tac aag caa atc tcc agc gct tca acg ggg gcc agt aac gac aac cac            816
Tyr Lys Gln Ile Ser Ser Ala Ser Thr Gly Ala Ser Asn Asp Asn His
            260                 265                 270 tac ttt ggc tac agc acc ccc tgg ggg tat ttt gat ttc aac aga ttc            864
Tyr Phe Gly Tyr Ser Thr Pro Trp Gly Tyr Phe Asp Phe Asn Arg Phe
        275                 280                 285 cac tgc cac ttc tca cca cgt gac tgg cag cga ctc att aac aac aac            912
His Cys His Phe Ser Pro Arg Asp Trp Gln Arg Leu Ile Asn Asn Asn
    290                 295                 300 tgg gga ttc cgg ccc aag aga ctc aac ttc aag ctc ttc aac atc cag            960
Trp Gly Phe Arg Pro Lys Arg Leu Asn Phe Lys Leu Phe Asn Ile Gln
305                 310                 315                 320
```

```
gtc aag gag gtc acg acg aat gat ggc gtc aca acc atc gct aat aac    1008
Val Lys Glu Val Thr Thr Asn Asp Gly Val Thr Thr Ile Ala Asn Asn
                325                 330                 335 ctt acc agc acg gtt caa gtg ttc tcg gac tcg gag tac cag ctg ccg    1056
Leu Thr Ser Thr Val Gln Val Phe Ser Asp Ser Glu Tyr Gln Leu Pro
                340                 345                 350 tac gtc ctc ggt tct gcg cac cag ggc tgc ctc cct ccg ttc ccg gcg    1104
Tyr Val Leu Gly Ser Ala His Gln Gly Cys Leu Pro Pro Phe Pro Ala
                355                 360                 365 gac gta ttc atg att cct cag tat gga tac ctc acc ctg aac aac gga    1152
Asp Val Phe Met Ile Pro Gln Tyr Gly Tyr Leu Thr Leu Asn Asn Gly
                370                 375                 380 agt caa gcg gtg gga cgc tca tcc ttt tac tgc ctg gag tac ttc cct    1200
Ser Gln Ala Val Gly Arg Ser Ser Phe Tyr Cys Leu Glu Tyr Phe Pro
385                 390                 395                 400 tcg cag atg cta agg act gga aat aac ttc acc ttc agc tat acc ttc    1248
Ser Gln Met Leu Arg Thr Gly Asn Asn Phe Thr Phe Ser Tyr Thr Phe
                405                 410                 415 gag gat gta cct ttt cac agc agc tac gct cac agc cag agt ttg gat    1296
Glu Asp Val Pro Phe His Ser Ser Tyr Ala His Ser Gln Ser Leu Asp
                420                 425                 430 cgc ttg atg aat cct ctt att gat cag tat ctg tac tac ctg aac aga    1344
Arg Leu Met Asn Pro Leu Ile Asp Gln Tyr Leu Tyr Tyr Leu Asn Arg
                435                 440                 445 acg caa aat caa tct gga agt gca caa aac aag gac ctg ctt ttt agc    1392
Thr Gln Asn Gln Ser Gly Ser Ala Gln Asn Lys Asp Leu Leu Phe Ser
                450                 455                 460 cgg ggg tct cct gct ggc atg tct gtt cag ccc aaa aat tgg cta cct    1440
Arg Gly Ser Pro Ala Gly Met Ser Val Gln Pro Lys Asn Trp Leu Pro
465                 470                 475                 480 ggg ccc tgc tac cgg caa cag aga gtt tca aag act aaa aca gac aac    1488
Gly Pro Cys Tyr Arg Gln Gln Arg Val Ser Lys Thr Lys Thr Asp Asn
                485                 490                 495 aac aac agt aac ttt acc tgg aca ggt gcc agc aaa tat aat ctc aat    1536
Asn Asn Ser Asn Phe Thr Trp Thr Gly Ala Ser Lys Tyr Asn Leu Asn
                500                 505                 510 ggc cgc gaa tcg atc att aat cca gga acc gct atg gcc agt cac aag    1584
Gly Arg Glu Ser Ile Ile Asn Pro Gly Thr Ala Met Ala Ser His Lys
                515                 520                 525 gac gat gaa gac aaa ttt ttc cct atg agc ggc gtt atg ata ttt ggc    1632
Asp Asp Glu Asp Lys Phe Phe Pro Met Ser Gly Val Met Ile Phe Gly
                530                 535                 540 aaa gaa aat gca gga gca agt aac act gca tta gat aat gta atg att    1680
Lys Glu Asn Ala Gly Ala Ser Asn Thr Ala Leu Asp Asn Val Met Ile
545                 550                 555                 560 acg gat gaa gaa gag att aaa gct acc aat cct gtg gca aca gag aga    1728
Thr Asp Glu Glu Glu Ile Lys Ala Thr Asn Pro Val Ala Thr Glu Arg
                565                 570                 575 ttt gga act gtg gca gtc aac ttg cag agc tca aat aca gac ccc gca    1776
Phe Gly Thr Val Ala Val Asn Leu Gln Ser Ser Asn Thr Asp Pro Ala
                580                 585                 590 act gga gac gtc cat gtc atg ggg gcc tta cct ggc atg gtg tgg caa    1824
Thr Gly Asp Val His Val Met Gly Ala Leu Pro Gly Met Val Trp Gln
                595                 600                 605 gat cgt gac gtg tac ctt caa gga cct atc tgg gca aag att cct cac    1872
Asp Arg Asp Val Tyr Leu Gln Gly Pro Ile Trp Ala Lys Ile Pro His
                610                 615                 620 acg gat gga cac ttt cat cct tct cct ctg atg gga ggc ttt gga ctg    1920
Thr Asp Gly His Phe His Pro Ser Pro Leu Met Gly Gly Phe Gly Leu
625                 630                 635                 640
```

```
aaa cat ccg cct cct caa atc ctc atc aaa aat act ccg gta ccg gca      1968
Lys His Pro Pro Pro Gln Ile Leu Ile Lys Asn Thr Pro Val Pro Ala
            645                 650                 655 aat cct ccg gca gag ttc agc gct aca aag ttt gct tca ttt atc act      2016
Asn Pro Pro Ala Glu Phe Ser Ala Thr Lys Phe Ala Ser Phe Ile Thr
            660                 665                 670 cag tac tcc act gga cag gtc agc gtg gaa att gag tgg gag cta cag      2064
Gln Tyr Ser Thr Gly Gln Val Ser Val Glu Ile Glu Trp Glu Leu Gln
            675                 680                 685 aaa gaa aac agc aaa cgt tgg aat cca gag gtg cag tac act tcc aac      2112
Lys Glu Asn Ser Lys Arg Trp Asn Pro Glu Val Gln Tyr Thr Ser Asn
            690                 695                 700 tac gcg aag tct gcc aat gtg gac ttt act gta gac aac aat ggt ctt      2160
Tyr Ala Lys Ser Ala Asn Val Asp Phe Thr Val Asp Asn Asn Gly Leu
705             710                 715                 720 tat act gaa cct cgc cct att gga acc cgg tat ctc aca cga ccc ttg      2208
Tyr Thr Glu Pro Arg Pro Ile Gly Thr Arg Tyr Leu Thr Arg Pro Leu
                725                 730                 735 taa                                                                  2211
```

<210> SEQ ID NO 4
<211> LENGTH: 736
<212> TYPE: PRT
<213> ORGANISM: Artificial Sequence
<220> FEATURE:
<223> OTHER INFORMATION: Synthetic Construct

<400> SEQUENCE: 4

```
Met Ala Ala Asp Gly Tyr Leu Pro Asp Trp Leu Glu Asp Asn Leu Ser
1               5                   10                  15

Glu Gly Ile Arg Glu Trp Trp Ala Leu Lys Pro Gly Ala Pro Lys Pro
            20                  25                  30

Lys Ala Asn Gln Gln Lys Gln Asp Asp Gly Arg Gly Leu Val Leu Pro
        35                  40                  45

Gly Tyr Lys Tyr Leu Gly Pro Phe Asn Gly Leu Asp Lys Gly Glu Pro
    50                  55                  60

Val Asn Ala Ala Asp Ala Ala Leu Glu His Asp Lys Ala Tyr Asp
65                  70                  75                  80

Gln Gln Leu Lys Ala Gly Asp Asn Pro Tyr Leu Arg Tyr Asn His Ala
                85                  90                  95

Asp Ala Glu Phe Gln Glu Arg Leu Gln Glu Asp Thr Ser Phe Gly Gly
            100                 105                 110

Asn Leu Gly Arg Ala Val Phe Gln Ala Lys Lys Arg Val Leu Glu Pro
        115                 120                 125

Phe Gly Leu Val Glu Glu Ala Leu Lys Thr Ala Pro Gly Lys Lys Arg
    130                 135                 140

Pro Val Glu Gln Ser Pro Gln Glu Pro Asp Ser Ser Ser Gly Ile Gly
145                 150                 155                 160

Lys Ser Gly Gln Gln Pro Ala Lys Lys Arg Leu Asn Phe Gly Gln Thr
                165                 170                 175

Gly Asp Ser Glu Ser Val Pro Asp Pro Gln Pro Leu Gly Glu Pro Pro
            180                 185                 190

Glu Thr Pro Ala Ala Val Gly Pro Thr Thr Met Ala Ser Gly Gly Gly
        195                 200                 205

Ala Pro Met Ala Asp Asn Asn Glu Gly Ala Asp Gly Val Gly Asn Ala
    210                 215                 220
```

```
Ser Gly Asn Trp His Cys Asp Ser Thr Trp Leu Gly Asp Arg Val Ile
225                 230                 235                 240

Thr Thr Ser Thr Arg Thr Trp Ala Leu Pro Thr Tyr Asn Asn His Leu
            245                 250                 255

Tyr Lys Gln Ile Ser Ser Ala Ser Thr Gly Ala Ser Asn Asp Asn His
                260                 265                 270

Tyr Phe Gly Tyr Ser Thr Pro Trp Gly Tyr Phe Asp Phe Asn Arg Phe
            275                 280                 285

His Cys His Phe Ser Pro Arg Asp Trp Gln Arg Leu Ile Asn Asn Asn
        290                 295                 300

Trp Gly Phe Arg Pro Lys Arg Leu Asn Phe Lys Leu Phe Asn Ile Gln
305                 310                 315                 320

Val Lys Glu Val Thr Thr Asn Asp Gly Val Thr Thr Ile Ala Asn Asn
                325                 330                 335

Leu Thr Ser Thr Val Gln Val Phe Ser Asp Ser Glu Tyr Gln Leu Pro
                340                 345                 350

Tyr Val Leu Gly Ser Ala His Gln Gly Cys Leu Pro Pro Phe Pro Ala
            355                 360                 365

Asp Val Phe Met Ile Pro Gln Tyr Gly Tyr Leu Thr Leu Asn Asn Gly
        370                 375                 380

Ser Gln Ala Val Gly Arg Ser Ser Phe Tyr Cys Leu Glu Tyr Phe Pro
385                 390                 395                 400

Ser Gln Met Leu Arg Thr Gly Asn Asn Phe Thr Phe Ser Tyr Thr Phe
                405                 410                 415

Glu Asp Val Pro Phe His Ser Ser Tyr Ala His Ser Gln Ser Leu Asp
            420                 425                 430

Arg Leu Met Asn Pro Leu Ile Asp Gln Tyr Leu Tyr Tyr Leu Asn Arg
        435                 440                 445

Thr Gln Asn Gln Ser Gly Ser Ala Gln Asn Lys Asp Leu Leu Phe Ser
    450                 455                 460

Arg Gly Ser Pro Ala Gly Met Ser Val Gln Pro Lys Asn Trp Leu Pro
465                 470                 475                 480

Gly Pro Cys Tyr Arg Gln Gln Arg Val Ser Lys Thr Lys Thr Asp Asn
            485                 490                 495

Asn Asn Ser Asn Phe Thr Trp Thr Gly Ala Ser Lys Tyr Asn Leu Asn
            500                 505                 510

Gly Arg Glu Ser Ile Ile Asn Pro Gly Thr Ala Met Ala Ser His Lys
        515                 520                 525

Asp Asp Glu Asp Lys Phe Phe Pro Met Ser Gly Val Met Ile Phe Gly
530                 535                 540

Lys Glu Asn Ala Gly Ala Ser Asn Thr Ala Leu Asp Asn Val Met Ile
545                 550                 555                 560

Thr Asp Glu Glu Glu Ile Lys Ala Thr Asn Pro Val Ala Thr Glu Arg
            565                 570                 575

Phe Gly Thr Val Ala Val Asn Leu Gln Ser Ser Asn Thr Asp Pro Ala
            580                 585                 590

Thr Gly Asp Val His Val Met Gly Ala Leu Pro Gly Met Val Trp Gln
        595                 600                 605

Asp Arg Asp Val Tyr Leu Gln Gly Pro Ile Trp Ala Lys Ile Pro His
        610                 615                 620

Thr Asp Gly His Phe His Pro Ser Pro Leu Met Gly Phe Gly Leu
625                 630                 635                 640

Lys His Pro Pro Pro Gln Ile Leu Ile Lys Asn Thr Pro Val Pro Ala
```

```
                  645                 650                 655
Asn Pro Pro Ala Glu Phe Ser Ala Thr Lys Phe Ala Ser Phe Ile Thr
            660                 665                 670

Gln Tyr Ser Thr Gly Gln Val Ser Val Glu Ile Glu Trp Glu Leu Gln
        675                 680                 685

Lys Glu Asn Ser Lys Arg Trp Asn Pro Glu Val Gln Tyr Thr Ser Asn
    690                 695                 700

Tyr Ala Lys Ser Ala Asn Val Asp Phe Thr Val Asp Asn Asn Gly Leu
705                 710                 715                 720

Tyr Thr Glu Pro Arg Pro Ile Gly Thr Arg Tyr Leu Thr Arg Pro Leu
                725                 730                 735

<210> SEQ ID NO 5
<211> LENGTH: 2211
<212> TYPE: DNA
<213> ORGANISM: Artificial Sequence
<220> FEATURE:
<223> OTHER INFORMATION: AAV6 mutant
<220> FEATURE:
<221> NAME/KEY: CDS
<222> LOCATION: (1)..(2211)

<400> SEQUENCE: 5 atg gct gcc gat ggt tat ctt cca gat tgg ctc gag gac aac ctc tct      48
Met Ala Ala Asp Gly Tyr Leu Pro Asp Trp Leu Glu Asp Asn Leu Ser
1               5                   10                  15 gag ggc att cgc gag tgg tgg gac ttg aaa cct gga gcc ccg aaa ccc      96
Glu Gly Ile Arg Glu Trp Trp Asp Leu Lys Pro Gly Ala Pro Lys Pro
            20                  25                  30 aaa gcc aac cag caa aag cag gac gac ggc cgg ggt ctg gtg ctt cct      144
Lys Ala Asn Gln Gln Lys Gln Asp Asp Gly Arg Gly Leu Val Leu Pro
        35                  40                  45 ggc tac aag tac ctc gga ccc ttc aac gga ctc gac aag ggg gag ccc      192
Gly Tyr Lys Tyr Leu Gly Pro Phe Asn Gly Leu Asp Lys Gly Glu Pro
    50                  55                  60 gtc aac gcg gcg gat gca gcg gcc ctc gag cac gac aag gcc tac gac      240
Val Asn Ala Ala Asp Ala Ala Ala Leu Glu His Asp Lys Ala Tyr Asp
65                  70                  75                  80 cag cag ctc aaa gcg ggt gac aat ccg tac ctg cgg tat aac cac gcc      288
Gln Gln Leu Lys Ala Gly Asp Asn Pro Tyr Leu Arg Tyr Asn His Ala
                85                  90                  95 gac gcc gag ttt cag gag cgt ctg caa gaa gat acg tct ttt ggg ggc      336
Asp Ala Glu Phe Gln Glu Arg Leu Gln Glu Asp Thr Ser Phe Gly Gly
            100                 105                 110 aac ctc ggg cga gca gtc ttc cag gcc aag aag agg gtt ctc gaa cct      384
Asn Leu Gly Arg Ala Val Phe Gln Ala Lys Lys Arg Val Leu Glu Pro
        115                 120                 125 ctt ggt ctg gtt gag gaa ggt gct aag acg gct cct gga aag aaa cgt      432
Leu Gly Leu Val Glu Glu Gly Ala Lys Thr Ala Pro Gly Lys Lys Arg
    130                 135                 140 ccg gta gag cag tcg cca caa gag cca gac tcc tcg tcg ggc att ggc      480
Pro Val Glu Gln Ser Pro Gln Glu Pro Asp Ser Ser Ser Gly Ile Gly
145                 150                 155                 160 aag aca ggc cag cag ccc gct aaa aag aga ctc aat ttt ggt cag act      528
Lys Thr Gly Gln Gln Pro Ala Lys Lys Arg Leu Asn Phe Gly Gln Thr
                165                 170                 175 ggc gac tca gag tca gtc ccc gac cca caa cct ctc gga gaa cct cca      576
Gly Asp Ser Glu Ser Val Pro Asp Pro Gln Pro Leu Gly Glu Pro Pro
            180                 185                 190 gca acc ccc gct gct gtg gga cct act aca atg gct tca ggc ggt ggc      624
```

```
                Ala Thr Pro Ala Ala Val Gly Pro Thr Thr Met Ala Ser Gly Gly Gly
                            195                 200                 205 gca cca atg gca gac aat aac gaa ggc gcc gac gga gtg ggt aat gcc         672
Ala Pro Met Ala Asp Asn Asn Glu Gly Ala Asp Gly Val Gly Asn Ala
210                 215                 220 tca gga aat tgg cat tgc gat tcc aca tgg ctg ggc gac aga gtc atc         720
Ser Gly Asn Trp His Cys Asp Ser Thr Trp Leu Gly Asp Arg Val Ile
225                 230                 235                 240 acc acc agc acc cga aca tgg gcc ttg ccc acc tat aac aac cac ctc         768
Thr Thr Ser Thr Arg Thr Trp Ala Leu Pro Thr Tyr Asn Asn His Leu
            245                 250                 255 tac aag caa atc tcc agt gct tca acg ggg gcc agc aac gac aac cac         816
Tyr Lys Gln Ile Ser Ser Ala Ser Thr Gly Ala Ser Asn Asp Asn His
            260                 265                 270 tac ttc ggc tac agc acc ccc tgg ggg tat ttt gat ttc aac aga ttc         864
Tyr Phe Gly Tyr Ser Thr Pro Trp Gly Tyr Phe Asp Phe Asn Arg Phe
            275                 280                 285 cac tgc cat ttc tca cca cgt gac tgg cag cga ctc atc aac aac aat         912
His Cys His Phe Ser Pro Arg Asp Trp Gln Arg Leu Ile Asn Asn Asn
290                 295                 300 tgg gga ttc cgg ccc aag aga ctc aac ttc aag ctc ttc aac atc caa         960
Trp Gly Phe Arg Pro Lys Arg Leu Asn Phe Lys Leu Phe Asn Ile Gln
305                 310                 315                 320 gtc aag gag gtc acg acg aat gat ggc gtc acg acc atc gct aat aac        1008
Val Lys Glu Val Thr Thr Asn Asp Gly Val Thr Thr Ile Ala Asn Asn
            325                 330                 335 ctt acc agc acg gtt caa gtc ttc tcg gac tcg gag tac cag ttg ccg        1056
Leu Thr Ser Thr Val Gln Val Phe Ser Asp Ser Glu Tyr Gln Leu Pro
            340                 345                 350 tac gtc ctc ggc tct gcg cac cag ggc tgc ctc cct ccg ttc ccg gcg        1104
Tyr Val Leu Gly Ser Ala His Gln Gly Cys Leu Pro Pro Phe Pro Ala
            355                 360                 365 gac gtg ttc atg att ccg cag tac ggc tac cta acg ctc aac aat ggc        1152
Asp Val Phe Met Ile Pro Gln Tyr Gly Tyr Leu Thr Leu Asn Asn Gly
370                 375                 380 agc cag gca gtg gga cgg tca tcc ttt tac tgc ctg gaa tat ttc cca        1200
Ser Gln Ala Val Gly Arg Ser Ser Phe Tyr Cys Leu Glu Tyr Phe Pro
385                 390                 395                 400 tcg cag atg ctg aga acg ggc aat aac ttt acc ttc agc tac acc ttc        1248
Ser Gln Met Leu Arg Thr Gly Asn Asn Phe Thr Phe Ser Tyr Thr Phe
            405                 410                 415 gag gac gtg cct ttc cac agc agc tac gcg cac agc cag agc ctg gac        1296
Glu Asp Val Pro Phe His Ser Ser Tyr Ala His Ser Gln Ser Leu Asp
            420                 425                 430 cgg ctg atg aat cct ctc atc gac cag tac ctg tat tac ctg aac aga        1344
Arg Leu Met Asn Pro Leu Ile Asp Gln Tyr Leu Tyr Tyr Leu Asn Arg
            435                 440                 445 act cag aat cag tcc gga agt gcc caa aac aag gac ttg ctg ttt agc        1392
Thr Gln Asn Gln Ser Gly Ser Ala Gln Asn Lys Asp Leu Leu Phe Ser
450                 455                 460 cgg ggg tct cca gct ggc atg tct gtt cag ccc aaa aac tgg cta cct        1440
Arg Gly Ser Pro Ala Gly Met Ser Val Gln Pro Lys Asn Trp Leu Pro
465                 470                 475                 480 gga ccc tgt tac cgg cag cag cgc gtt tct aaa aca aaa aca gac aac        1488
Gly Pro Cys Tyr Arg Gln Gln Arg Val Ser Lys Thr Lys Thr Asp Asn
            485                 490                 495 aac aac agc aac ttt acc tgg act ggt gct tca aaa tat aac ctt aat        1536
Asn Asn Ser Asn Phe Thr Trp Thr Gly Ala Ser Lys Tyr Asn Leu Asn
            500                 505                 510
```

```
ggg cgt gaa tct ata atc aac cct ggc act gct atg gcc tca cac aaa    1584
Gly Arg Glu Ser Ile Ile Asn Pro Gly Thr Ala Met Ala Ser His Lys
        515                 520                 525 gac gac aaa gac aag ttc ttt ccc atg agc ggt gtc atg att ttt gga    1632
Asp Asp Lys Asp Lys Phe Phe Pro Met Ser Gly Val Met Ile Phe Gly
530                 535                 540 aag gag agc gcc gga gct tca aac act gca ttg gac aat gtc atg atc    1680
Lys Glu Ser Ala Gly Ala Ser Asn Thr Ala Leu Asp Asn Val Met Ile
545                 550                 555                 560 aca gac gaa gag gaa atc aaa gcc act aac ccc gtg gcc acc gaa aga    1728
Thr Asp Glu Glu Glu Ile Lys Ala Thr Asn Pro Val Ala Thr Glu Arg
                565                 570                 575 ttt ggg act gtg gca gtc aat ctc cag agc agc agc aca gac cct gcg    1776
Phe Gly Thr Val Ala Val Asn Leu Gln Ser Ser Ser Thr Asp Pro Ala
            580                 585                 590 acc gga gat gtg cat gtt atg gga gcc tta cct gga atg gtg tgg caa    1824
Thr Gly Asp Val His Val Met Gly Ala Leu Pro Gly Met Val Trp Gln
        595                 600                 605 gac aga gac gta tac ctg cag ggt cct att tgg gcc aaa att cct cac    1872
Asp Arg Asp Val Tyr Leu Gln Gly Pro Ile Trp Ala Lys Ile Pro His
610                 615                 620 acg gat gga cac ttt cac ccg tct cct ctc atg ggc ggc ttt gga ctt    1920
Thr Asp Gly His Phe His Pro Ser Pro Leu Met Gly Gly Phe Gly Leu
625                 630                 635                 640 aag cac ccg cct cct cag atc ctc atc aaa aac acg cct gtt cct gcg    1968
Lys His Pro Pro Pro Gln Ile Leu Ile Lys Asn Thr Pro Val Pro Ala
                645                 650                 655 aat cct ccg gca gag ttt tcg gct aca aag ttt gct tca ttc atc acc    2016
Asn Pro Pro Ala Glu Phe Ser Ala Thr Lys Phe Ala Ser Phe Ile Thr
            660                 665                 670 cag tat tcc aca gga caa gtg agc gtg gag att gaa tgg gag ctg cag    2064
Gln Tyr Ser Thr Gly Gln Val Ser Val Glu Ile Glu Trp Glu Leu Gln
        675                 680                 685 aaa gaa aac agc aaa cgc tgg aat ccc gaa gtg cag tat aca tct aac    2112
Lys Glu Asn Ser Lys Arg Trp Asn Pro Glu Val Gln Tyr Thr Ser Asn
690                 695                 700 tat gca aaa tct gcc aac gtt gat ttc act gtg gac aac aat gga ctt    2160
Tyr Ala Lys Ser Ala Asn Val Asp Phe Thr Val Asp Asn Asn Gly Leu
705                 710                 715                 720 tat act gag cct cgc ccc att ggc acc cgt tac ctc acc cgt ccc ctg    2208
Tyr Thr Glu Pro Arg Pro Ile Gly Thr Arg Tyr Leu Thr Arg Pro Leu
                725                 730                 735 taa                                                                2211

<210> SEQ ID NO 6
<211> LENGTH: 736
<212> TYPE: PRT
<213> ORGANISM: Artificial Sequence
<220> FEATURE:
<223> OTHER INFORMATION: Synthetic Construct

<400> SEQUENCE: 6

Met Ala Ala Asp Gly Tyr Leu Pro Asp Trp Leu Glu Asp Asn Leu Ser
1               5                   10                  15

Glu Gly Ile Arg Glu Trp Trp Asp Leu Lys Pro Gly Ala Pro Lys Pro
            20                  25                  30

Lys Ala Asn Gln Gln Lys Gln Asp Asp Gly Arg Gly Leu Val Leu Pro
        35                  40                  45

Gly Tyr Lys Tyr Leu Gly Pro Phe Asn Gly Leu Asp Lys Gly Glu Pro
    50                  55                  60
```

-continued

```
Val Asn Ala Ala Asp Ala Ala Leu Glu His Asp Lys Ala Tyr Asp
 65                  70                  75                  80

Gln Gln Leu Lys Ala Gly Asp Asn Pro Tyr Leu Arg Tyr Asn His Ala
                 85                  90                  95

Asp Ala Glu Phe Gln Glu Arg Leu Gln Glu Asp Thr Ser Phe Gly Gly
            100                 105                 110

Asn Leu Gly Arg Ala Val Phe Gln Ala Lys Lys Arg Val Leu Glu Pro
        115                 120                 125

Leu Gly Leu Val Glu Glu Gly Ala Lys Thr Ala Pro Gly Lys Lys Arg
    130                 135                 140

Pro Val Glu Gln Ser Pro Gln Glu Pro Asp Ser Ser Ser Gly Ile Gly
145                 150                 155                 160

Lys Thr Gly Gln Gln Pro Ala Lys Lys Arg Leu Asn Phe Gly Gln Thr
                165                 170                 175

Gly Asp Ser Glu Ser Val Pro Asp Pro Gln Pro Leu Gly Glu Pro Pro
            180                 185                 190

Ala Thr Pro Ala Ala Val Gly Pro Thr Thr Met Ala Ser Gly Gly Gly
        195                 200                 205

Ala Pro Met Ala Asp Asn Asn Glu Gly Ala Asp Gly Val Gly Asn Ala
    210                 215                 220

Ser Gly Asn Trp His Cys Asp Ser Thr Trp Leu Gly Asp Arg Val Ile
225                 230                 235                 240

Thr Thr Ser Thr Arg Thr Trp Ala Leu Pro Thr Tyr Asn Asn His Leu
                245                 250                 255

Tyr Lys Gln Ile Ser Ser Ala Ser Thr Gly Ala Ser Asn Asp Asn His
            260                 265                 270

Tyr Phe Gly Tyr Ser Thr Pro Trp Gly Tyr Phe Asp Phe Asn Arg Phe
        275                 280                 285

His Cys His Phe Ser Pro Arg Asp Trp Gln Arg Leu Ile Asn Asn Asn
    290                 295                 300

Trp Gly Phe Arg Pro Lys Arg Leu Asn Phe Lys Leu Phe Asn Ile Gln
305                 310                 315                 320

Val Lys Glu Val Thr Thr Asn Asp Gly Val Thr Thr Ile Ala Asn Asn
                325                 330                 335

Leu Thr Ser Thr Val Gln Val Phe Ser Asp Ser Glu Tyr Gln Leu Pro
            340                 345                 350

Tyr Val Leu Gly Ser Ala His Gln Gly Cys Leu Pro Pro Phe Pro Ala
        355                 360                 365

Asp Val Phe Met Ile Pro Gln Tyr Gly Tyr Leu Thr Leu Asn Asn Gly
    370                 375                 380

Ser Gln Ala Val Gly Arg Ser Ser Phe Tyr Cys Leu Glu Tyr Phe Pro
385                 390                 395                 400

Ser Gln Met Leu Arg Thr Gly Asn Asn Phe Thr Phe Ser Tyr Thr Phe
                405                 410                 415

Glu Asp Val Pro Phe His Ser Ser Tyr Ala His Ser Gln Ser Leu Asp
            420                 425                 430

Arg Leu Met Asn Pro Leu Ile Asp Gln Tyr Leu Tyr Tyr Leu Asn Arg
        435                 440                 445

Thr Gln Asn Gln Ser Gly Ser Ala Gln Asn Lys Asp Leu Leu Phe Ser
    450                 455                 460

Arg Gly Ser Pro Ala Gly Met Ser Val Gln Pro Lys Asn Trp Leu Pro
465                 470                 475                 480
```

-continued

```
Gly Pro Cys Tyr Arg Gln Gln Arg Val Ser Lys Thr Lys Thr Asp Asn
                485                 490                 495

Asn Asn Ser Asn Phe Thr Trp Thr Gly Ala Ser Lys Tyr Asn Leu Asn
            500                 505                 510

Gly Arg Glu Ser Ile Ile Asn Pro Gly Thr Ala Met Ala Ser His Lys
        515                 520                 525

Asp Asp Lys Asp Lys Phe Phe Pro Met Ser Gly Val Met Ile Phe Gly
    530                 535                 540

Lys Glu Ser Ala Gly Ala Ser Asn Thr Ala Leu Asp Asn Val Met Ile
545                 550                 555                 560

Thr Asp Glu Glu Glu Ile Lys Ala Thr Asn Pro Val Ala Thr Glu Arg
                565                 570                 575

Phe Gly Thr Val Ala Val Asn Leu Gln Ser Ser Ser Thr Asp Pro Ala
            580                 585                 590

Thr Gly Asp Val His Val Met Gly Ala Leu Pro Gly Met Val Trp Gln
        595                 600                 605

Asp Arg Asp Val Tyr Leu Gln Gly Pro Ile Trp Ala Lys Ile Pro His
    610                 615                 620

Thr Asp Gly His Phe His Pro Ser Pro Leu Met Gly Gly Phe Gly Leu
625                 630                 635                 640

Lys His Pro Pro Pro Gln Ile Leu Ile Lys Asn Thr Pro Val Pro Ala
                645                 650                 655

Asn Pro Pro Ala Glu Phe Ser Ala Thr Lys Phe Ala Ser Phe Ile Thr
            660                 665                 670

Gln Tyr Ser Thr Gly Gln Val Ser Val Glu Ile Glu Trp Glu Leu Gln
        675                 680                 685

Lys Glu Asn Ser Lys Arg Trp Asn Pro Glu Val Gln Tyr Thr Ser Asn
    690                 695                 700

Tyr Ala Lys Ser Ala Asn Val Asp Phe Thr Val Asp Asn Asn Gly Leu
705                 710                 715                 720

Tyr Thr Glu Pro Arg Pro Ile Gly Thr Arg Tyr Leu Thr Arg Pro Leu
                725                 730                 735

<210> SEQ ID NO 7
<211> LENGTH: 2211
<212> TYPE: DNA
<213> ORGANISM: adeno-associated virus 1
<220> FEATURE:
<221> NAME/KEY: CDS
<222> LOCATION: (1)..(2211)

<400> SEQUENCE: 7 atg gct gcc gat ggt tat ctt cca gat tgg ctc gag gac aac ctc tct      48
Met Ala Ala Asp Gly Tyr Leu Pro Asp Trp Leu Glu Asp Asn Leu Ser
1               5                   10                  15 gag ggc att cgc gag tgg tgg gac ttg aaa cct gga gcc ccg aag ccc      96
Glu Gly Ile Arg Glu Trp Trp Asp Leu Lys Pro Gly Ala Pro Lys Pro
            20                  25                  30 aaa gcc aac cag caa aag cag gac gac ggc cgg ggt ctg gtg ctt cct     144
Lys Ala Asn Gln Gln Lys Gln Asp Asp Gly Arg Gly Leu Val Leu Pro
        35                  40                  45 ggc tac aag tac ctc gga ccc ttc aac gga ctc gac aag ggg gag ccc     192
Gly Tyr Lys Tyr Leu Gly Pro Phe Asn Gly Leu Asp Lys Gly Glu Pro
    50                  55                  60 gtc aac gcg gcg gac gca gcg gcc ctc gag cac gac aag gcc tac gac     240
Val Asn Ala Ala Asp Ala Ala Ala Leu Glu His Asp Lys Ala Tyr Asp
65                  70                  75                  80
```

```
cag cag ctc aaa gcg ggt gac aat ccg tac ctg cgg tat aac cac gcc    288
Gln Gln Leu Lys Ala Gly Asp Asn Pro Tyr Leu Arg Tyr Asn His Ala
            85                  90                  95 gac gcc gag ttt cag gag cgt ctg caa gaa gat acg tct ttt ggg ggc    336
Asp Ala Glu Phe Gln Glu Arg Leu Gln Glu Asp Thr Ser Phe Gly Gly
               100                 105                 110 aac ctc ggg cga gca gtc ttc cag gcc aag aag cgg gtt ctc gaa cct    384
Asn Leu Gly Arg Ala Val Phe Gln Ala Lys Lys Arg Val Leu Glu Pro
           115                 120                 125 ctc ggt ctg gtt gag gaa ggc gct aag acg gct cct gga aag aaa cgt    432
Leu Gly Leu Val Glu Glu Gly Ala Lys Thr Ala Pro Gly Lys Lys Arg
       130                 135                 140 ccg gta gag cag tcg cca caa gag cca gac tcc tcc tcg ggc atc ggc    480
Pro Val Glu Gln Ser Pro Gln Glu Pro Asp Ser Ser Ser Gly Ile Gly
145                 150                 155                 160 aag aca ggc cag cag ccc gct aaa aag aga ctc aat ttt ggt cag act    528
Lys Thr Gly Gln Gln Pro Ala Lys Lys Arg Leu Asn Phe Gly Gln Thr
                165                 170                 175 ggc gac tca gag tca gtc ccc gat cca caa cct ctc gga gaa cct cca    576
Gly Asp Ser Glu Ser Val Pro Asp Pro Gln Pro Leu Gly Glu Pro Pro
            180                 185                 190 gca acc ccc gct gct gtg gga cct act aca atg gct tca ggc ggt ggc    624
Ala Thr Pro Ala Ala Val Gly Pro Thr Thr Met Ala Ser Gly Gly Gly
        195                 200                 205 gca cca atg gca gac aat aac gaa ggc gcc gac gga gtg ggt aat gcc    672
Ala Pro Met Ala Asp Asn Asn Glu Gly Ala Asp Gly Val Gly Asn Ala
    210                 215                 220 tca gga aat tgg cat tgc gat tcc aca tgg ctg ggc gac aga gtc atc    720
Ser Gly Asn Trp His Cys Asp Ser Thr Trp Leu Gly Asp Arg Val Ile
225                 230                 235                 240 acc acc agc acc cgc acc tgg gcc ttg ccc acc tac aat aac cac ctc    768
Thr Thr Ser Thr Arg Thr Trp Ala Leu Pro Thr Tyr Asn Asn His Leu
                245                 250                 255 tac aag caa atc tcc agt gct tca acg ggg gcc agc aac gac aac cac    816
Tyr Lys Gln Ile Ser Ser Ala Ser Thr Gly Ala Ser Asn Asp Asn His
            260                 265                 270 tac ttc ggc tac agc acc ccc tgg ggg tat ttt gat ttc aac aga ttc    864
Tyr Phe Gly Tyr Ser Thr Pro Trp Gly Tyr Phe Asp Phe Asn Arg Phe
        275                 280                 285 cac tgc cac ttt tca cca cgt gac tgg cag cga ctc atc aac aac aat    912
His Cys His Phe Ser Pro Arg Asp Trp Gln Arg Leu Ile Asn Asn Asn
    290                 295                 300 tgg gga ttc cgg ccc aag aga ctc aac ttc aaa ctc ttc aac atc caa    960
Trp Gly Phe Arg Pro Lys Arg Leu Asn Phe Lys Leu Phe Asn Ile Gln
305                 310                 315                 320 gtc aag gag gtc acg acg aat gat ggc gtc aca acc atc gct aat aac   1008
Val Lys Glu Val Thr Thr Asn Asp Gly Val Thr Thr Ile Ala Asn Asn
                325                 330                 335 ctt acc agc acg gtt caa gtc ttc tcg gac tcg gag tac cag ctt ccg   1056
Leu Thr Ser Thr Val Gln Val Phe Ser Asp Ser Glu Tyr Gln Leu Pro
            340                 345                 350 tac gtc ctc ggc tct gcg cac cag ggc tgc ctc cct ccg ttc ccg gcg   1104
Tyr Val Leu Gly Ser Ala His Gln Gly Cys Leu Pro Pro Phe Pro Ala
        355                 360                 365 gac gtg ttc atg att ccg caa tac ggc tac ctg acg ctc aac aat ggc   1152
Asp Val Phe Met Ile Pro Gln Tyr Gly Tyr Leu Thr Leu Asn Asn Gly
    370                 375                 380 agc caa gcc gtg gga cgt tca tcc ttt tac tgc ctg gaa tat ttc cct   1200
Ser Gln Ala Val Gly Arg Ser Ser Phe Tyr Cys Leu Glu Tyr Phe Pro
385                 390                 395                 400
```

| | | | | | | | | | | | | | | | | |
|---|---|---|---|---|---|---|---|---|---|---|---|---|---|---|---|---|
| tct | cag | atg | ctg | aga | acg | ggc | aac | aac | ttt | acc | ttc | agc | tac | acc | ttt | 1248 |
| Ser | Gln | Met | Leu | Arg | Thr | Gly | Asn | Asn | Phe | Thr | Phe | Ser | Tyr | Thr | Phe | |
| | | | 405 | | | | 410 | | | | | 415 | | | | |
| gag | gaa | gtg | cct | ttc | cac | agc | agc | tac | gcg | cac | agc | cag | agc | ctg | gac | 1296 |
| Glu | Glu | Val | Pro | Phe | His | Ser | Ser | Tyr | Ala | His | Ser | Gln | Ser | Leu | Asp | |
| | | | 420 | | | | 425 | | | | | 430 | | | | |
| cgg | ctg | atg | aat | cct | ctc | atc | gac | caa | tac | ctg | tat | tac | ctg | aac | aga | 1344 |
| Arg | Leu | Met | Asn | Pro | Leu | Ile | Asp | Gln | Tyr | Leu | Tyr | Tyr | Leu | Asn | Arg | |
| | | 435 | | | | | 440 | | | | | | 445 | | | |
| act | caa | aat | cag | tcc | gga | agt | gcc | caa | aac | aag | gac | ttg | ctg | ttt | agc | 1392 |
| Thr | Gln | Asn | Gln | Ser | Gly | Ser | Ala | Gln | Asn | Lys | Asp | Leu | Leu | Phe | Ser | |
| | 450 | | | | | 455 | | | | | 460 | | | | | |
| cgt | ggg | tct | cca | gct | ggc | atg | tct | gtt | cag | ccc | aaa | aac | tgg | cta | cct | 1440 |
| Arg | Gly | Ser | Pro | Ala | Gly | Met | Ser | Val | Gln | Pro | Lys | Asn | Trp | Leu | Pro | |
| 465 | | | | | 470 | | | | | 475 | | | | | 480 | |
| gga | ccc | tgt | tat | cgg | cag | cag | cgc | gtt | tct | aaa | aca | aaa | aca | gac | aac | 1488 |
| Gly | Pro | Cys | Tyr | Arg | Gln | Gln | Arg | Val | Ser | Lys | Thr | Lys | Thr | Asp | Asn | |
| | | | | 485 | | | | | 490 | | | | | 495 | | |
| aac | aac | agc | aat | ttt | acc | tgg | act | ggt | gct | tca | aaa | tat | aac | ctc | aat | 1536 |
| Asn | Asn | Ser | Asn | Phe | Thr | Trp | Thr | Gly | Ala | Ser | Lys | Tyr | Asn | Leu | Asn | |
| | | | 500 | | | | | 505 | | | | | 510 | | | |
| ggg | cgt | gaa | tcc | atc | atc | aac | cct | ggc | act | gct | atg | gcc | tca | cac | aaa | 1584 |
| Gly | Arg | Glu | Ser | Ile | Ile | Asn | Pro | Gly | Thr | Ala | Met | Ala | Ser | His | Lys | |
| | | 515 | | | | | 520 | | | | | 525 | | | | |
| gac | gac | gaa | gac | aag | ttc | ttt | ccc | atg | agc | ggt | gtc | atg | att | ttt | gga | 1632 |
| Asp | Asp | Glu | Asp | Lys | Phe | Phe | Pro | Met | Ser | Gly | Val | Met | Ile | Phe | Gly | |
| | 530 | | | | | 535 | | | | | 540 | | | | | |
| aaa | gag | agc | gcc | gga | gct | tca | aac | act | gca | ttg | gac | aat | gtc | atg | att | 1680 |
| Lys | Glu | Ser | Ala | Gly | Ala | Ser | Asn | Thr | Ala | Leu | Asp | Asn | Val | Met | Ile | |
| 545 | | | | | 550 | | | | | 555 | | | | | 560 | |
| aca | gac | gaa | gag | gaa | att | aaa | gcc | act | aac | cct | gtg | gcc | acc | gaa | aga | 1728 |
| Thr | Asp | Glu | Glu | Glu | Ile | Lys | Ala | Thr | Asn | Pro | Val | Ala | Thr | Glu | Arg | |
| | | | | 565 | | | | | 570 | | | | | 575 | | |
| ttt | ggg | acc | gtg | gca | gtc | aat | ttc | cag | agc | agc | agc | aca | gac | cct | gcg | 1776 |
| Phe | Gly | Thr | Val | Ala | Val | Asn | Phe | Gln | Ser | Ser | Ser | Thr | Asp | Pro | Ala | |
| | | | 580 | | | | | 585 | | | | | 590 | | | |
| acc | gga | gat | gtg | cat | gct | atg | gga | gca | tta | cct | ggc | atg | gtg | tgg | caa | 1824 |
| Thr | Gly | Asp | Val | His | Ala | Met | Gly | Ala | Leu | Pro | Gly | Met | Val | Trp | Gln | |
| | | 595 | | | | | 600 | | | | | 605 | | | | |
| gat | aga | gac | gtg | tac | ctg | cag | ggt | ccc | att | tgg | gcc | aaa | att | cct | cac | 1872 |
| Asp | Arg | Asp | Val | Tyr | Leu | Gln | Gly | Pro | Ile | Trp | Ala | Lys | Ile | Pro | His | |
| | 610 | | | | | 615 | | | | | 620 | | | | | |
| aca | gat | gga | cac | ttt | cac | ccg | tct | cct | ctt | atg | ggc | ggc | ttt | gga | ctc | 1920 |
| Thr | Asp | Gly | His | Phe | His | Pro | Ser | Pro | Leu | Met | Gly | Gly | Phe | Gly | Leu | |
| 625 | | | | | 630 | | | | | 635 | | | | | 640 | |
| aag | aac | ccg | cct | cct | cag | atc | ctc | atc | aaa | aac | acg | cct | gtt | cct | gcg | 1968 |
| Lys | Asn | Pro | Pro | Pro | Gln | Ile | Leu | Ile | Lys | Asn | Thr | Pro | Val | Pro | Ala | |
| | | | | 645 | | | | | 650 | | | | | 655 | | |
| aat | cct | ccg | gcg | gag | ttt | tca | gct | aca | aag | ttt | gct | tca | ttc | atc | acc | 2016 |
| Asn | Pro | Pro | Ala | Glu | Phe | Ser | Ala | Thr | Lys | Phe | Ala | Ser | Phe | Ile | Thr | |
| | | | 660 | | | | | 665 | | | | | 670 | | | |
| caa | tac | tcc | aca | gga | caa | gtg | agt | gtg | gaa | att | gaa | tgg | gag | ctg | cag | 2064 |
| Gln | Tyr | Ser | Thr | Gly | Gln | Val | Ser | Val | Glu | Ile | Glu | Trp | Glu | Leu | Gln | |
| | | 675 | | | | | 680 | | | | | 685 | | | | |
| aaa | gaa | aac | agc | aag | cgc | tgg | aat | ccc | gaa | gtg | cag | tac | aca | tcc | aat | 2112 |
| Lys | Glu | Asn | Ser | Lys | Arg | Trp | Asn | Pro | Glu | Val | Gln | Tyr | Thr | Ser | Asn | |
| | 690 | | | | | 695 | | | | | 700 | | | | | |
| tat | gca | aaa | tct | gcc | aac | gtt | gat | ttt | act | gtg | gac | aac | aat | gga | ctt | 2160 |
| Tyr | Ala | Lys | Ser | Ala | Asn | Val | Asp | Phe | Thr | Val | Asp | Asn | Asn | Gly | Leu | |

```
                705               710               715               720
tat act gag cct cgc ccc att ggc acc cgt tac ctt acc cgt ccc ctg            2208
Tyr Thr Glu Pro Arg Pro Ile Gly Thr Arg Tyr Leu Thr Arg Pro Leu
                725               730               735 taa                                                                        2211
```

<210> SEQ ID NO 8
<211> LENGTH: 736
<212> TYPE: PRT
<213> ORGANISM: adeno-associated virus 1

<400> SEQUENCE: 8

```
Met Ala Ala Asp Gly Tyr Leu Pro Asp Trp Leu Glu Asp Asn Leu Ser
1               5                   10                  15

Glu Gly Ile Arg Glu Trp Trp Asp Leu Lys Pro Gly Ala Pro Lys Pro
            20                  25                  30

Lys Ala Asn Gln Gln Lys Gln Asp Asp Gly Arg Gly Leu Val Leu Pro
        35                  40                  45

Gly Tyr Lys Tyr Leu Gly Pro Phe Asn Gly Leu Asp Lys Gly Glu Pro
    50                  55                  60

Val Asn Ala Ala Asp Ala Ala Leu Glu His Asp Lys Ala Tyr Asp
65                  70                  75                  80

Gln Gln Leu Lys Ala Gly Asp Asn Pro Tyr Leu Arg Tyr Asn His Ala
                85                  90                  95

Asp Ala Glu Phe Gln Glu Arg Leu Gln Glu Asp Thr Ser Phe Gly Gly
            100                 105                 110

Asn Leu Gly Arg Ala Val Phe Gln Ala Lys Lys Arg Val Leu Glu Pro
        115                 120                 125

Leu Gly Leu Val Glu Glu Gly Ala Lys Thr Ala Pro Gly Lys Lys Arg
    130                 135                 140

Pro Val Glu Gln Ser Pro Gln Glu Pro Asp Ser Ser Ser Gly Ile Gly
145                 150                 155                 160

Lys Thr Gly Gln Gln Pro Ala Lys Lys Arg Leu Asn Phe Gly Gln Thr
                165                 170                 175

Gly Asp Ser Glu Ser Val Pro Asp Pro Gln Pro Leu Gly Glu Pro Pro
            180                 185                 190

Ala Thr Pro Ala Ala Val Gly Pro Thr Thr Met Ala Ser Gly Gly Gly
        195                 200                 205

Ala Pro Met Ala Asp Asn Asn Glu Gly Ala Asp Gly Val Gly Asn Ala
    210                 215                 220

Ser Gly Asn Trp His Cys Asp Ser Thr Trp Leu Gly Asp Arg Val Ile
225                 230                 235                 240

Thr Thr Ser Thr Arg Thr Trp Ala Leu Pro Thr Tyr Asn Asn His Leu
                245                 250                 255

Tyr Lys Gln Ile Ser Ser Ala Ser Thr Gly Ala Ser Asn Asp Asn His
            260                 265                 270

Tyr Phe Gly Tyr Ser Thr Pro Trp Gly Tyr Phe Asp Phe Asn Arg Phe
        275                 280                 285

His Cys His Phe Ser Pro Arg Asp Trp Gln Arg Leu Ile Asn Asn Asn
    290                 295                 300

Trp Gly Phe Arg Pro Lys Arg Leu Asn Phe Lys Leu Phe Asn Ile Gln
305                 310                 315                 320

Val Lys Glu Val Thr Thr Asn Asp Gly Val Thr Thr Ile Ala Asn Asn
                325                 330                 335
```

-continued

Leu Thr Ser Thr Val Gln Val Phe Ser Asp Ser Glu Tyr Gln Leu Pro
            340                 345                 350

Tyr Val Leu Gly Ser Ala His Gln Gly Cys Leu Pro Pro Phe Pro Ala
        355                 360                 365

Asp Val Phe Met Ile Pro Gln Tyr Gly Tyr Leu Thr Leu Asn Asn Gly
    370                 375                 380

Ser Gln Ala Val Gly Arg Ser Ser Phe Tyr Cys Leu Glu Tyr Phe Pro
385                 390                 395                 400

Ser Gln Met Leu Arg Thr Gly Asn Asn Phe Thr Phe Ser Tyr Thr Phe
                405                 410                 415

Glu Glu Val Pro Phe His Ser Ser Tyr Ala His Ser Gln Ser Leu Asp
            420                 425                 430

Arg Leu Met Asn Pro Leu Ile Asp Gln Tyr Leu Tyr Tyr Leu Asn Arg
        435                 440                 445

Thr Gln Asn Gln Ser Gly Ser Ala Gln Asn Lys Asp Leu Leu Phe Ser
    450                 455                 460

Arg Gly Ser Pro Ala Gly Met Ser Val Gln Pro Lys Asn Trp Leu Pro
465                 470                 475                 480

Gly Pro Cys Tyr Arg Gln Gln Arg Val Ser Lys Thr Lys Thr Asp Asn
                485                 490                 495

Asn Asn Ser Asn Phe Thr Trp Thr Gly Ala Ser Lys Tyr Asn Leu Asn
            500                 505                 510

Gly Arg Glu Ser Ile Ile Asn Pro Gly Thr Ala Met Ala Ser His Lys
        515                 520                 525

Asp Asp Glu Asp Lys Phe Phe Pro Met Ser Gly Val Met Ile Phe Gly
    530                 535                 540

Lys Glu Ser Ala Gly Ala Ser Asn Thr Ala Leu Asp Asn Val Met Ile
545                 550                 555                 560

Thr Asp Glu Glu Glu Ile Lys Ala Thr Asn Pro Val Ala Thr Glu Arg
                565                 570                 575

Phe Gly Thr Val Ala Val Asn Phe Gln Ser Ser Ser Thr Asp Pro Ala
            580                 585                 590

Thr Gly Asp Val His Ala Met Gly Ala Leu Pro Gly Met Val Trp Gln
        595                 600                 605

Asp Arg Asp Val Tyr Leu Gln Gly Pro Ile Trp Ala Lys Ile Pro His
    610                 615                 620

Thr Asp Gly His Phe His Pro Ser Pro Leu Met Gly Gly Phe Gly Leu
625                 630                 635                 640

Lys Asn Pro Pro Pro Gln Ile Leu Ile Lys Asn Thr Pro Val Pro Ala
                645                 650                 655

Asn Pro Pro Ala Glu Phe Ser Ala Thr Lys Phe Ala Ser Phe Ile Thr
            660                 665                 670

Gln Tyr Ser Thr Gly Gln Val Ser Val Glu Ile Glu Trp Glu Leu Gln
        675                 680                 685

Lys Glu Asn Ser Lys Arg Trp Asn Pro Glu Val Gln Tyr Thr Ser Asn
    690                 695                 700

Tyr Ala Lys Ser Ala Asn Val Asp Phe Thr Val Asp Asn Asn Gly Leu
705                 710                 715                 720

Tyr Thr Glu Pro Arg Pro Ile Gly Thr Arg Tyr Leu Thr Arg Pro Leu
                725                 730                 735

<210> SEQ ID NO 9
<211> LENGTH: 26
<212> TYPE: DNA

```
<213> ORGANISM: Artificial Sequence
<220> FEATURE:
<223> OTHER INFORMATION: primer sequence

<400> SEQUENCE: 9
gctgcgtcaa ctggaccaat gagaac                                            26

<210> SEQ ID NO 10
<211> LENGTH: 28
<212> TYPE: DNA
<213> ORGANISM: Artificial Sequence
<220> FEATURE:
<223> OTHER INFORMATION: primer sequence

<400> SEQUENCE: 10
cgcagagacc aaagttcaac tgaaacga                                          28

<210> SEQ ID NO 11
<211> LENGTH: 25
<212> TYPE: DNA
<213> ORGANISM: Artificial Sequence
<220> FEATURE:
<223> OTHER INFORMATION: primer sequence

<400> SEQUENCE: 11
ggcgaacagc ggacaccgat atgaa                                             25

<210> SEQ ID NO 12
<211> LENGTH: 25
<212> TYPE: DNA
<213> ORGANISM: Artificial Sequence
<220> FEATURE:
<223> OTHER INFORMATION: primer sequence

<400> SEQUENCE: 12
ggctctcgtc gcgtgagaat gagaa                                             25

<210> SEQ ID NO 13
<211> LENGTH: 22
<212> TYPE: DNA
<213> ORGANISM: Artificial Sequence
<220> FEATURE:
<223> OTHER INFORMATION: miRNA target sequence

<400> SEQUENCE: 13
agtgaattct accagtgcca ta                                                22

<210> SEQ ID NO 14
<211> LENGTH: 24
<212> TYPE: DNA
<213> ORGANISM: Artificial Sequence
<220> FEATURE:
<223> OTHER INFORMATION: miRNA target sequence

<400> SEQUENCE: 14
agtgtgagtt ctaccattgc caaa                                              24
```